(12) United States Patent
Chen et al.

(10) Patent No.: US 12,470,133 B2
(45) Date of Patent: Nov. 11, 2025

(54) CONVERSION CIRCUIT WITH A CAPACITOR MODULE, BALANCING MODULE AND A STARTUP MODULE AND RELATED ELECTRONIC DEVICE

(71) Applicant: Huawei Digital Power Technologies Co., Ltd., Shenzhen (CN)

(72) Inventors: Haitao Chen, Shenzhen (CN); Xingzhong Zhang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 252 days.

(21) Appl. No.: 18/157,270

(22) Filed: Jan. 20, 2023

(65) Prior Publication Data

US 2023/0155488 A1 May 18, 2023

Related U.S. Application Data

(63) Continuation of application No. PCT/CN2020/105423, filed on Jul. 29, 2020.

(51) Int. Cl.
*H02M 3/00* (2006.01)
*H02M 1/00* (2007.01)
(Continued)

(52) U.S. Cl.
CPC ............ *H02M 3/01* (2021.05); *H02M 1/008* (2021.05); *H02M 1/36* (2013.01); *H02M 3/07* (2013.01)

(58) Field of Classification Search
CPC ...... H02M 3/158; H02M 3/06; H02M 1/0095; H02M 3/07; H02M 3/01; H02M 1/008; H02M 1/007; H02M 1/36
See application file for complete search history.

(56) References Cited

U.S. PATENT DOCUMENTS 10,224,803 B1 * 3/2019 Rainer ................... H02M 3/07
10,938,310 B1 * 3/2021 Cheng ............... H02M 3/33515
(Continued)

FOREIGN PATENT DOCUMENTS

CN 101552557 A 10/2009
CN 104410133 A * 3/2015 ............ H02J 7/0019
(Continued)

OTHER PUBLICATIONS

Webb et al., "12 Switch Zero-Inductor Voltage Converter Topology", IEEE, Applied Power Electronics Conference and Exposition (APEC), Mar. 17-21, 2019, 8 pages.
(Continued)

*Primary Examiner* — Gustavo A Rosario-Benitez
(74) *Attorney, Agent, or Firm* — Maier & Maier, PLLC

(57) ABSTRACT

A conversion circuit includes a capacitor module, a balancing module, and a startup module. The capacitor module includes at least a first capacitor and a second capacitor. The balancing module includes at least a first resonant circuit. The startup module includes a direct current-direct current converter and a target capacitor. The first resonant circuit includes at least two groups of switches and a first resonant cavity. The first capacitor is connected in series to the second capacitor, and connected in parallel to the target capacitor. The first resonant circuit is separately connected to both ends of the first capacitor and the second capacitor by using the startup module. The balancing module balances voltages at both ends of the first capacitor and the second capacitor by controlling the switches in the first resonant circuit. The startup module is configured to start the balancing module and the capacitor module.

18 Claims, 34 Drawing Sheets

(51) Int. Cl.
*H02M 1/36* (2007.01)
*H02M 3/07* (2006.01)

(56) References Cited

U.S. PATENT DOCUMENTS

| | | | | |
|---|---|---|---|---|
| 11,398,776 | B2* | 7/2022 | Jin | H02M 3/003 |
| 2018/0013351 | A1* | 1/2018 | Marawi | H02M 3/158 |
| 2020/0006970 | A1* | 1/2020 | Chen | H02M 7/217 |
| 2020/0153331 | A1* | 5/2020 | Li | H02M 3/07 |
| 2020/0412239 | A1* | 12/2020 | Grbovic | H02M 3/07 |
| 2021/0211059 | A1* | 7/2021 | Jin | H02M 3/33576 |
| 2022/0029531 | A1* | 1/2022 | Liu | H02M 3/01 |

FOREIGN PATENT DOCUMENTS

| | | |
|---|---|---|
| CN | 104795989 A | 7/2015 |
| CN | 105006964 A | 10/2015 |
| CN | 105763060 A | 7/2016 |
| CN | 107482943 A | 12/2017 |
| WO | 2019145016 A1 | 8/2019 |

OTHER PUBLICATIONS

Li et al., "A High Efficiency Resonant Switched-Capacitor Converter for Data Center", IEEE, Energy Conversion Congress and Exposition (ECCE), Oct. 1-5, 2017, 7 pages.
Ahmed et al., "High-Efficiency High-Power-Density 48/1V Sigma Converter Voltage Regulator Module", IEEE, Applied Power Electronics Conference and Exposition (APEC), Mar. 26-30, 2017, 6 pages.

* cited by examiner

CONVERSION CIRCUIT WITH A CAPACITOR MODULE, BALANCING MODULE AND A STARTUP MODULE AND RELATED ELECTRONIC DEVICE

CROSS-REFERENCE TO RELATED APPLICATIONS

This application is a continuation of International Application No. PCT/CN2020/105423, filed on Jul. 29, 2020, the disclosure of which is hereby incorporated by reference in its entirety.

TECHNICAL FIELD

The embodiments relate to the circuit field, a conversion circuit, and a related electronic device.

BACKGROUND

With development of an artificial intelligence (AI) technology, a computing capability and a capacity of a chip supporting AI continuously increase, resulting in increased power consumption. Therefore, a power supply solution of such a chip is particularly important.

In a conventional technology, a conversion circuit in which capacitors are in an equivalent serial connection relationship is generally used in a resonant switched capacitor solution in the power supply solution of such a chip. After running for a long time, the conversion circuit has a high risk of voltage imbalance.

SUMMARY

The embodiments may provide a conversion circuit and a related electronic device, to balance voltages at both ends of capacitors, and implement different voltage transformation ratios by adjusting a quantity of capacitor modules.

A first aspect of the embodiments may provide a conversion circuit, including: a capacitor module, a balancing module, and a startup module. The capacitor module includes at least a first capacitor and a second capacitor. The balancing module includes at least a first resonant circuit. The startup module includes a direct current-direct current converter and a target capacitor. The first resonant circuit includes at least two groups of switches connected in parallel to each other and a first resonant cavity connected between the two groups of switches. The first capacitor is connected in series to the second capacitor, and the first capacitor is connected in parallel to the target capacitor. The first resonant circuit is separately connected to both ends of the first capacitor and the second capacitor by using the startup module. The balancing module balances voltages at both ends of the first capacitor and the second capacitor by controlling the switches in the first resonant circuit in conjunction with influence of the first resonant cavity on a current. The startup module is configured to start the balancing module and the capacitor module.

In this embodiment, the balancing module balances the voltages at both ends of the first capacitor and the second capacitor by controlling the switches in the first resonant circuit in conjunction with the influence of the first resonant cavity on the current. Further, different transformation ratios are obtained based on a quantity of capacitors of the capacitor module and a series voltage division principle. In addition, the startup module is used to implement a closed loop and a stable output voltage, to ensure slow startup of the conversion circuit.

Optionally, in a possible implementation of the first aspect, in the foregoing structure, one group of switches in the two groups of switches in the first resonant circuit includes at least a first switch and a third switch, and the other group of switches in the two groups of switches in the first resonant circuit includes at least a second switch and a fourth switch. The first switch and the third switch are not simultaneously turned on, and the second switch and the fourth switch are not simultaneously turned on.

In this possible implementation, a conduction status of each switch in the first resonant circuit is controlled, so that the first capacitor may perform energy transmission with the second capacitor by using the first resonant circuit, thereby balancing voltages at both ends of capacitors. Further, a twofold transformation ratio is obtained based on a quantity 2 of capacitors of the capacitor module and the series voltage division principle. In addition, the startup module is used to implement the closed loop and the stable output voltage, to ensure slow startup of the conversion circuit.

Optionally, in a possible implementation of the first aspect, in the foregoing structure, the first resonant cavity includes at least a first resonant capacitor and a first resonant inductor. One end of the first resonant cavity is separately connected to a second end of the first switch and a first end of the third switch, and the other end of the first resonant cavity is separately connected to a second end of the second switch and a first end of the fourth switch.

In this possible implementation, the first resonant cavity is connected to the switches in the first resonant circuit, and a conduction status of each switch in the first resonant circuit may be controlled, so that the first capacitor may perform energy transmission with the second capacitor by using the first resonant circuit, thereby balancing voltages at both ends of capacitors.

Optionally, in a possible implementation of the first aspect, in the foregoing structure, the first switch is connected in series to the third switch, and the second switch is connected in series to the fourth switch. One end of the second capacitor is connected to a first end of the second switch, and the other end of the second capacitor is separately connected to a first end of the first switch, a first end of the direct current-direct current converter, and one end of the first capacitor. A second end of the direct current-direct current converter is separately connected to one end of the target capacitor and a second end of the fourth switch. The other end of the first capacitor is connected to a third end of the direct current-direct current converter, and a fourth end of the direct current-direct current converter is separately connected to a second end of the third switch and the other end of the target capacitor.

In this possible implementation, the direct current-direct current converter is connected to the switches and the capacitors, to implement the closed loop and the stable output voltage, and ensure slow startup of the conversion circuit. Further, a conduction status of each switch in the first resonant circuit may be controlled, so that the first capacitor may perform energy transmission with the second capacitor by using the first resonant circuit, thereby balancing voltages at both ends of capacitors. Further, a twofold transformation ratio is obtained based on a quantity 2 of capacitors of the capacitor module and the series voltage division principle.

Optionally, in a possible implementation of the first aspect, in the foregoing structure, the capacitor module further includes a third capacitor, the balancing module further includes a second resonant circuit, and the second resonant circuit includes at least two groups of switches connected in parallel to each other and a second resonant cavity connected between the two groups of switches. One group of switches in the two groups of switches in the second resonant circuit includes at least a fifth switch and a seventh switch, and the other group of switches in the two groups of switches in the second resonant circuit includes at least a sixth switch and an eighth switch. The second resonant cavity includes at least a second resonant capacitor and a second resonant inductor. The second resonant circuit is separately connected to both ends of the first capacitor and the third capacitor by using the startup module. The balancing module balances voltages at both ends of the first capacitor and the third capacitor by controlling the switches in the second resonant circuit in conjunction with influence of the second resonant cavity on a current. The fifth switch and the seventh switch are not simultaneously turned on, and the sixth switch and the eighth switch are not simultaneously turned on.

In this possible implementation, a conversion circuit that may implement a threefold transformation ratio and may be slowly started is provided.

Optionally, in a possible implementation of the first aspect, in the foregoing structure, the balancing module further includes a second resonant circuit, and the second resonant circuit includes at least two groups of switches connected in parallel to each other and a second resonant cavity connected between the two groups of switches. One group of switches in the two groups of switches in the second resonant circuit includes at least a fifth switch and a seventh switch, and the other group of switches in the two groups of switches in the second resonant circuit includes at least a sixth switch and an eighth switch. The second resonant cavity includes at least a second resonant capacitor and a second resonant inductor. The balancing module balances voltages at both ends of the first capacitor and the second resonant capacitor by controlling the switches in the second resonant circuit in conjunction with influence of the second resonant cavity on a current. The fifth switch and the seventh switch are not simultaneously turned on, and the sixth switch and the eighth switch are not simultaneously turned on.

In this possible implementation, a conversion circuit that may implement a threefold transformation ratio and may be slowly started is provided.

Optionally, in a possible implementation of the first aspect, in the foregoing structure, the first resonant capacitor is connected in series to the first resonant inductor, and the second resonant capacitor is connected in series to the second resonant inductor. The first capacitor, the second capacitor, and the third capacitor are sequentially connected in series. One end of the third capacitor is connected to a first end of the sixth switch, and the other end of the third capacitor is separately connected to a first end of the fifth switch, the first end of the second switch, and one end of the second capacitor. The other end of the second capacitor is separately connected to the first end of the first switch, one end of the first capacitor, and the first end of the direct current-direct current converter, and the second end of the direct current-direct current converter is separately connected to one end of the target capacitor, the second end of the fourth switch, and a second end of the eighth switch. The other end of the first capacitor is connected to the third end of the direct current-direct current converter, and the fourth end of the direct current-direct current converter is separately connected to the other end of the target capacitor, the second end of the third switch, and a second end of the seventh switch. The first switch is connected in series to the third switch, the second switch is connected in series to the fourth switch, one end of the first resonant cavity is separately connected to the second end of the first switch and the first end of the third switch, and the other end of the first resonant cavity is separately connected to the second end of the second switch and the first end of the fourth switch. The fifth switch is connected in series to the seventh switch, the sixth switch is connected in series to the eighth switch, one end of the second resonant cavity is separately connected to a second end of the fifth switch and a first end of the seventh switch, and the other end of the second resonant cavity is separately connected to a second end of the sixth switch and a first end of the eighth switch.

In this possible implementation, the first capacitor, the second capacitor, and the third capacitor are sequentially connected in series, and a conduction status of each switch in the first resonant circuit and the second resonant circuit is controlled, so that the first capacitor may perform energy transmission with the second capacitor by using the first resonant circuit and perform energy transmission with the third capacitor by using the second resonant circuit, thereby balancing voltages at both ends of capacitors. Each resonant circuit may convert partial power and power conversion efficiency may be high. Further, a threefold transformation ratio is obtained based on a quantity 3 of capacitors of the capacitor module and the series voltage division principle. That is, a voltage gain is 3:1 or 1:3. In addition, the startup module is used to implement the closed loop and the stable output voltage, to ensure slow startup of the conversion circuit.

Optionally, in a possible implementation of the first aspect, in the foregoing structure, the capacitor module further includes a third capacitor, the first resonant capacitor is connected in series to the first resonant inductor, and the second resonant capacitor is connected in series to the second resonant inductor. A first end of the sixth switch is connected to one end of the third capacitor, and the fifth switch is separately connected to one end of the second capacitor and the first end of the second switch. The other end of the second capacitor is separately connected to the first end of the first switch, one end of the first capacitor, and the first end of the direct current-direct current converter, and the second end of the direct current-direct current converter is separately connected to one end of the target capacitor, the second end of the fourth switch, and a second end of the eighth switch. The other end of the first capacitor is separately connected to the other end of the third capacitor and the third end of the direct current-direct current converter, and the fourth end of the direct current-direct current converter is separately connected to the other end of the target capacitor, the second end of the third switch, and a second end of the seventh switch. The first switch is connected in series to the third switch, the second switch is connected in series to the fourth switch, one end of the first resonant cavity is separately connected to the second end of the first switch and the first end of the third switch, and the other end of the first resonant cavity is separately connected to the second end of the second switch and the first end of the fourth switch. The fifth switch is connected in series to the seventh switch, the sixth switch is connected in series to the eighth switch, one end of the second resonant cavity is separately connected to a second end of the fifth switch and a first end of the seventh switch, and the other end of the second resonant cavity is separately connected to a second end of the sixth switch and a first end of the eighth switch.

In this possible implementation, the first capacitor, the second capacitor, and the second resonant capacitor are sequentially connected in series, and a conduction status of each switch in the first resonant circuit and the second resonant circuit is controlled, so that the first capacitor may perform energy transmission with the second capacitor by using the first resonant circuit and perform energy transmission with the second resonant capacitor by using the second resonant circuit, thereby balancing voltages at both ends of capacitors. Each resonant circuit may convert partial power and power conversion efficiency may be high. Further, a threefold transformation ratio is obtained based on a quantity 2 of capacitors of the capacitor module, a quantity 1 of second resonant capacitors, and the series voltage division principle. That is, a voltage gain is 3:1 or 1:3. In addition, the startup module is used to implement the closed loop and the stable output voltage, to ensure slow startup of the conversion circuit.

Optionally, in a possible implementation of the first aspect, in the foregoing structure, the conversion circuit further includes a direct current power supply, the first resonant capacitor is connected in series to the first resonant inductor, and the second resonant capacitor is connected in series to the second resonant inductor. A first end of the sixth switch is connected to one end of the direct current power supply, and the fifth switch is separately connected to one end of the second capacitor and the first end of the second switch. The other end of the second capacitor is separately connected to the first end of the first switch, one end of the first capacitor, and the first end of the direct current-direct current converter, and the second end of the direct current-direct current converter is separately connected to one end of the target capacitor, the second end of the fourth switch, and a second end of the eighth switch. The other end of the first capacitor is separately connected to the other end of the direct current power supply and the third end of the direct current-direct current converter, and the fourth end of the direct current-direct current converter is separately connected to the other end of the target capacitor, the second end of the third switch, and a second end of the seventh switch. The first switch is connected in series to the third switch, the second switch is connected in series to the fourth switch, one end of the first resonant cavity is separately connected to the second end of the first switch and the first end of the third switch, and the other end of the first resonant cavity is separately connected to the second end of the second switch and the first end of the fourth switch. The fifth switch is connected in series to the seventh switch, the sixth switch is connected in series to the eighth switch, one end of the second resonant cavity is separately connected to a second end of the fifth switch and a first end of the seventh switch, and the other end of the second resonant cavity is separately connected to a second end of the sixth switch and a first end of the eighth switch.

In this possible implementation, a conversion circuit that may implement a threefold transformation ratio and may be slowly started is provided.

Optionally, in a possible implementation of the first aspect, in the foregoing structure, the capacitor module further includes a fourth capacitor, the balancing module further includes a third resonant circuit, and the third resonant circuit includes at least two groups of switches connected in parallel to each other and a third resonant cavity connected between the two groups of switches. One group of switches in the two groups of switches in the third resonant circuit includes at least a ninth switch and an eleventh switch, and the other group of switches in the two groups of switches in the third resonant circuit includes at least a tenth switch and a twelfth switch. The third resonant cavity includes at least a third resonant capacitor and a third resonant inductor. The third resonant circuit is separately connected to both ends of the first capacitor and the fourth capacitor by using the startup module. The balancing module balances voltages at both ends of the first capacitor and the fourth capacitor by controlling the switches in the third resonant circuit in conjunction with influence of the third resonant cavity on a current. The ninth switch and the eleventh switch are not simultaneously turned on, and the tenth switch and the twelfth switch are not simultaneously turned on.

In this possible implementation, a conversion circuit that may implement a fourfold transformation ratio and may be slowly started is provided.

Optionally, in a possible implementation of the first aspect, in the foregoing structure, the balancing module further includes a third resonant circuit, and the third resonant circuit includes at least two groups of switches connected in parallel to each other and a third resonant cavity connected between the two groups of switches. One group of switches in the two groups of switches in the third resonant circuit includes at least a ninth switch and an eleventh switch, and the other group of switches in the two groups of switches in the third resonant circuit includes at least a tenth switch and a twelfth switch. The third resonant cavity includes at least a third resonant capacitor and a third resonant inductor. The balancing module balances voltages at both ends of the first capacitor and the third resonant capacitor by controlling the switches in the third resonant circuit in conjunction with influence of the third resonant cavity on a current. The ninth switch and the eleventh switch are not simultaneously turned on, and the tenth switch and the twelfth switch are not simultaneously turned on.

In this possible implementation, a conversion circuit that may implement a fourfold transformation ratio and may be slowly started is provided.

Optionally, in a possible implementation of the first aspect, in the foregoing structure, the third resonant capacitor is connected in series to the third resonant inductor, and the first capacitor, the second capacitor, the third capacitor, and the fourth capacitor are sequentially connected in series. One end of the fourth capacitor is connected to a first end of the tenth switch, the other end of the fourth capacitor is separately connected to a first end of the ninth switch, the first end of the sixth switch, and one end of the third capacitor, and the other end of the third capacitor is separately connected to the first end of the fifth switch, the first end of the second switch, and one end of the second capacitor. The other end of the second capacitor is separately connected to the first end of the first switch, one end of the first capacitor, and the first end of the direct current-direct current converter, and the second end of the direct current-direct current converter is separately connected to one end of the target capacitor, the second end of the fourth switch, the second end of the eighth switch, and a second end of the twelfth switch. The other end of the first capacitor is connected to the third end of the direct current-direct current converter, and the fourth end of the direct current-direct current converter is separately connected to the other end of the target capacitor, the second end of the third switch, the second end of the seventh switch, and a second end of the eleventh switch. The ninth switch is connected in series to the eleventh switch, the tenth switch is connected in series to the twelfth switch, one end of the third resonant cavity is separately connected to a second end of the ninth switch and a first end of the eleventh switch, and the other end of the third resonant cavity is separately connected to a second end of the tenth switch and a first end of the twelfth switch.

In this possible implementation, the first capacitor, the second capacitor, the third capacitor, and the fourth capacitor are sequentially connected in series, and a conduction status of each switch in the first resonant circuit and the second resonant circuit is controlled, so that the first capacitor may perform energy transmission with the second capacitor by using the first resonant circuit, perform energy transmission with the third capacitor by using the second resonant circuit, and perform energy transmission with the fourth capacitor by using the third resonant circuit, thereby balancing voltages at both ends of capacitors. Each resonant circuit may convert partial power and power conversion efficiency may be high. Further, a fourfold transformation ratio is obtained based on a quantity 4 of capacitors of the capacitor module and the series voltage division principle. That is, a voltage gain is 4:1 or 1:4. In addition, the startup module is used to implement the closed loop and the stable output voltage, to ensure slow startup of the conversion circuit.

Optionally, in a possible implementation of the first aspect, in the foregoing structure, the capacitor module further includes a fourth capacitor, and the third resonant capacitor is connected in series to the third resonant inductor. A first end of the tenth switch is connected to one end of the fourth capacitor, the ninth switch is separately connected to the first end of the sixth switch and one end of the third capacitor, and the other end of the third capacitor is separately connected to the first end of the fifth switch, the first end of the second switch, and one end of the second capacitor. The other end of the second capacitor is separately connected to the first end of the first switch, one end of the first capacitor, and the first end of the direct current-direct current converter, and the second end of the direct current-direct current converter is separately connected to one end of the target capacitor, the second end of the fourth switch, the second end of the eighth switch, and a second end of the twelfth switch. The other end of the first capacitor is separately connected to the other end of the fourth capacitor and the third end of the direct current-direct current converter, and the fourth end of the direct current-direct current converter is separately connected to the other end of the target capacitor, the second end of the third switch, the second end of the seventh switch, and a second end of the eleventh switch. The ninth switch is connected in series to the eleventh switch, the tenth switch is connected in series to the twelfth switch, one end of the third resonant cavity is separately connected to a second end of the ninth switch and a first end of the eleventh switch, and the other end of the third resonant cavity is separately connected to a second end of the tenth switch and a first end of the twelfth switch.

In this possible implementation, a conversion circuit that may implement a fourfold transformation ratio and may be slowly started is provided.

Optionally, in a possible implementation of the first aspect, in the foregoing structure, the conversion circuit further includes a direct current power supply, and the third resonant capacitor is connected in series to the third resonant inductor. A first end of the tenth switch is connected to one end of the direct current power supply, the ninth switch is separately connected to the first end of the sixth switch and one end of the third capacitor, and the other end of the third capacitor is separately connected to the first end of the fifth switch, the first end of the second switch, and one end of the second capacitor. The other end of the second capacitor is separately connected to the first end of the first switch, one end of the first capacitor, and the first end of the direct current-direct current converter, and the second end of the direct current-direct current converter is separately connected to one end of the target capacitor, the second end of the fourth switch, the second end of the eighth switch, and a second end of the twelfth switch. The other end of the first capacitor is separately connected to the other end of the direct current power supply and the third end of the direct current-direct current converter, and the fourth end of the direct current-direct current converter is separately connected to the other end of the target capacitor, the second end of the third switch, the second end of the seventh switch, and a second end of the eleventh switch. The ninth switch is connected in series to the eleventh switch, the tenth switch is connected in series to the twelfth switch, one end of the third resonant cavity is separately connected to a second end of the ninth switch and a first end of the eleventh switch, and the other end of the third resonant cavity is separately connected to a second end of the tenth switch and a first end of the twelfth switch.

In this possible implementation, a conversion circuit that may implement a fourfold transformation ratio and may be slowly started is provided.

Optionally, in a possible implementation of the first aspect, in the foregoing structure, a voltage at both ends of the target capacitor is an output voltage, and a voltage at both ends of the capacitor module is an input voltage.

In this possible implementation, the voltage at both ends of the target capacitor is the output voltage, and the voltage at both ends of the capacitor module is the input voltage, so that the conversion circuit may implement voltage step-down.

Optionally, in a possible implementation of the first aspect, in the foregoing structure, a voltage at both ends of the target capacitor is an input voltage, and a voltage at both ends of the capacitor module is an output voltage.

In this possible implementation, the voltage at both ends of the target capacitor is the input voltage, and the voltage at both ends of the capacitor module is the output voltage, so that the conversion circuit may implement voltage step-up.

Optionally, in a possible implementation of the first aspect, in the foregoing structure, the switch is an insulated gate bipolar transistor IGBT.

In this possible implementation, a feasible solution of the conversion circuit is provided.

Optionally, in a possible implementation of the first aspect, in the foregoing structure, the switch is an N-channel enhanced insulated gate field-effect transistor NMOS.

In this possible implementation, a feasible solution of the conversion circuit is provided.

Optionally, in a possible implementation of the first aspect, in the foregoing structure, the first switch and the third switch are diodes, and the second switch and the fourth switch are N-channel enhanced insulated gate field-effect transistors NMOSs.

In this possible implementation, a feasible solution of the conversion circuit is provided.

Optionally, in a possible implementation of the first aspect, in the foregoing structure, the first switch, the third switch, the fifth switch, and the seventh switch are diodes, and the second switch, the fourth switch, the sixth switch, and the eighth switch are N-channel enhanced insulated gate field-effect transistors NMOSs.

In this possible implementation, a feasible solution of the conversion circuit is provided.

Optionally, in a possible implementation of the first aspect, in the foregoing structure, the direct current-direct current converter includes a first startup switch, a second startup switch, and a startup inductor.

In this possible implementation, a feasible solution of the conversion circuit is provided. A second aspect of embodiments provides an electronic device, including the conversion circuit according to any one of the first aspect or the possible implementations of the first aspect.

DETAILED DESCRIPTION OF THE EMBODIMENTS

The embodiments may provide a conversion circuit to balance voltages at both ends of capacitors and implement different transformation ratios.

Figure 1:
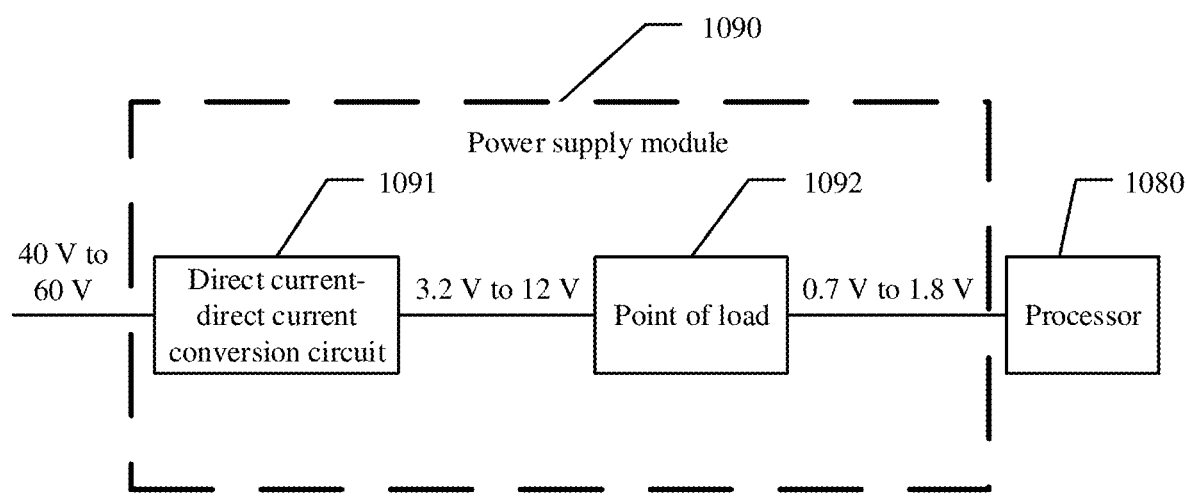
FIG. 1 is a schematic diagram of an architecture of a power supply module according to an embodiment.

It should be understood that the conversion circuit in the embodiments may be applied to any direct current conversion scenario, and may be applied to a power supply module. FIG. 1 is a schematic diagram of an architecture of a power supply module according to an embodiment. As shown in FIG. 1, the power supply module 1090 includes a direct current-direct current conversion circuit 1091, a point of load (POL) 1092, and the like.

A main function of the direct current-direct current conversion circuit 1091 is to convert an input voltage 40 V to 60 V into 3.2 V to 12 V, and transmit the input voltage to the POL by using a bus.

A main function of the POL 1092 is to convert 3.2 V to 12 V into 0.7 V to 1.8 V, and supply power to a processor 1080.

The conversion circuit in embodiments may include two types: buck and boost, which are separately described below.

I. Buck (a voltage at both ends of a first capacitor is an output voltage, and a voltage at both ends of a capacitor module is an input voltage)

Figure 2:
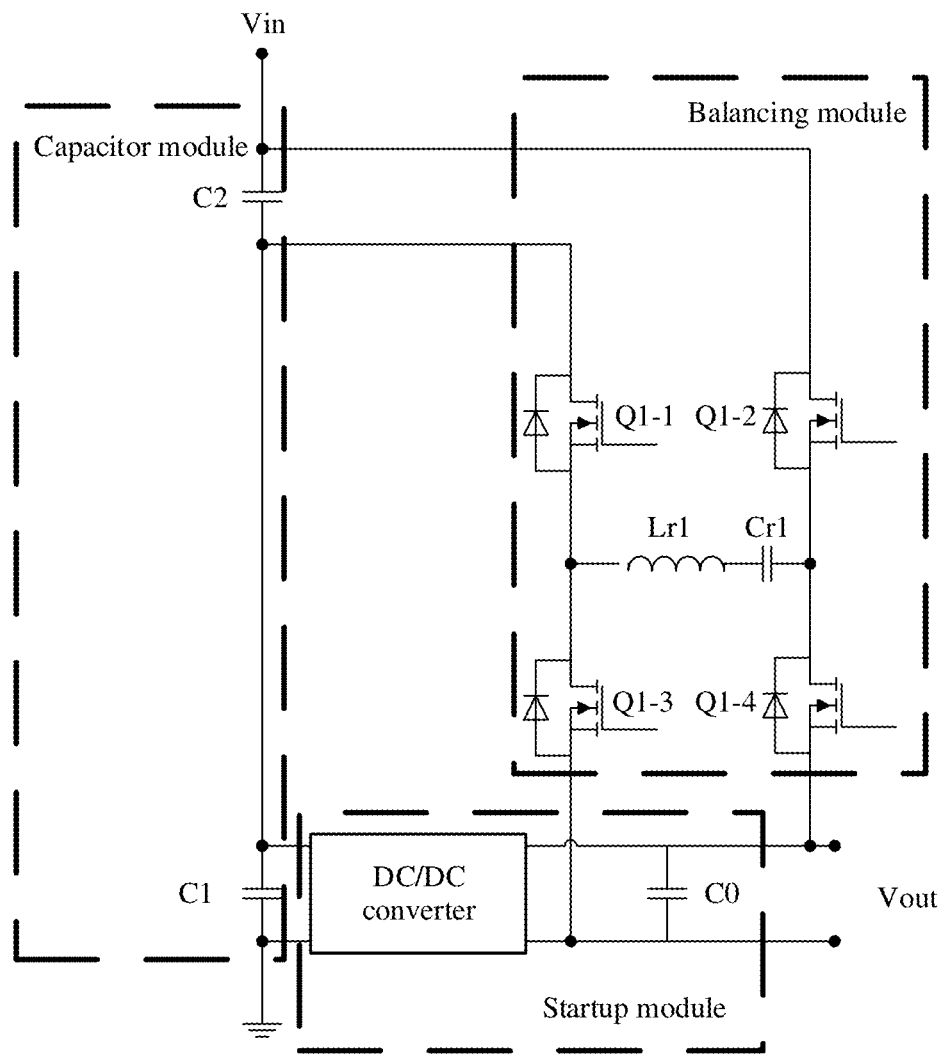
FIG. 2 is a schematic diagram of a first embodiment of a conversion circuit according to an embodiment.

As shown in FIG. 2, a conversion circuit provided in an embodiment may include a capacitor module, a balancing module, and a startup module.

The capacitor module includes a first capacitor C1 and a second capacitor C2. The balancing module includes a first resonant circuit. The startup module includes a direct current-direct current converter (that is, a DC/DC converter, referred to as a converter) and a target capacitor C0. The first resonant circuit includes at least two groups of switches connected in parallel to each other and a first resonant cavity connected between the two groups of switches. One group of switches in the two groups of switches in the first resonant circuit includes a first switch Q1-1 and a third switch Q1-3, and the other group of switches in the two groups of switches in the first resonant circuit includes a second switch Q1-2 and a fourth switch Q1-4. The first resonant cavity includes at least a first resonant capacitor Cr1 and a first resonant inductor Lr1. The first capacitor C1 is connected in series to the second capacitor C2, and the first capacitor C1 is connected in parallel to the target capacitor C0. The first switch Q1-1 is connected in series to the third switch Q1-3, and the second switch Q1-2 is connected in series to the fourth switch Q1-4. One end of the second capacitor C2 is connected to a first end of the second switch Q1-2, and the other end of the second capacitor C2 is separately connected to a first end of the first switch Q1-1, a first end of the converter, and one end of the first capacitor C1. A second end of the converter is separately connected to one end of the target capacitor C0 and a second end of the fourth switch Q1-4. The other end of the first capacitor C1 is connected to a third end of the direct current-direct current converter, and a fourth end of the converter is separately connected to a second end of the third switch Q1-3 and the other end of the target capacitor C0. One end of the first resonant cavity is separately connected to a second end of the first switch Q1-1 and a first end of the third switch Q1-3, and the other end of the first resonant cavity is separately connected to a second end of the second switch Q1-2 and a first end of the fourth switch Q1-4. The balancing module balances voltages at both ends of the first capacitor C1 and the second capacitor C2 by controlling turn-on or turn-off of the switches.

In this embodiment, the first resonant cavity may include the first resonant capacitor Cr1 and the first resonant inductor Lr1 that are connected in series; or may include the first resonant capacitor Cr1 and the first resonant inductor Lr1 that are connected in series, and another capacitor connected to both ends of the first resonant inductor Lr1 as a whole. There are other types of equivalent forms. This is not limited herein.

Figure 3:
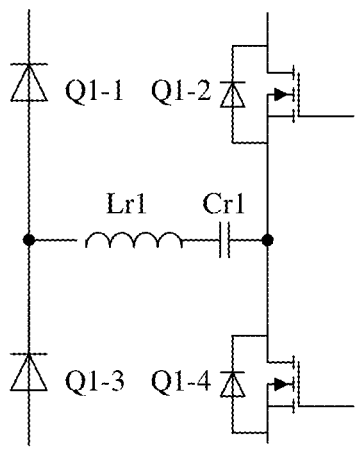
FIG. 3 is an equivalent diagram of a resonant circuit according to an embodiment.

In this embodiment, an example in which the switch is an N-channel enhanced insulated gate field-effect transistor with a N-channel metal oxide semiconductor (NMOS) may be used for illustration. It may be understood that the switch may alternatively be a controllable component such as an insulated gate bipolar transistor (IGBT), a gallium nitride (GaN) power switch, or a silicon carbide (SiC) switch. For example, as shown in FIG. 3, the first switch and the third switch may alternatively be replaced with diodes. This is not limited herein.

The direct current-direct current converter in the startup module in this embodiment may have a plurality of forms, which are separately described below.

1. Buck Converter

Figure 4:
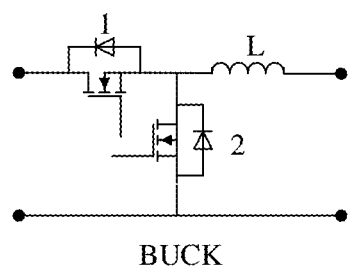
FIG. 4 is a schematic diagram of a first structure of a DC/DC converter according to an embodiment.

FIG. 4 is a schematic diagram of a structure of the direct current-direct current converter in the startup module.

Figure 5:
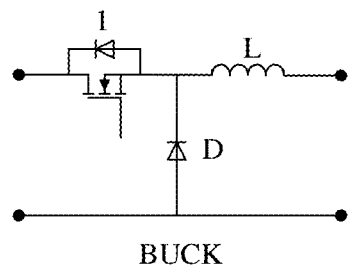
FIG. 5 is a schematic diagram of a second structure of a DC/DC converter according to an embodiment.

A first end of a switch 1 is a first end of the startup module, a second end of a switch 1 is separately connected to one end of an inductor L and a first end of a switch 2, and the other end of the inductor L is connected to a second end of the startup module. A second end of the switch 2 is separately connected to a third end and a fourth end of the startup module. As shown in FIG. 5, the switch 2 may be replaced with a diode D. This is not limited herein.

A closed loop in this embodiment may refer to detecting feedback on an output voltage Vo and adjusting a duty cycle of the DC/DC converter. This is equivalent to changing an input voltage of the DC/DC converter, so that the output voltage may be controlled. That BUCK is a DC/DC converter is used as an example. A duty cycle of BUCK is D, and in this case, Vo=(Vin−N*Vo)*D. N is a quantity of resonant cavities.

2. Boost Converter

Figure 6:
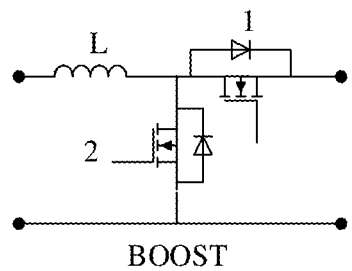
FIG. 6 is a schematic diagram of a third structure of a DC/DC converter according to an embodiment.

FIG. 6 is a schematic diagram of another structure of the direct current-direct current converter in the startup module.

Figure 7:
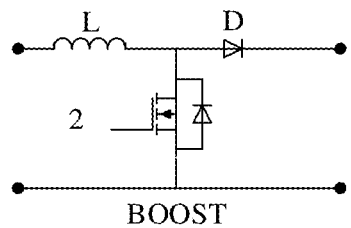
FIG. 7 is a schematic diagram of a fourth structure of a DC/DC converter according to an embodiment.

One end of an inductor L is a first end of the startup module, the other end of the inductor L is separately connected to a first end of a switch 1 and a first end of a switch 2, and a second end of the switch 1 is connected to a second end of the startup module. A second end of the switch 2 is separately connected to a third end and a fourth end of the startup module. As shown in FIG. 7, the switch 1 may be replaced with a diode D. This is not limited herein.

3. Buck-Boost Converter

Figure 8:
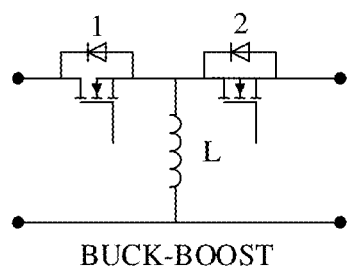
FIG. 8 is a schematic diagram of a fifth structure of a DC/DC converter according to an embodiment.

FIG. 8 is a schematic diagram of another structure of the direct current-direct current converter in the startup module.

Figure 9:
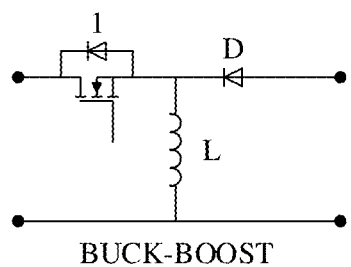
FIG. 9 is a schematic diagram of a sixth structure of a DC/DC converter according to an embodiment.

A first end of a switch 1 is a first end of the startup module, a second end of the switch 1 is separately connected to a first end of a switch 2 and one end of an inductor, and the switch 2 is connected to a second end of the startup module. The other end of the inductor is separately connected to a third end and a fourth end of the startup module. As shown in FIG. 9, the switch 2 may be replaced with a diode D. This is not limited herein.

Figure 10:
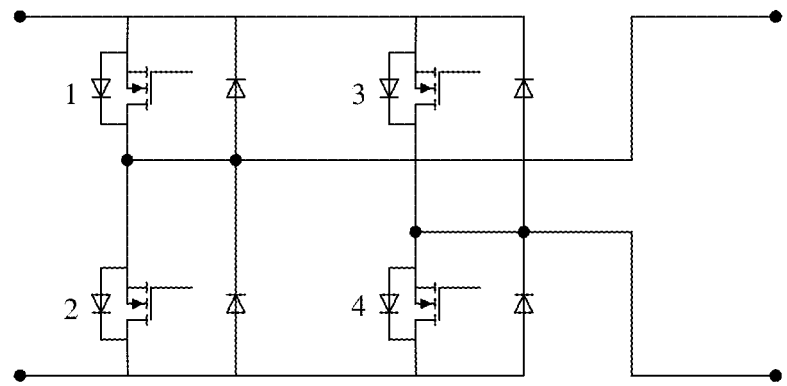
FIG. 10 is a schematic diagram of a seventh structure of a DC/DC converter according to an embodiment.

The direct current-direct current converter in the startup module in this embodiment may have a plurality of forms. The foregoing several forms are merely examples. In actual application, the direct current-direct current converter in the startup module may alternatively be in another form. For example, a circuit shown in FIG. 10 is also another form of the direct current-direct current converter in the startup module. This is not limited herein.

A complete cycle of the switches in the balancing module in this embodiment may include a first cycle and a second cycle, and the first cycle and the second cycle may account for half of the complete cycle of the switches. In actual application, the complete cycle may include the first cycle, a dead time, and the second cycle. This is not limited herein.

The following describes in detail a working principle of the conversion circuit shown in FIG. 2.

Figure 11:
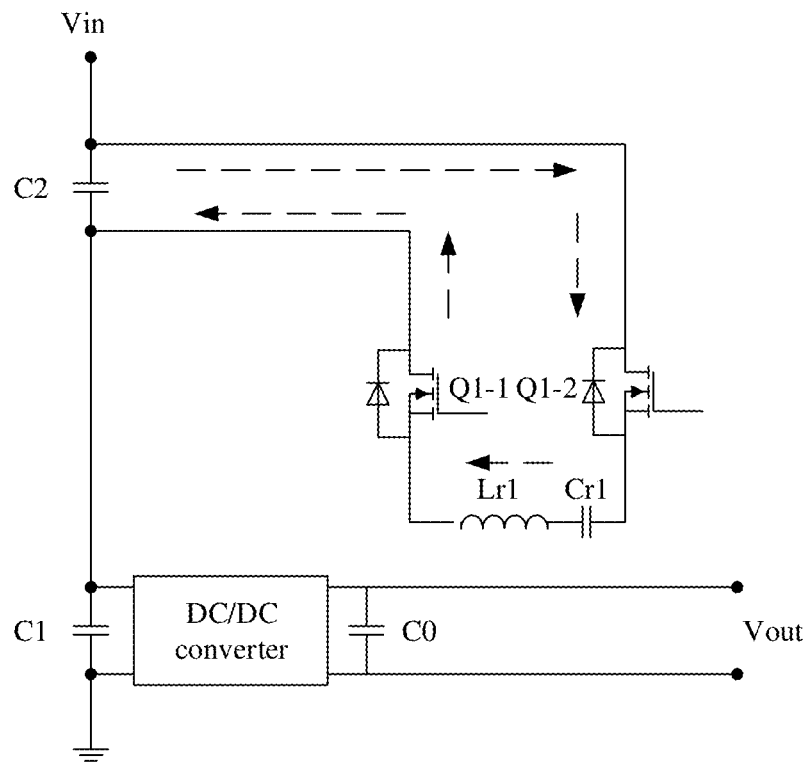
FIG. 11 is an equivalent diagram of a conversion circuit in a first cycle in a first embodiment according to an embodiment.

First Cycle:

FIG. 2 may be equivalent to FIG. 11, when the first switch Q1-1 and the second switch Q1-2 are turned on (a high level is input), and the third switch Q1-3 and the fourth switch Q1-4 are turned off (a low level is input). The second capacitor C2 transmits energy to the first resonant inductor Lr1 and the first resonant capacitor Cr1.

Figure 12:
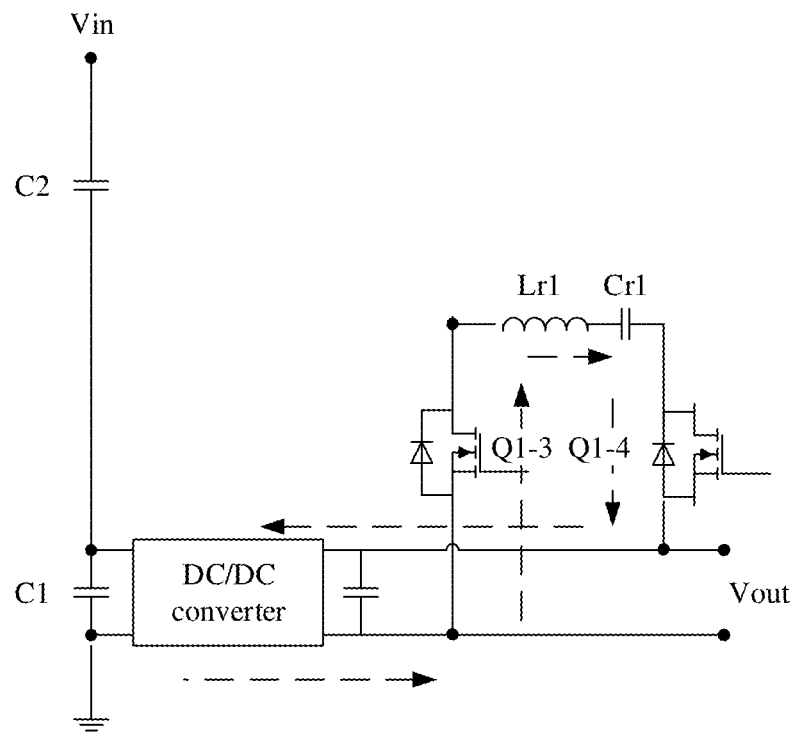
FIG. 12 is an equivalent diagram of a conversion circuit in a second cycle in a first embodiment according to an embodiment.

Second Cycle:

FIG. 2 may be equivalent to FIG. 12, when the third switch Q1-3 and the fourth switch Q1-4 are turned on (a high level is input), and the first switch Q1-1 and the second switch Q1-2 are turned off (a low level is input). The first resonant inductor Lr1 and the first resonant capacitor Cr1 charge the target capacitor C0 (that is, C0 is an output capacitor). In this case, the target capacitor C0 is the output capacitor. Because a duty cycle of a drive signal is close to 50%, a voltage of the target capacitor C0 (that is, the output capacitor C0) is equal to a voltage of the second capacitor C2. Based on a principle of series capacitor voltages, a voltage at both ends of the first capacitor C1 is input voltage Vin−Vo. In addition, the DC/DC converter works in a closed-loop manner, and when the input voltage Vin changes, a gain of the conversion circuit is controlled, that is, the input voltage of the DC/DC converter is equivalently controlled, to ensure that the output voltage of the conversion circuit remains stable (that is, equal to Vo).

In this embodiment, the balancing module may balance the voltages at both ends of the first capacitor and the second capacitor by controlling the switches in the first resonant circuit in conjunction with influence of the first resonant cavity on a current. Further, different transformation ratios are obtained based on a quantity of capacitors of the capacitor module and a series voltage division principle. In addition, on the one hand, because there is the converter, during power-on, the conversion circuit in this embodiment can normally implement slow startup (that is, the output voltage Vo can be controlled; actually, a power-on waveform and a voltage rising speed of Vo can be controlled). This effectively resolves a problem that a conventional resonant switched capacitor circuit cannot be controlled in a closed-loop manner and is not easy to implement slow startup. On the other hand, in case of overcurrent, the converter may be used to implement detection and protection.

For ease of understanding, different transformation ratios are separately described below.

1. A ratio of the input voltage to the output voltage is N:1.

The capacitor module of the conversion circuit in this embodiment may have a plurality of forms, which are separately described below.

1.1. The first capacitor C1, the second capacitor C2, and an $N^{th}$ capacitor Cn are sequentially connected in series.

Figure 13:
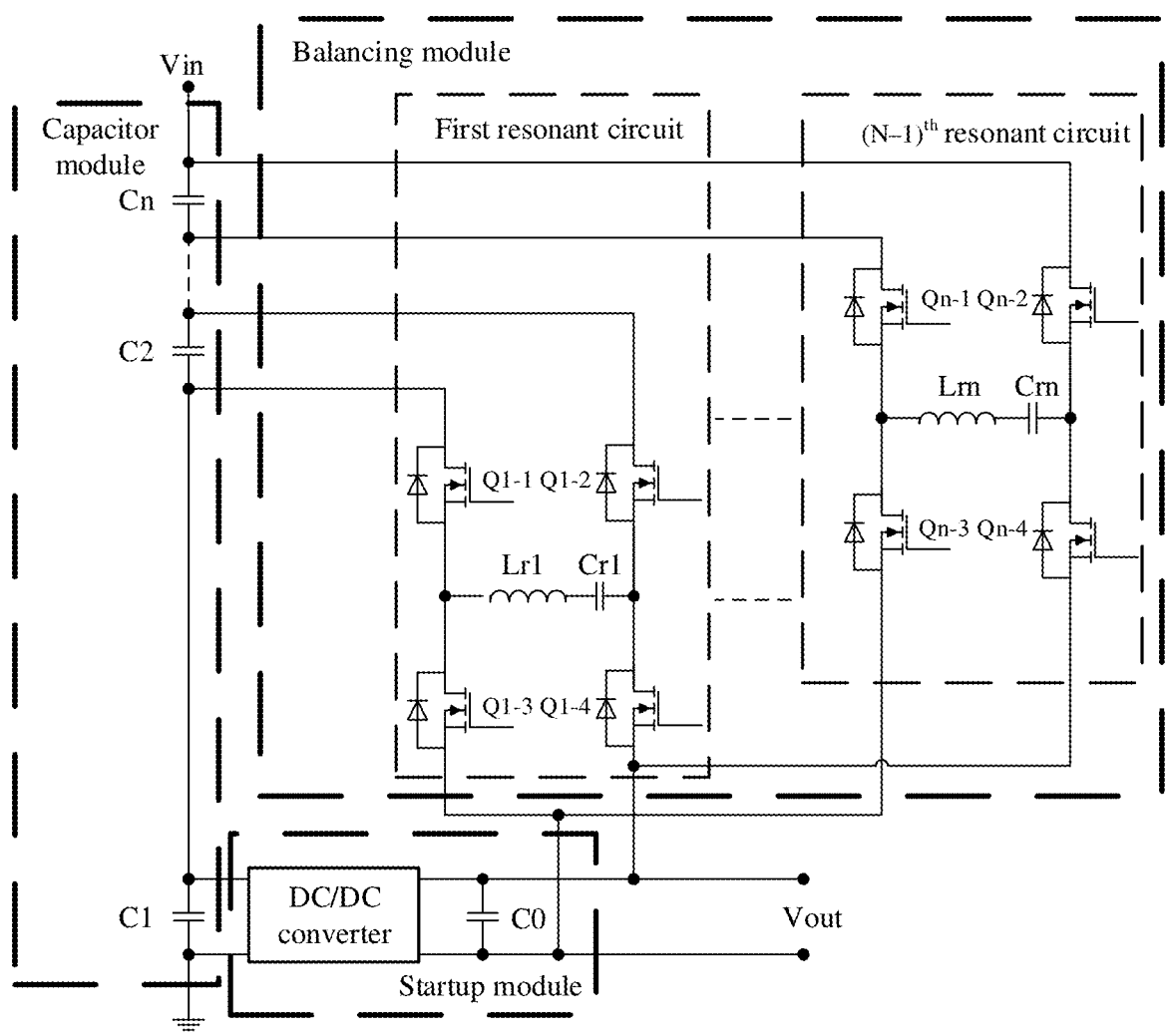
FIG. 13 is a schematic diagram of a second embodiment of a conversion circuit according to an embodiment.

FIG. 13 is a schematic diagram of a second embodiment of a conversion circuit according to an embodiment. An embodiment may provide a second embodiment of a conversion circuit, including a capacitor module, a balancing module, and a startup module.

The balancing module includes a first resonant circuit and an $(N-1)^{th}$ resonant circuit. The capacitor module includes a first capacitor C1, a second capacitor C2, and an $N^{th}$ capacitor Cn, where N is an integer greater than or equal to 3. The first resonant circuit includes at least four switches and a first resonant cavity. The four switches are respectively a first switch Q1-1, a second switch Q1-2, a third switch Q1-3, and a fourth switch Q1-4. The first resonant cavity includes a first resonant capacitor Cr1 and a first resonant inductor Lr1. The $(N-1)^{th}$ resonant circuit includes at least four switches and an $(N-1)^{th}$ resonant cavity. The four switches are respectively a fifth switch Qn-1, a sixth switch Qn-2, a seventh switch Qn-3, and an eighth switch Qn-4. The $(N-1)^{th}$ resonant cavity includes an $(N-1)^{th}$ resonant capacitor Crn and an $(N-1)^{th}$ resonant inductor Lrn. The startup module includes a converter and a target capacitor.

The first capacitor C1, the second capacitor C2, and the $N^{th}$ capacitor Cn are sequentially connected in series. The first switch Q1-1 is connected in series to the third switch Q1-3, and the second switch Q1-2 is connected in series to the fourth switch Q1-4. The fifth switch Qn-1 is connected in series to the seventh switch Qn-3, and the sixth switch Qn-2 is connected in series to the eighth switch Qn-4. One end of the $N^{th}$ capacitor Cn is connected to a first end of the sixth switch Qn-2, the other end of the $N^{th}$ capacitor Cn is connected to a first end of the fifth switch Qn-1, and the other end of the $N^{th}$ capacitor Cn is separately connected to one end of the second capacitor C2 and a first end of the second switch Q1-2. A plurality of capacitors and a plurality of resonant circuits may be included between the $N^{th}$ capacitor Cn and the second capacitor C2. The other end of the second capacitor C2 is separately connected to one end of the first capacitor C1, a first end of the first switch Q1-1, and a first end of the converter. A second end of the converter is separately connected to one end of the target capacitor C0, a second end of the fourth switch Q1-4, and a second end of the eighth switch Qn-4. The other end of the first capacitor C1 is connected to a third end of the converter, and a fourth end of the converter is separately connected to the other end of the target capacitor C0, a second end of the third switch Q1-3, and a second end of the seventh switch Qn-3.

One end of the first resonant cavity is separately connected to a second end of the first switch Q1-1 and a first end of the third switch Q1-3, and the other end of the first resonant cavity is separately connected to a second end of the second switch Q1-2 and a first end of the fourth switch Q1-4. One end of the $(N-1)^{th}$ resonant cavity is separately connected to a second end of the fifth switch Qn-1 and a first end of the seventh switch Qn-3, and the other end of the $(N-1)^{th}$ resonant cavity is separately connected to a second end of the sixth switch Qn-2 and a first end of the eighth switch Qn-4.

In this embodiment, the first resonant cavity may include the first resonant capacitor Cr1 and the first resonant inductor Lr1 that are connected in series; or may include the first resonant capacitor Cr1 and the first resonant inductor Lr1 that are connected in series, and another capacitor connected to both ends of the first resonant inductor Lr1 as a whole. There are other types of equivalent forms. This is not limited herein. The $(N-1)^{th}$ resonant cavity may include the $(N-1)^{th}$ resonant capacitor Crn and the $(N-1)^{th}$ resonant inductor Lrn that are connected in series; or may include the $(N-1)^{th}$ resonant capacitor Crn and the $(N-1)^{th}$ resonant inductor Lrn that are connected in series, and another capacitor connected to both ends of the $(N-1)^{th}$ resonant inductor Lrn as a whole. There are other types of equivalent forms. This is not limited herein.

In this embodiment, when the switch is an NMOS, a first end of the switch is a drain electrode of the NMOS, a second end of the switch is a source electrode of the NMOS, a third end of the switch is a gate electrode of the NMOS, and the gate electrode is connected to a drive signal. The drive signal may be a pulse width modulation (PWM) signal. This is not limited herein.

In this embodiment, a duty cycle of driving of each switch is close to 50%, that is, a turn-on time of each switch is approximately half of one cycle, and the switch works at a resonance frequency of the resonant cavity or near the resonance frequency. It may be understood that, in actual application, a dead time needs to be reserved for an actual circuit, and therefore the duty cycle may be approximately 50%.

For ease of understanding, Table 1 is shown:

TABLE 1

| Switch | Q1-1 | Q1-2 | Q1-3 | Q1-4 | Qn-1 | Qn-2 | Qn-3 | Qn-4 |
|---|---|---|---|---|---|---|---|---|
| State 1 | 1 | 1 | 0 | 0 | 1 | 1 | 0 | 0 |
| State 2 | 1 | 1 | 0 | 0 | 0 | 0 | 1 | 1 |

TABLE 1-continued

| Switch  | Q1-1 | Q1-2 | Q1-3 | Q1-4 | Qn-1 | Qn-2 | Qn-3 | Qn-4 |
|---------|------|------|------|------|------|------|------|------|
| State 3 | 0    | 0    | 1    | 1    | 0    | 0    | 1    | 1    |
| State 4 | 0    | 0    | 1    | 1    | 1    | 1    | 0    | 0    |

Turn-on is 1, and turn-off is 0. The state 1 and the state 3 indicate that driving of each resonant circuit is in-phase (synchronous turn-on and turn-off), and the state 2 and the state 4 indicate that driving of each resonant circuit is out-of-phase (staggered turn-on and turn-off).

It may be understood that Table 1 is merely an example to illustrate turn-on and turn-off states of the switches. In actual application, when the first switch Q1-1 is turned on, the fifth switch Qn-1 may also be turned on. The four states described in Table 1 are not all states. The first switch Q1-1 and the third switch Q1-3 cannot be simultaneously turned on, the second switch Q1-2 and the fourth switch Q1-4 cannot be simultaneously turned on, the fifth switch Qn-1 and the seventh switch Qn-3 cannot be simultaneously turned on, and the sixth switch Qn-2 and the eighth switch Qn-4 cannot be simultaneously turned on. Other states are acceptable. Table 1 is merely an example and cannot be used as a limitation.

In this embodiment, when the input voltage Vin is connected to both ends of the capacitor module, and the output voltage Vo is the voltage at both ends of the first capacitor C1, a conduction status of each switch is controlled, so that the first capacitor C1 may separately perform energy transmission with the second capacitor and the $N^{th}$ capacitor Cn by using each resonant circuit, thereby balancing voltages at both ends of capacitors. Each resonant circuit may convert partial power and power conversion efficiency may be high. Further, a voltage gain N:1 is obtained based on a series voltage division principle of N capacitors of the capacitor module. In addition, on the one hand, because there is the converter, during power-on, the conversion circuit in this embodiment can normally implement slow startup. This effectively resolves a problem that a conventional resonant switched capacitor circuit cannot be controlled in a closed-loop manner and is not easy to implement slow startup. On the other hand, in case of overcurrent, the converter may be used to implement detection and protection.

1.2. The first capacitor C1 and the second capacitor C2 are connected in series and then connected in parallel to the $N^{th}$ capacitor Cn.

Figure 14:
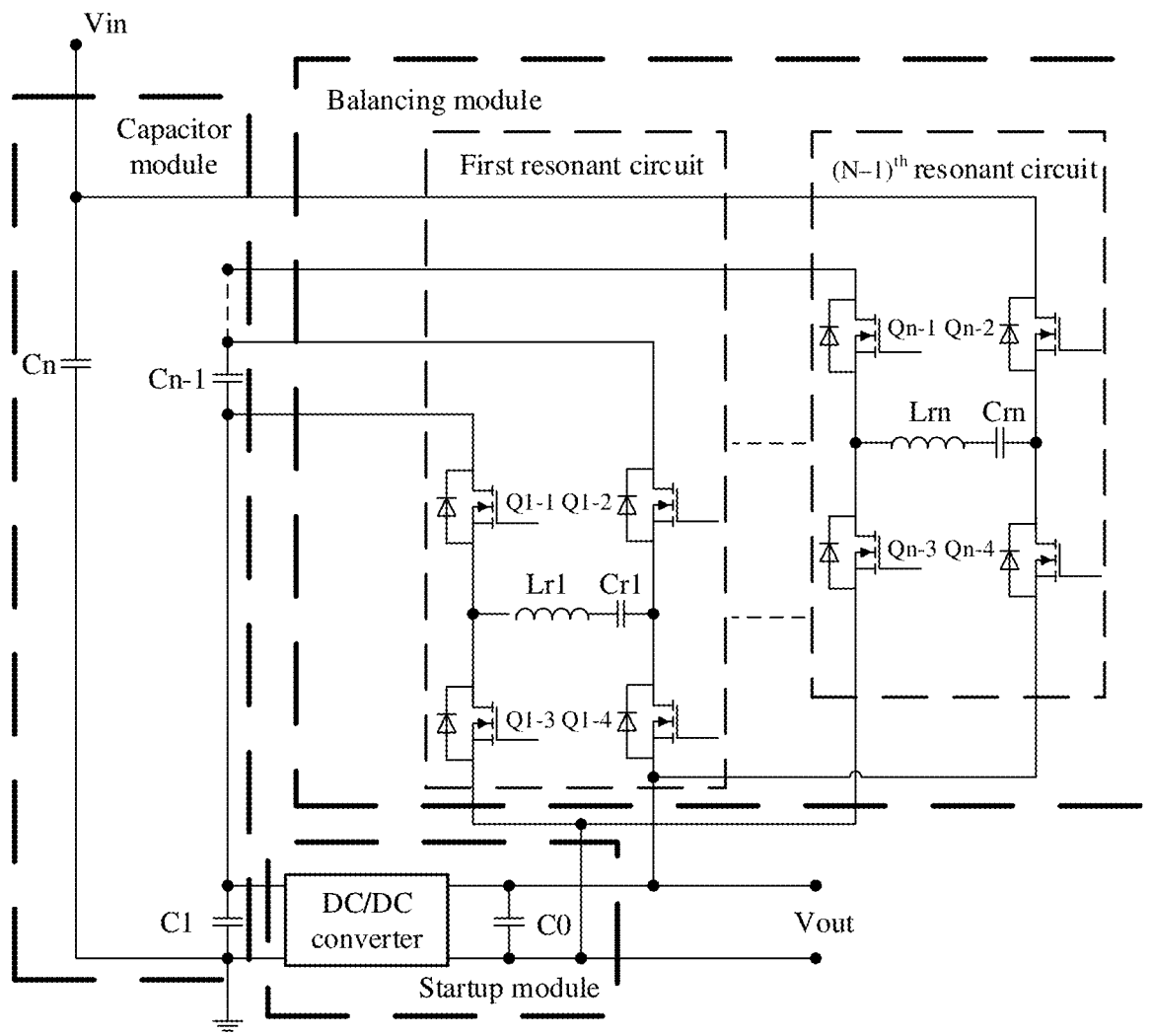
FIG. 14 is a schematic diagram of a third embodiment of a conversion circuit according to an embodiment.

FIG. 14 is a schematic diagram of a third embodiment of a conversion circuit according to an embodiment. An embodiment may provide a third embodiment of a conversion circuit. Components in this embodiment are similar to the components corresponding to FIG. 13, and details are not described herein. A difference lies in a connection manner of the $N^{th}$ capacitor Cn. The following describes a structure.

The first capacitor C1 and an $(N-1)^{th}$ capacitor Cn-1 are sequentially connected in series. One end of the $N^{th}$ capacitor Cn is connected to a first end of the sixth switch Qn-2, and the other end of the $N^{th}$ capacitor Cn is connected to the other end of the first capacitor C1. One end of the $(N-1)^{th}$ capacitor Cn-1 is connected to a first end of the fifth switch Qn-1, and a plurality of capacitors and a plurality of resonant circuits may be included between the first end of the fifth switch Qn-1 and the one end of the $(N-1)^{th}$ capacitor Cn-1. The one end of the $(N-1)^{th}$ capacitor Cn-1 is further connected to a first end of the second switch Q1-2, and the other end of the $(N-1)^{th}$ capacitor Cn-1 is separately connected to a first end of the first switch Q1-1, one end of the first capacitor C1, and a first end of the converter. A second end of the converter is separately connected to one end of the target capacitor C0, a second end of the fourth switch Q1-4, and a second end of the eighth switch Qn-4. The other end of the first capacitor C1 is separately connected to the other end of the $N^{th}$ capacitor Cn and a third end of the converter, and a fourth end of the converter is separately connected to the other end of the target capacitor C0, a second end of the third switch Q1-3, and a second end of the seventh switch Qn-3.

In this embodiment, when the input voltage Vin is connected to both ends of the capacitor module, and the output voltage Vo is the voltage at both ends of the first capacitor C1, the circuit is a buck circuit, and a conduction status of each switch is controlled, so that the first capacitor C1 may separately perform energy transmission with the $(N-1)^{th}$ capacitor Cn-1 and the $(N-1)^{th}$ resonant capacitor Crn by using each resonant circuit, thereby balancing voltages at both ends of capacitors. Each resonant circuit may convert partial power and power conversion efficiency may be high. Further, a voltage gain N:1 is obtained based on a series voltage division principle of N-1 capacitors of the capacitor module and the $N^{th}$ resonant capacitor Crn. In addition, on the one hand, because there is the converter, during power-on, the conversion circuit in this embodiment can normally implement slow startup. This effectively resolves a problem that a conventional resonant switched capacitor circuit cannot be controlled in a closed-loop manner and is not easy to implement slow startup. On the other hand, in case of overcurrent, the converter may be used to implement detection and protection.

1.3. The first capacitor C1 and the $(N-1)^{th}$ capacitor Cn-1 are connected in series and then connected in parallel to a direct current power supply V_dc.

Figure 15:
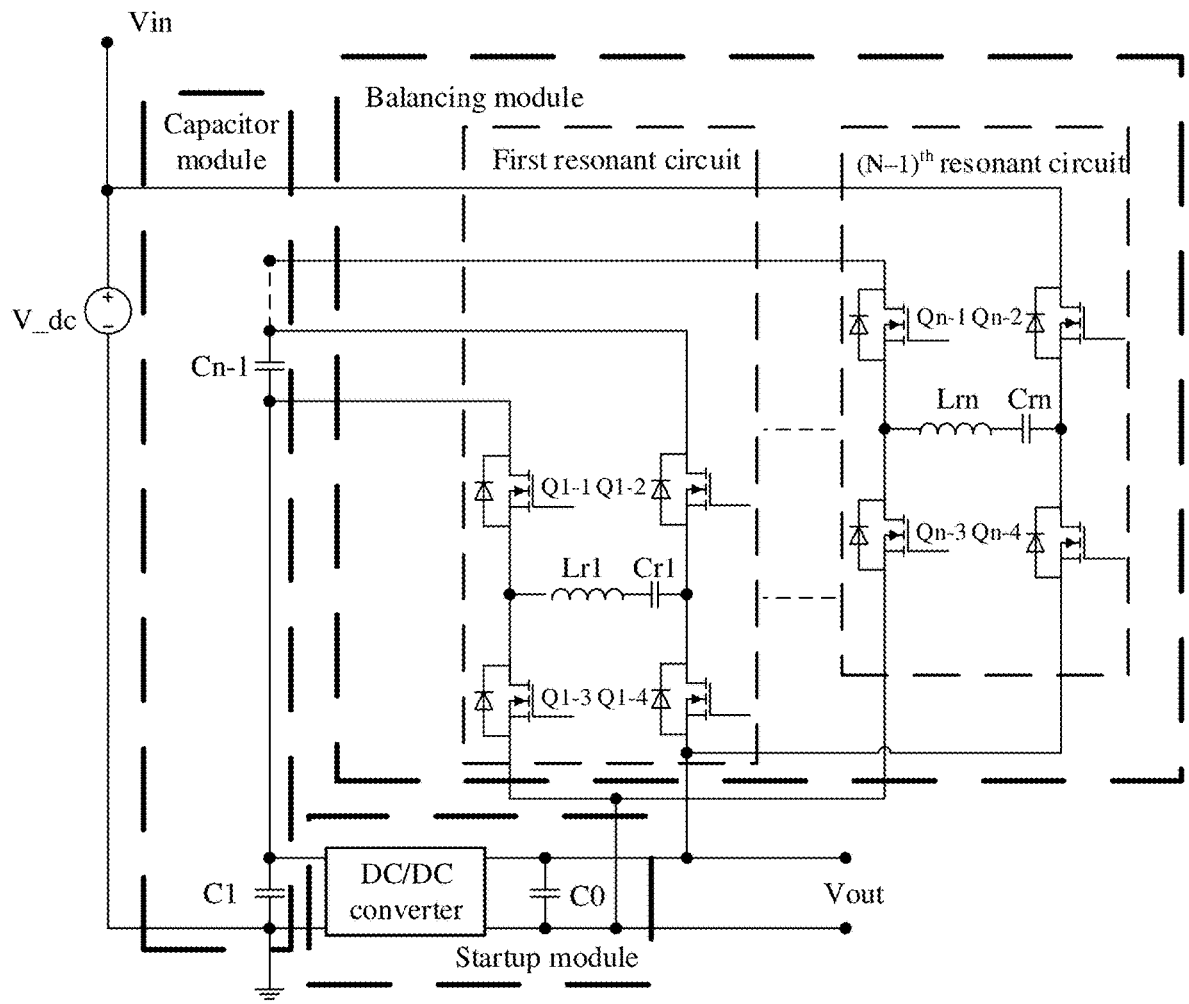
FIG. 15 is a schematic diagram of a fourth embodiment of a conversion circuit according to an embodiment.

FIG. 15 is a schematic diagram of a fourth embodiment of a conversion circuit according to an embodiment. Components in this embodiment are similar to the components corresponding to FIG. 14, and details are not described herein. A difference lies in that the $N^{th}$ capacitor Cn is replaced with the direct current power supply V_dc (as shown in FIG. 15).

In this embodiment, when the input voltage Vin is connected to both ends of the capacitor module, and the output voltage Vo is the voltage at both ends of the first capacitor C1, the circuit is a buck circuit, and a conduction status of each switch is controlled, so that the first capacitor C1 may separately perform energy transmission with the $(N-1)^{th}$ capacitor Cn-1 and the $N^{th}$ resonant capacitor Crn by using each resonant circuit, thereby balancing voltages at both ends of capacitors. Further, a voltage gain N:1 is obtained based on a series voltage division principle of N-1 capacitors of the capacitor module and the $N^{th}$ resonant capacitor Crn. In addition, on the one hand, because there is the converter, during power-on, the conversion circuit in this embodiment can normally implement slow startup. This effectively resolves a problem that a conventional resonant switched capacitor circuit cannot be controlled in a closed-loop manner and is not easy to implement slow startup. On the other hand, in case of overcurrent, the converter may be used to implement detection and protection.

For ease of understanding, the following uses N=3 as an example for detailed description.

2. A ratio of the input voltage to the output voltage is 3:1.

The capacitor module of the conversion circuit in this embodiment may have a plurality of forms, which are separately described below.

2.1. The first capacitor C1, the second capacitor C2, and a third capacitor C3 are sequentially connected in series.

Figure 16:
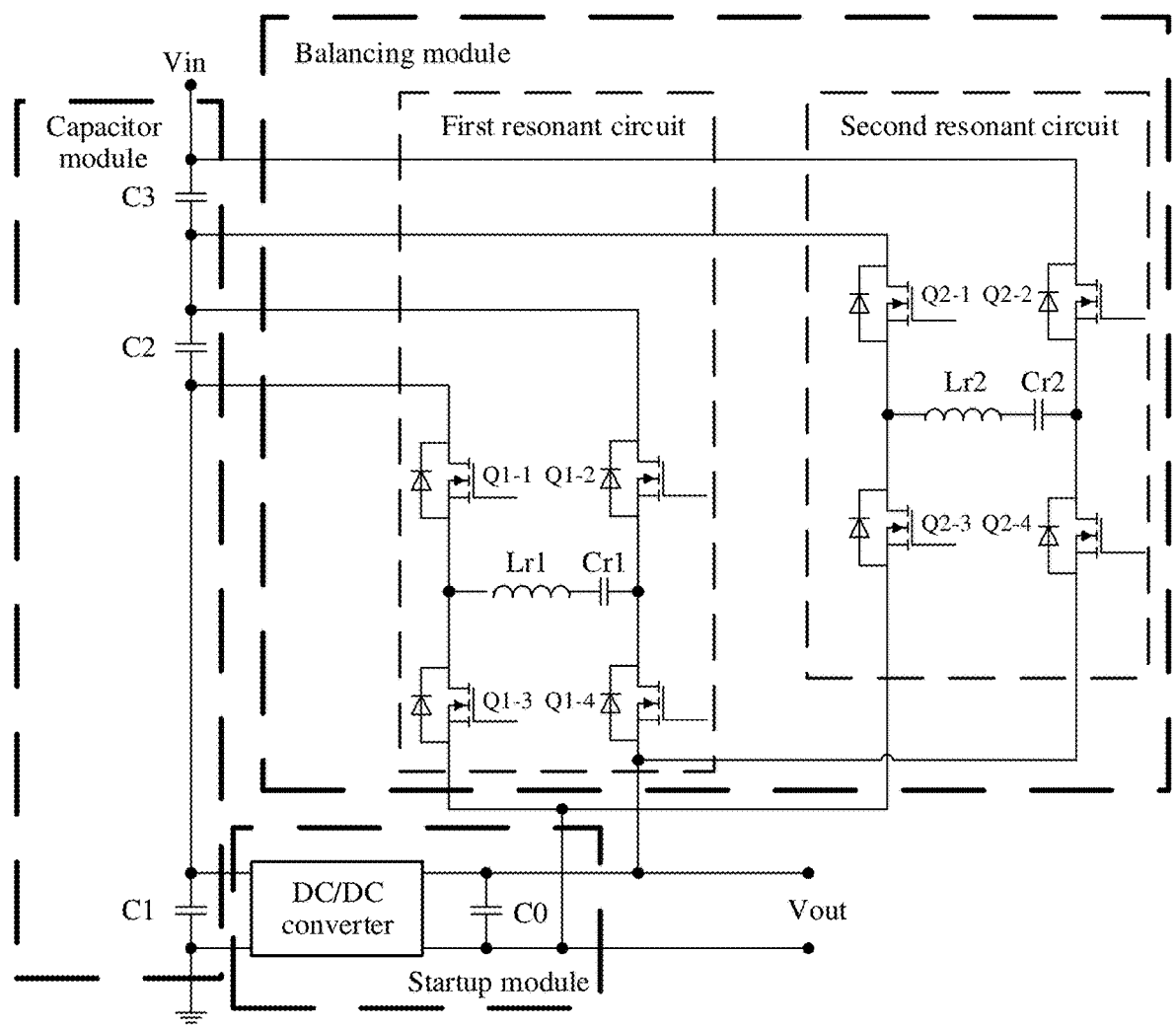
FIG. 16 is a schematic diagram of a fifth embodiment of a conversion circuit according to an embodiment.

FIG. 16 is a schematic diagram of a fifth embodiment of a conversion circuit according to an embodiment. An embodiment may provide a fifth embodiment of a conversion circuit, including a capacitor module, a balancing module, and a startup module. The capacitor module includes a first capacitor C1, a second capacitor C2, and a third capacitor C3. The balancing module includes a first resonant circuit and a second resonant circuit. The startup module includes a converter and a target capacitor.

The first resonant circuit is separately connected to both ends of the first capacitor and the second capacitor, and the second resonant circuit is separately connected to both ends of the first capacitor and the third capacitor.

The first capacitor C1, the second capacitor C2, and the third capacitor C3 are sequentially connected in series. A first switch Q1-1 is connected in series to a third switch Q1-3, and a second switch Q1-2 is connected in series to a fourth switch Q1-4. A fifth switch Q2-1 is connected in series to a seventh switch Q2-3, and a sixth switch Q2-2 is connected in series to an eighth switch Q2-4. One end of the third capacitor C3 is connected to a first end of the sixth switch Q2-2, and the other end of the third capacitor C3 is separately connected to a first end of the fifth switch Q2-1, one end of the second capacitor C2, and a first end of the second switch Q1-2. The other end of the second capacitor C2 is separately connected to one end of the first capacitor C1, a first end of the first switch Q1-1, and a first end of the converter. A second end of the converter is separately connected to one end of the target capacitor C0, a second end of the fourth switch Q1-4, and a second end of the eighth switch Q2-4. The other end of the first capacitor C1 is connected to a third end of the converter, and a fourth end of the converter is separately connected to the other end of the target capacitor C0, a second end of the third switch Q1-3, and a second end of the seventh switch Q2-3.

One end of a first resonant cavity is separately connected to a second end of the first switch Q1-1 and a first end of the third switch Q1-3, and the other end of the first resonant cavity is separately connected to a second end of the second switch Q1-2 and a first end of the fourth switch Q1-4. One end of a second resonant cavity is separately connected to a second end of the fifth switch Q2-1 and a first end of the seventh switch Q2-3, and the other end of the (N−1)$^{th}$ resonant cavity is separately connected to a second end of the sixth switch Q2-2 and a first end of the eighth switch Q2-4.

In this embodiment, the first resonant cavity in which a first resonant capacitor Cr1 and a first resonant inductor Lr1 are connected in series is merely used as an example for illustration. It may be understood that, in actual application, the first resonant cavity may alternatively include the first resonant capacitor Cr1 and the first resonant inductor Lr1 that are connected in series, and another capacitor connected to both ends of the first resonant inductor Lr1 as a whole. There are other types of equivalent forms. This is not limited herein. The second resonant cavity is similar to the first resonant cavity. There are other types of equivalent forms. This is not limited herein.

In this embodiment, a duty cycle of driving of each switch is close to 50%, that is, a turn-on time of each switch is approximately half of one cycle, and the switch works at a resonance frequency of the resonant cavity or near the resonance frequency.

Figure 17:
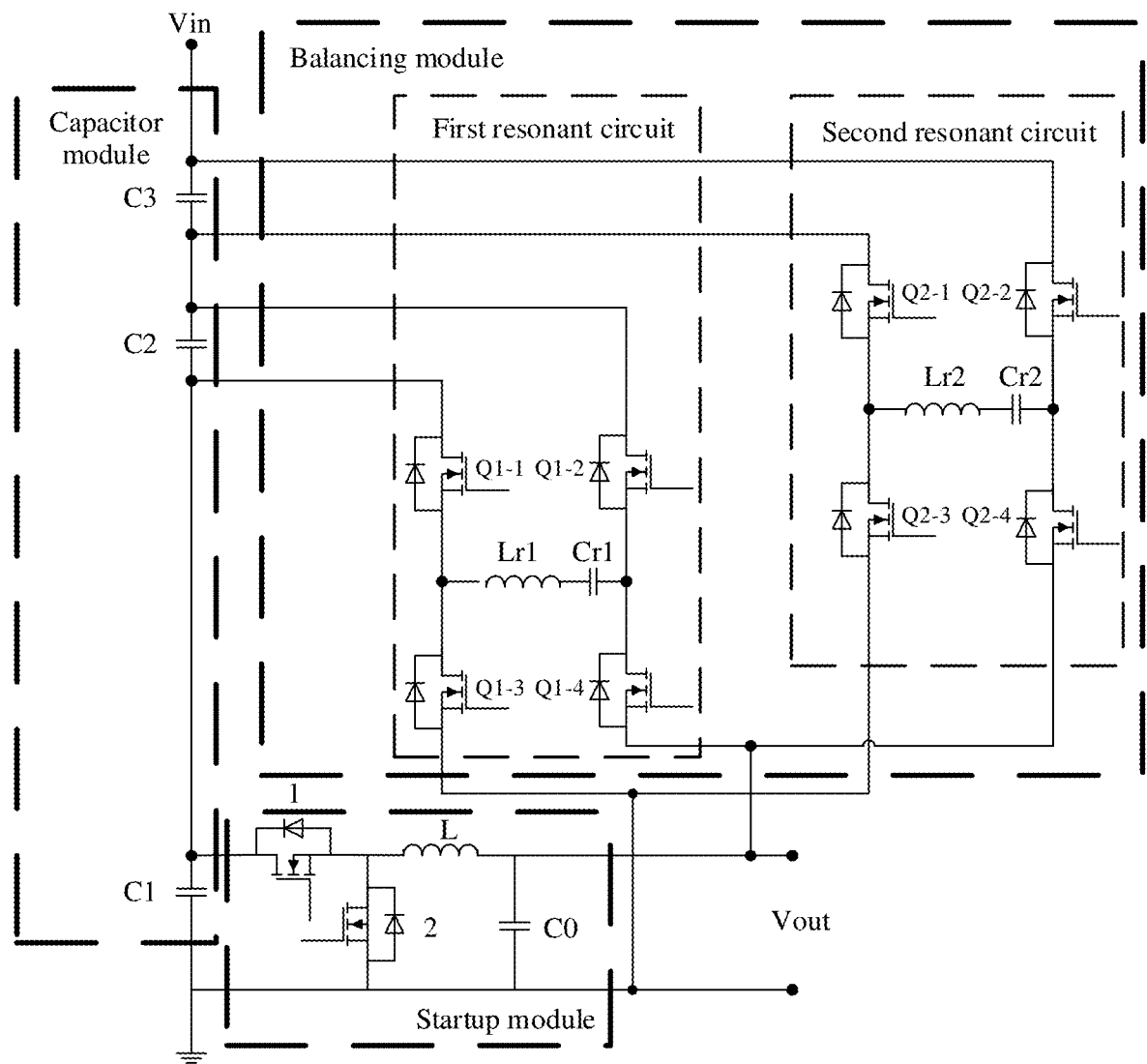
FIG. 17 is a schematic diagram in which a first structure of a DC/DC converter is used in a fifth embodiment of a conversion circuit according to an embodiment.

FIG. 17 shows an embodiment in which the converter in the startup module in the embodiment shown in FIG. 16 uses the structure of FIG. 4.

Figure 18:
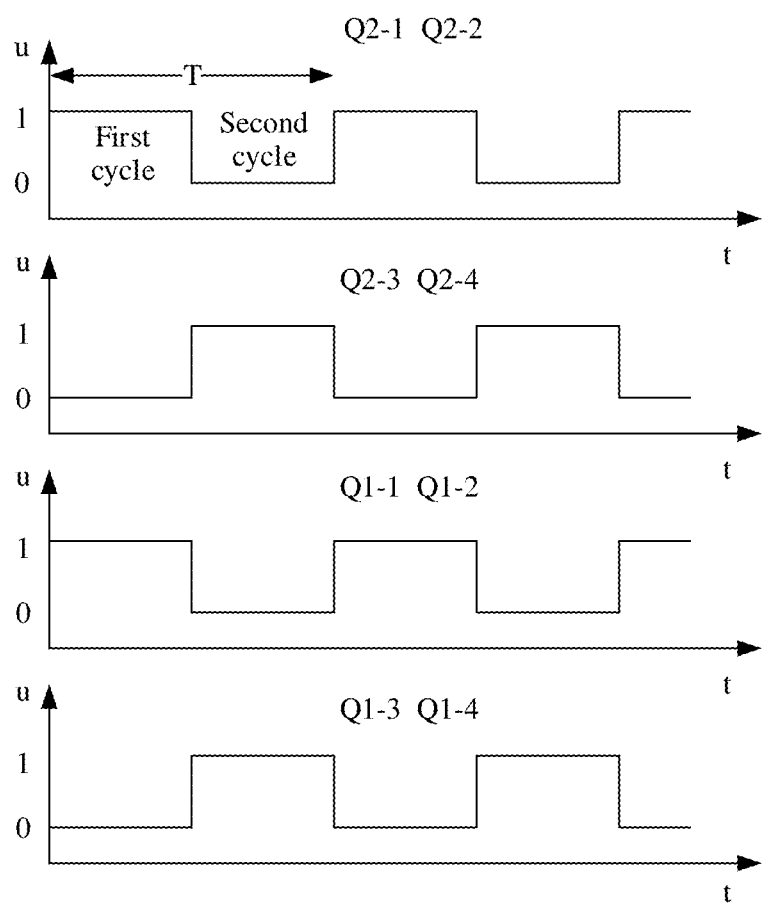
FIG. 18 is a schematic diagram of in-phase switches according to an embodiment.
Figure 19:
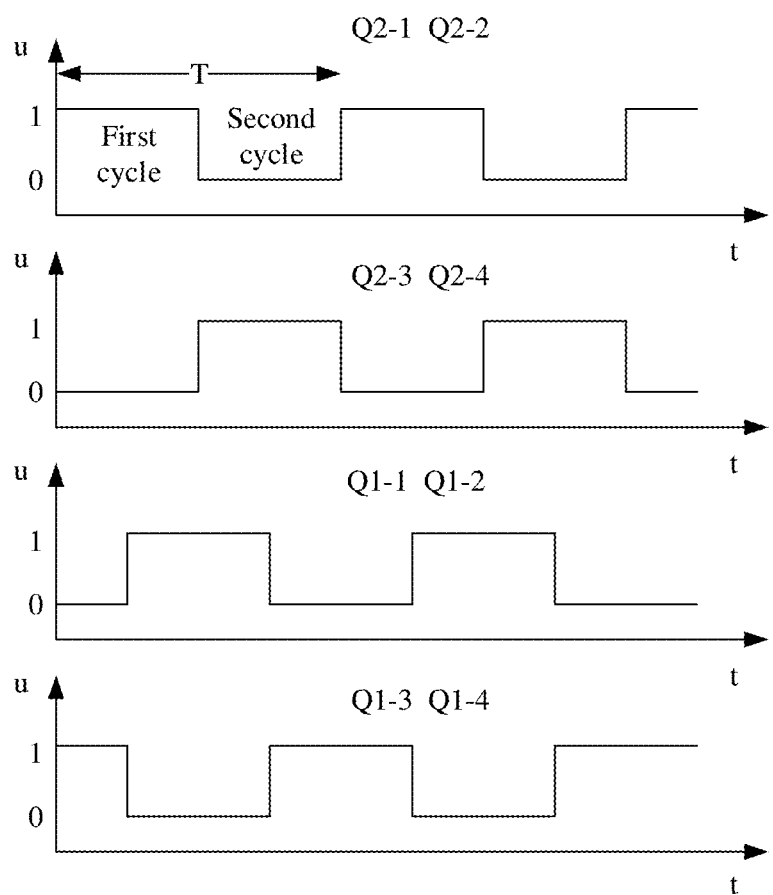
FIG. 19 is a schematic diagram of out-of-phase switches according to an embodiment.

Some turn-on and turn-off states of the switches are shown in Table 1. For ease of understanding, a schematic diagram of in-phase driving of the switches in the first resonant circuit and the second resonant circuit is shown in FIG. 18, and a schematic diagram of out-of-phase driving of the switches in the first resonant circuit and the second resonant circuit is shown in FIG. 19. It may be understood that there may be any phase shifting angle, which is not limited herein.

A circuit working principle in this embodiment is as follows:

A complete cycle of the switches in this embodiment may include a first cycle and a second cycle. As shown in FIG. 18 and FIG. 19, a complete cycle T includes a first cycle and a second cycle, and the first cycle and the second cycle account for approximately half of the complete cycle of the switches. In actual application, the complete cycle may include the first cycle, a dead time, and the second cycle. This is not limited herein.

The following describes in detail the working principle in this embodiment by using in-phase driving shown in FIG. 18 and the converter using the structure of FIG. 4 as an example.

Figure 20:
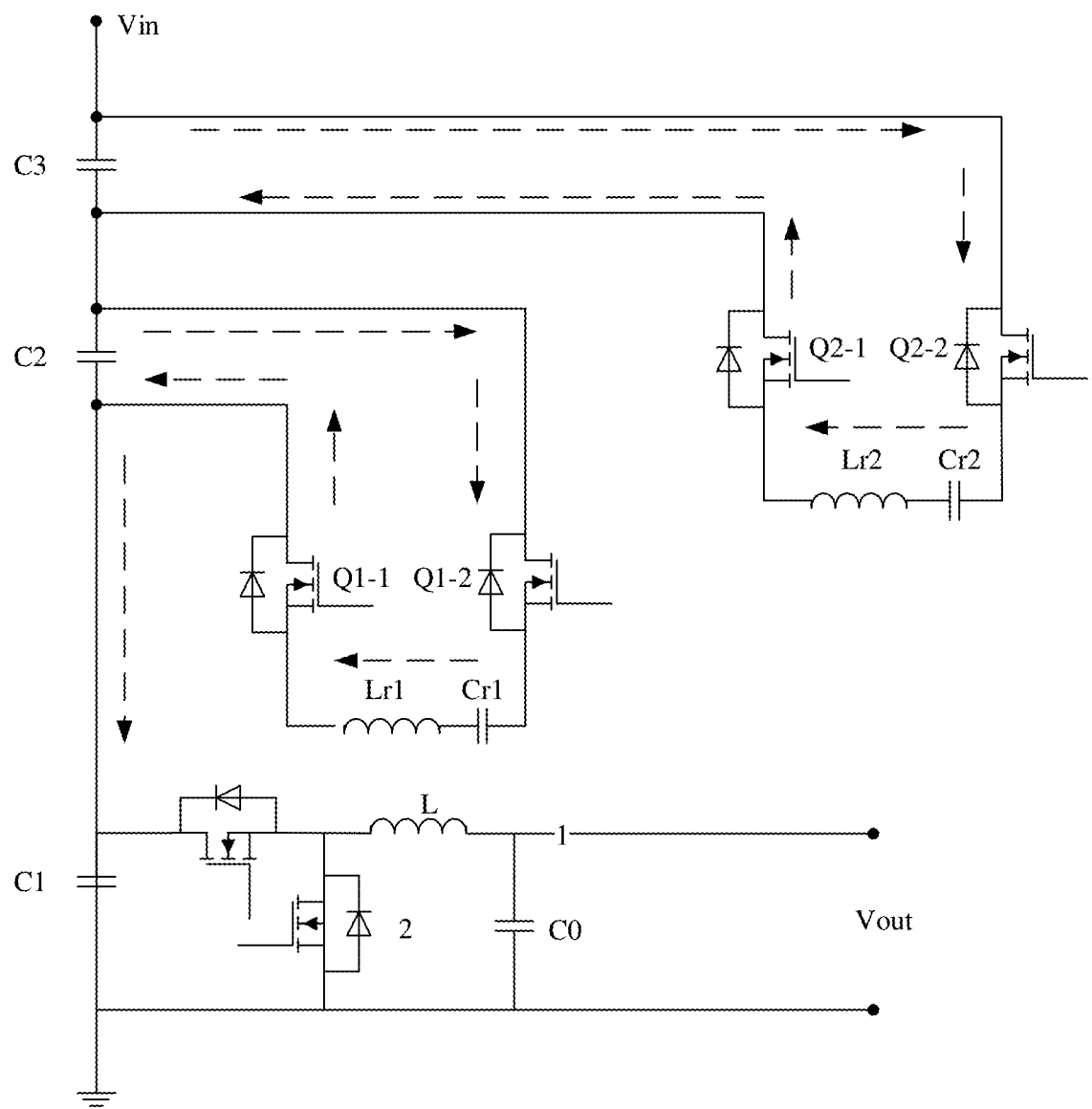
FIG. 20 is an equivalent diagram of a conversion circuit in a first cycle in a fifth embodiment according to an embodiment.

2.1.1. First Cycle:

FIG. 17 may be equivalent to FIG. 20, when the first switch Q1-1, the second switch Q1-2, the fifth switch Q2-1, and the sixth switch Q2-2 are turned on (a high level is input), and the third switch Q1-3, the fourth switch Q1-4, the seventh switch Q2-3, and the eighth switch Q2-4 are turned off (a low level is input). The second capacitor C2 performs energy transmission with the first resonant capacitor Cr1, and the third capacitor C3 performs energy transmission with a second resonant capacitor Cr2.

Figure 21:
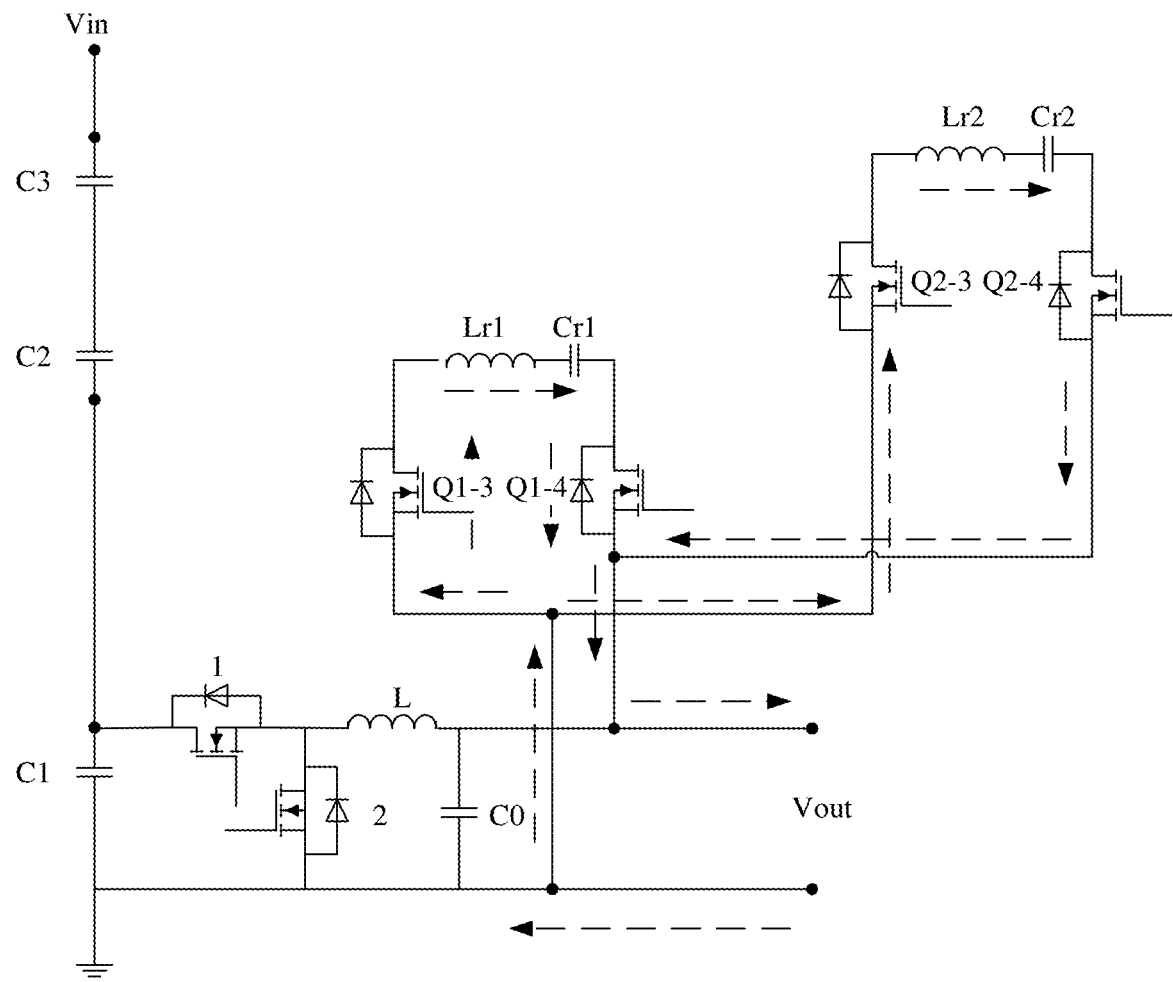
FIG. 21 is an equivalent diagram of a conversion circuit in a second cycle in a fifth embodiment according to an embodiment.

2.1.2. Second Cycle:

FIG. 17 may be equivalent to FIG. 21, when the third switch Q1-3, the fourth switch Q1-4, the seventh switch Q2-3, and the eighth switch Q2-4 are turned on (a high level is input), and the first switch Q1-1, the second switch Q1-2, the fifth switch Q2-1, and the sixth switch Q2-2 are turned off (a low level is input). The first resonant capacitor Cr1 and the second resonant capacitor Cr2 perform energy transmission with the first capacitor C1. In this case, the first capacitor C1 is an output capacitor. Because a duty cycle of a drive signal is close to 50%, a voltage at both ends of the first resonant capacitor Cr1 is equal to a voltage at both ends of the second resonant capacitor Cr2. That is, a voltage at both ends of the first capacitor C1 is equal to a voltage at both ends of the second capacitor C2, and the voltage at both ends of the first capacitor C1 is equal to a voltage of the third capacitor C3. Further, because the first capacitor C1, the second capacitor C2, and the third capacitor C3 are sequentially connected in series, and a total voltage is Vin, it may be understood, based on a series voltage division principle, that the voltage (output voltage Vo) at both ends of the first capacitor C1 is one third of the input voltage Vin, that is, a ratio of the input voltage Vin to the output voltage Vo is 3:1.

In this embodiment, the input voltage Vin charges the first capacitor C1 by using the first resonant cavity and the second resonant cavity. The balancing module balances the voltages at both ends of the first capacitor and the second capacitor by controlling the switches in the first resonant circuit in conjunction with influence of the first resonant cavity on a current. The balancing module balances the voltages at both ends of the first capacitor and the third capacitor by controlling the switches in the second resonant circuit in conjunction with influence of the second resonant cavity on a current. Further, a voltage gain 3:1 is obtained based on a series voltage division principle of the three capacitors of the capacitor module. In addition, on the one hand, because there is the converter (a buck circuit in FIG. 17, FIG. 20, and FIG. 21), during power-on, the conversion circuit in this embodiment can normally implement slow startup. This effectively resolves a problem that a conventional resonant switched capacitor circuit cannot be controlled in a closed-loop manner and is not easy to implement slow startup. On the other hand, in case of overcurrent, the converter may be used to implement detection and protection.

2.2. The first capacitor C1 and the second capacitor C2 are connected in series and then connected in parallel to the third capacitor C3.

Figure 22:
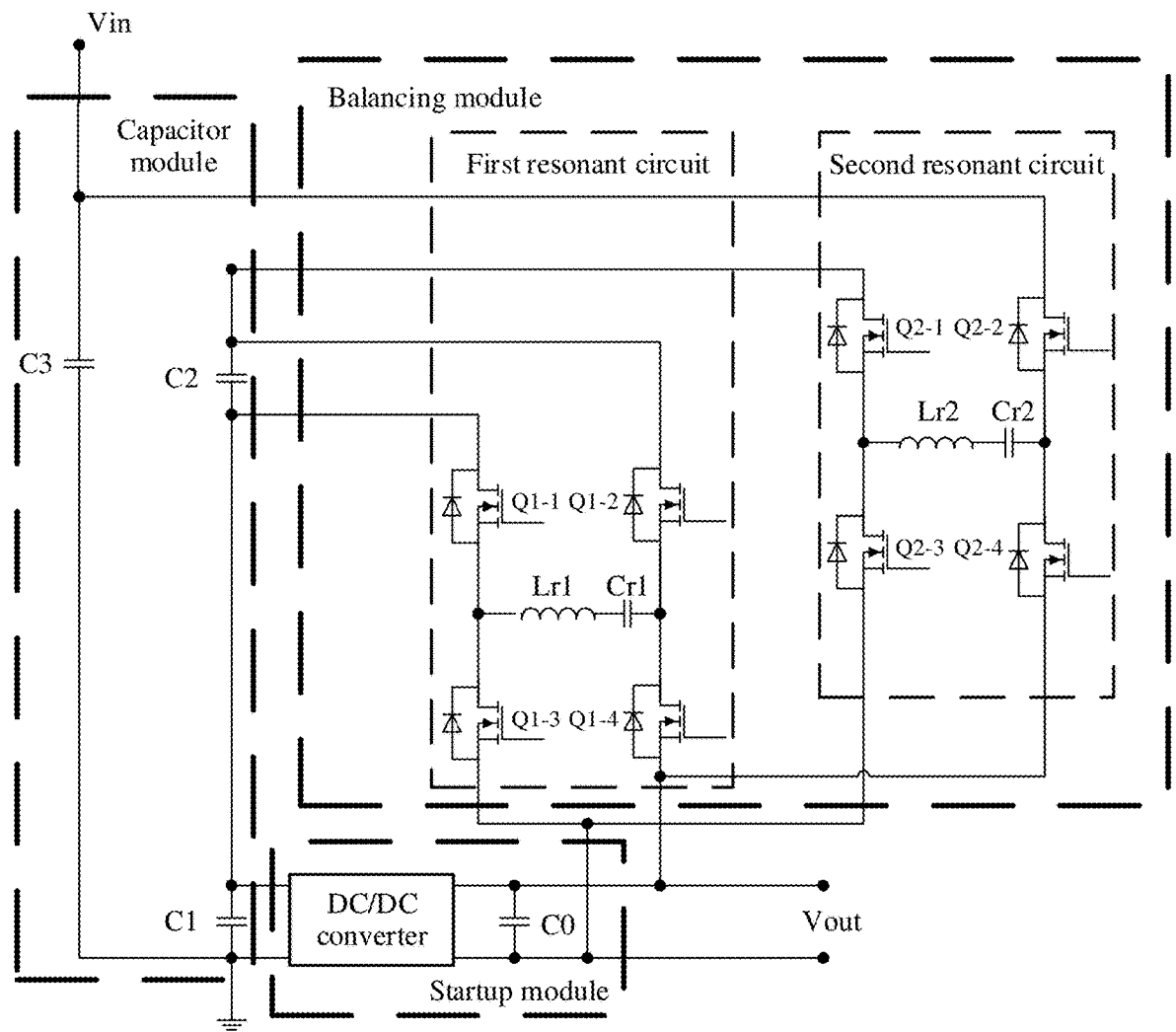
FIG. 22 is a schematic diagram of a sixth embodiment of a conversion circuit according to an embodiment.

FIG. 22 is a schematic diagram of a sixth embodiment of a conversion circuit according to an embodiment. An embodiment may provide a sixth embodiment of a conversion circuit. Components in this embodiment are similar to the components corresponding to FIG. 16, and details are not described herein. A difference lies in a connection manner of the third capacitor C3. The following describes a structure.

The first capacitor C1 is connected in series to the second capacitor C2. One end of the third capacitor C3 is connected to a first end of the sixth switch Q2-2, and the other end of the third capacitor C3 is connected to the other end of the first capacitor C1. One end of the second capacitor C2 is separately connected to a first end of the fifth switch Q2-1 and a first end of the second switch Q1-2, and the other end of the second capacitor C2 is separately connected to a first end of the first switch Q1-1, one end of the first capacitor C1, and a first end of the converter. A second end of the converter is separately connected to one end of the target capacitor C0, a second end of the fourth switch Q1-4, and a second end of the eighth switch Q2-4. The other end of the first capacitor C1 is separately connected to the other end of the third capacitor C3 and a third end of the converter, and a fourth end of the converter is separately connected to the other end of the target capacitor C0, a second end of the third switch Q1-3, and a second end of the seventh switch Q2-3.

The following describes in detail the working principle in this embodiment by using in-phase driving shown in FIG. 18 as an example.

Figure 23:
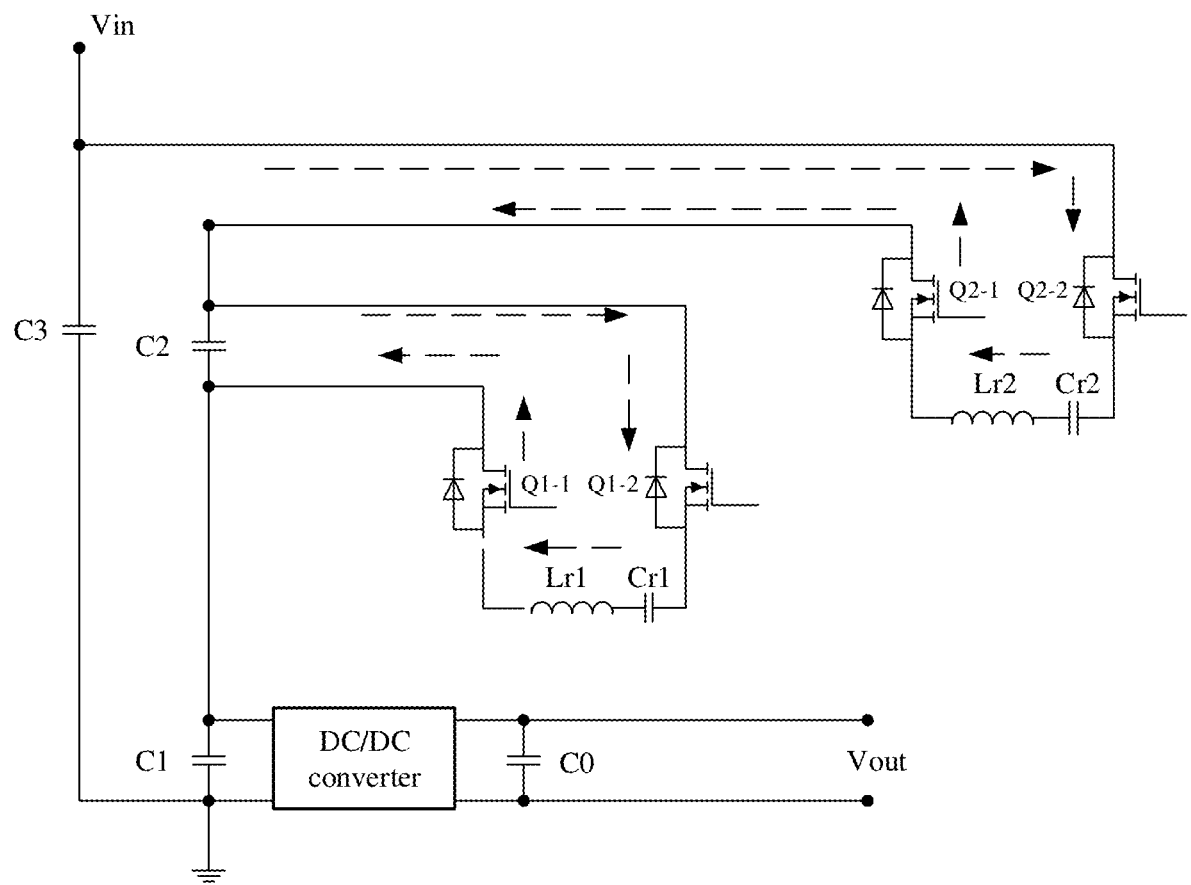
FIG. 23 is an equivalent diagram of a conversion circuit in a first cycle in a sixth embodiment according to an embodiment.

2.2.1. First Cycle:

FIG. 22 may be equivalent to FIG. 23, when the first switch Q1-1, the second switch Q1-2, the fifth switch Q2-1, and the sixth switch Q2-2 are turned on (a high level is input), and the third switch Q1-3, the fourth switch Q1-4, the seventh switch Q2-3, and the eighth switch Q2-4 are turned off (a low level is input). The second capacitor C2 transmits energy to the first resonant capacitor Cr1, Vin transmits energy to the second resonant capacitor Cr2, and the input voltage Vin charges the first capacitor C1 by using the first resonant cavity and the second resonant cavity.

Figure 24:
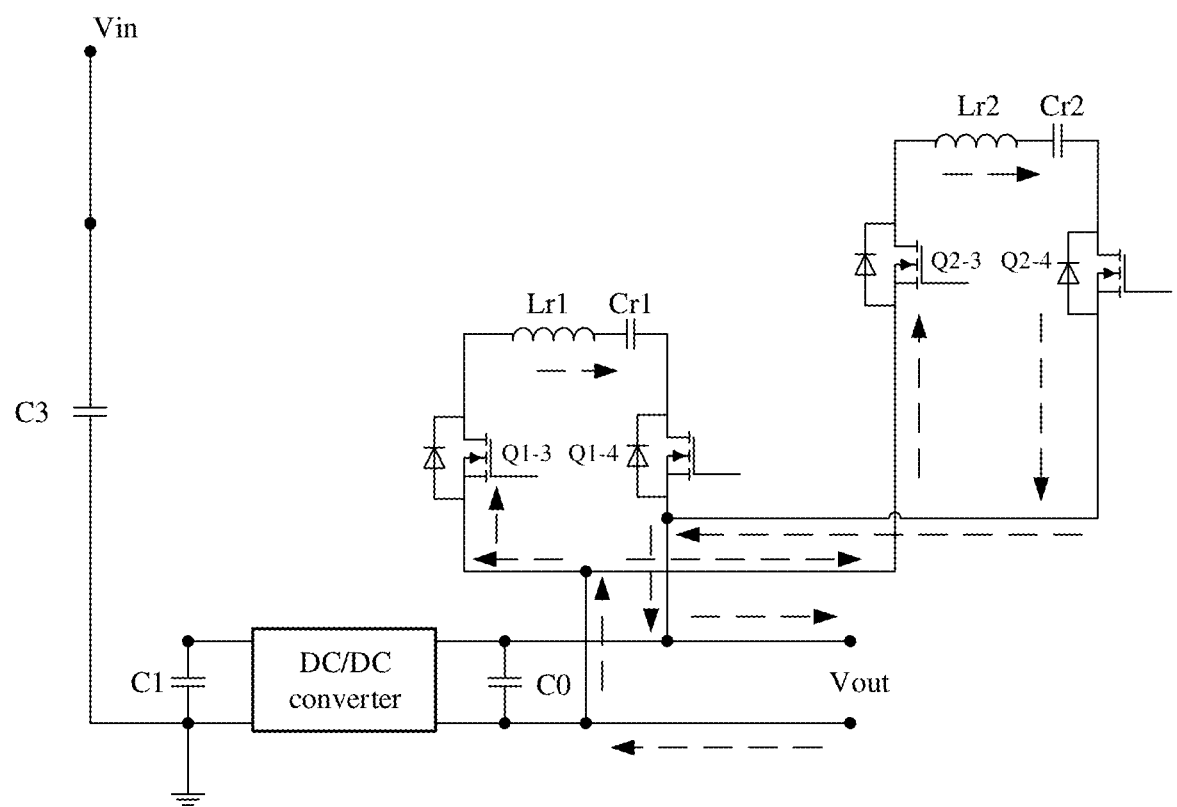
FIG. 24 is an equivalent diagram of a conversion circuit in a second cycle in a sixth embodiment according to an embodiment.

2.2.2. Second Cycle:

FIG. 22 may be equivalent to FIG. 24, when the third switch Q1-3, the fourth switch Q1-4, the seventh switch Q2-3, and the eighth switch Q2-4 are turned on (a high level is input), and the first switch Q1-1, the second switch Q1-2, the fifth switch Q2-1, and the sixth switch Q2-2 are turned off (a low level is input). The first resonant capacitor Cr1 and the second resonant capacitor Cr2 charge the first capacitor C1. In this case, the first capacitor C1 is an output capacitor. Because a duty cycle of a drive signal is close to 50%, a voltage at both ends of the first resonant capacitor Cr1, a voltage at both ends of the second resonant capacitor Cr2, a voltage at both ends of the first capacitor C1, and a voltage at both ends of the second capacitor C2 are equal. Further, because the first capacitor C1, the second capacitor C2, and the second resonant capacitor Cr2 are sequentially connected in series, and a total voltage is Vin, it may be understood, based on a series voltage division principle, that the voltage (output voltage Vo) at both ends of the first capacitor C1 is one third of the input voltage Vin, that is, a ratio of the input voltage Vin to the output voltage Vo is 3:1. In addition, on the one hand, because there is the converter, during power-on, the conversion circuit in this embodiment can normally implement slow startup. This effectively resolves a problem that a conventional resonant switched capacitor circuit cannot be controlled in a closed-loop manner and is not easy to implement slow startup. On the other hand, in case of overcurrent, the converter may be used to implement detection and protection.

2.3. The first capacitor C1 and the second capacitor C2 are connected in series and then connected in parallel to a direct current power supply V_dc.

Figure 25:
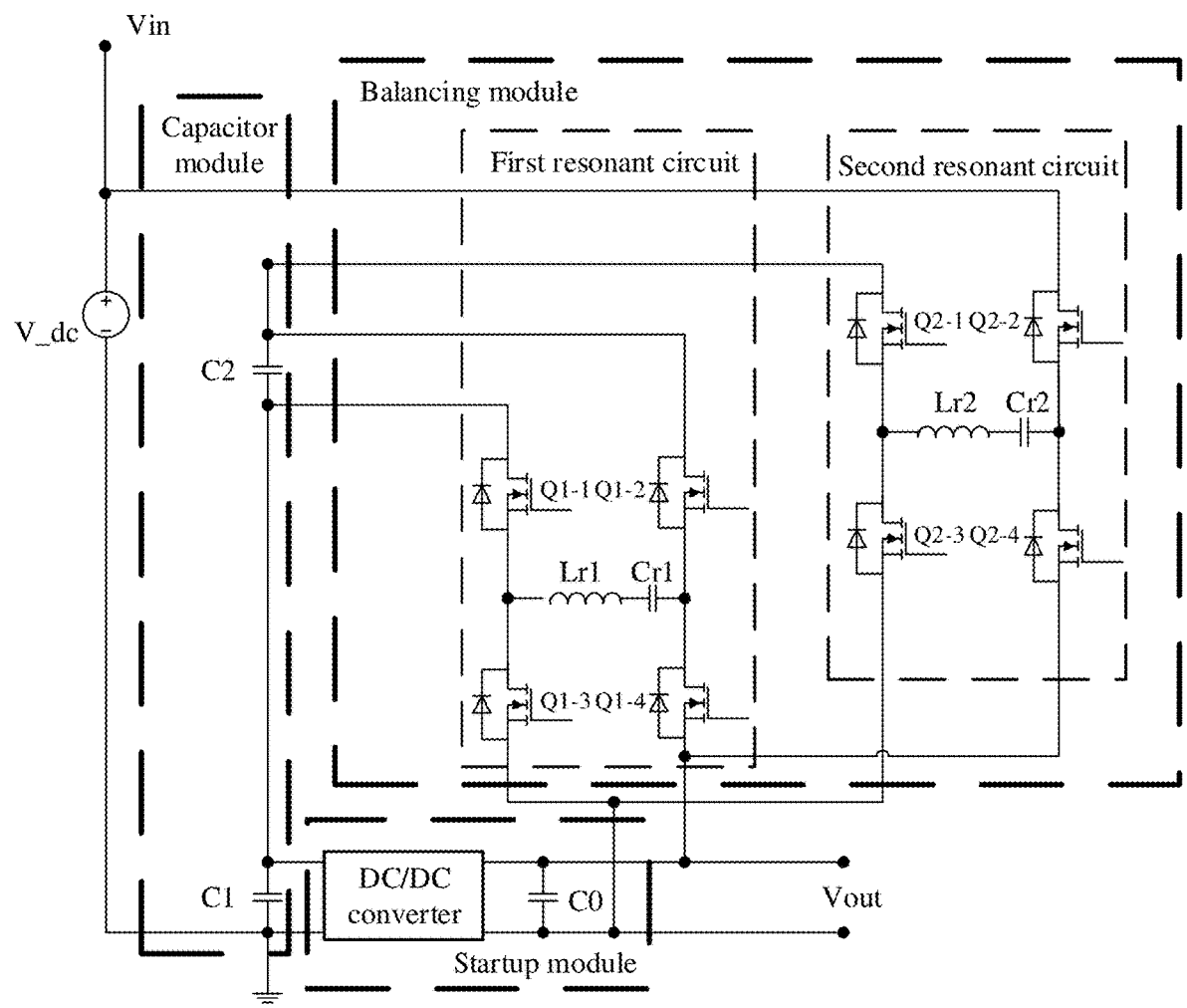
FIG. 25 is a schematic diagram of a seventh embodiment of a conversion circuit according to an embodiment.

FIG. 25 is a schematic diagram of a seventh embodiment of a conversion circuit according to an embodiment. An embodiment may provide a seventh embodiment of a conversion circuit. Components in this embodiment are similar to the components corresponding to FIG. 22, and details are not described herein. A difference lies in that the third capacitor C3 is replaced with the direct current power supply V_dc (as shown in FIG. 25).

In this embodiment, after the first switch Q1-1 and the second switch Q1-2 are turned on, the second capacitor C2 performs energy transmission with the first resonant circuit; after the third switch Q1-3 and the fourth switch Q1-4 are turned on, the first resonant circuit performs energy transmission with the first capacitor C1; after the fifth switch Q2-1 and the sixth switch Q2-2 are turned on, the direct current power supply V_dc performs energy transmission with the second resonant circuit; and after the seventh switch Q2-3 and the eighth switch Q2-4 are turned on, the second resonant circuit performs energy transmission with the first capacitor C1, so that a voltage gain is 3:1 (for a detailed principle, refer to the principle corresponding to FIG. 23 and FIG. 24). In addition, on the one hand, because there is the converter, during power-on, the conversion circuit in this embodiment can normally implement slow startup. This effectively resolves a problem that a conventional resonant switched capacitor circuit cannot be controlled in a closed-loop manner and is not easy to implement slow startup. On the other hand, in case of overcurrent, the converter may be used to implement detection and protection.

In addition to the form shown in FIG. 3, the first resonant circuit in this embodiment may have a plurality of structural forms, which are separately described below with reference to a connection between the first resonant circuit and a capacitor.

Figure 26:
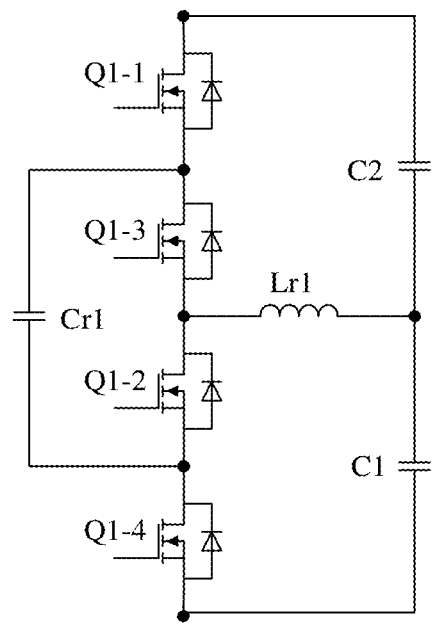
FIG. 26 is another equivalent circuit diagram of a first resonant circuit according to an embodiment.

As shown in FIG. 26, a connection between a first resonant circuit in a structural form and a capacitor may include a first capacitor C1, a second capacitor C2, a first switch Q1-1, a second switch Q1-2, a third switch Q1-3, a fourth switch Q1-4, a first resonant capacitor Cr1, and a first resonant inductor Lr1.

The first switch Q1-1, the second switch Q1-2, the third switch Q1-3, and the fourth switch Q1-4 are sequentially connected in series. One end of the first resonant capacitor Cr1 is separately connected to a second end of the first switch Q1-1 and a first end of the third switch Q1-3, and the other end of the first resonant capacitor Cr1 is separately connected to a second end of the second switch Q1-2 and a first end of the fourth switch Q1-4. The first capacitor C1 is connected in series to the second capacitor C2, and one end of the second capacitor C2 is connected to a first end of the first switch Q1-1. One end of the first resonant inductor Lr1 is separately connected to a second end of the third switch Q1-3 and a first end of the second switch Q1-2, and the other end of the first resonant inductor Lr1 is separately connected to the other end of the second capacitor C2 and one end of the first capacitor C1. The other end of the first capacitor C1 is connected to a second end of the fourth switch Q1-4.

A working principle of the circuit shown in FIG. 26 is similar to the descriptions corresponding to FIG. 23 and FIG. 24 in this embodiment. Details are not described herein.

Figure 27:
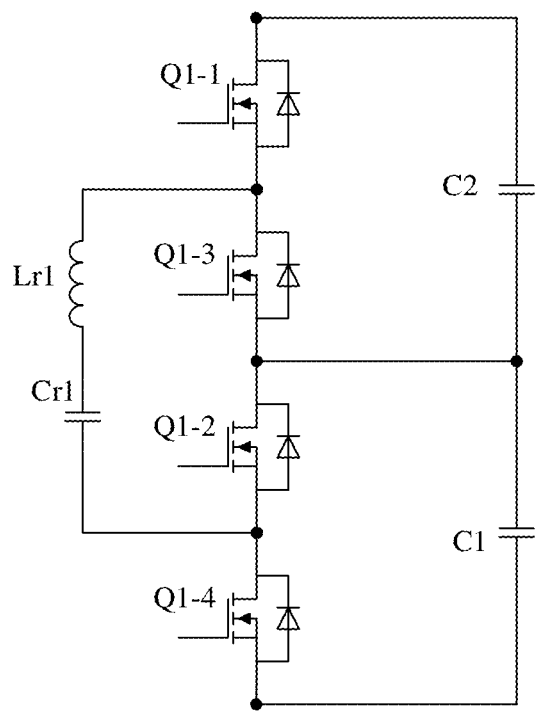
FIG. 27 is another equivalent circuit diagram of a first resonant circuit according to an embodiment.

As shown in FIG. 27, a connection between a first resonant circuit in another structural form and a capacitor may include a first capacitor C1, a second capacitor C2, a first switch Q1-1, a second switch Q1-2, a third switch Q1-3, a fourth switch Q1-4, a first resonant capacitor Cr1, and a first resonant inductor Lr1.

The first switch Q1-1, the second switch Q1-2, the third switch Q1-3, and the fourth switch Q1-4 are sequentially connected in series. The first capacitor C1 is connected in series to the second capacitor C2, and the first resonant capacitor Cr1 is connected in series to the first resonant inductor Lr1. One end of the second capacitor C2 is connected to a first end of the first switch Q1-1, and the other end of the second capacitor C2 is separately connected to a second end of the third switch Q1-3, a first end of the second switch Q1-2, and one end of the first capacitor C1. The other end of the first capacitor C1 is connected to a second end of the fourth switch Q1-4. One end of the first resonant inductor Lr1 is separately connected to a second end of the first switch Q1-1 and a first end of the third switch Q1-3, and the other end of the first resonant inductor Lr1 is connected to one end of the first resonant capacitor Cr1. The other end of the first resonant capacitor Cr1 is separately connected to a second end of the second switch Q1-2 and a first end of the fourth switch Q1-4.

A working principle of the circuit shown in FIG. 27 is similar to the descriptions corresponding to FIG. 23 and FIG. 24 in this embodiment. Details are not described herein.

It may be understood that the first resonant circuit has a plurality of structures. The foregoing two structures are merely examples for description. A structure of the first resonant circuit is not limited herein.

Figure 28:
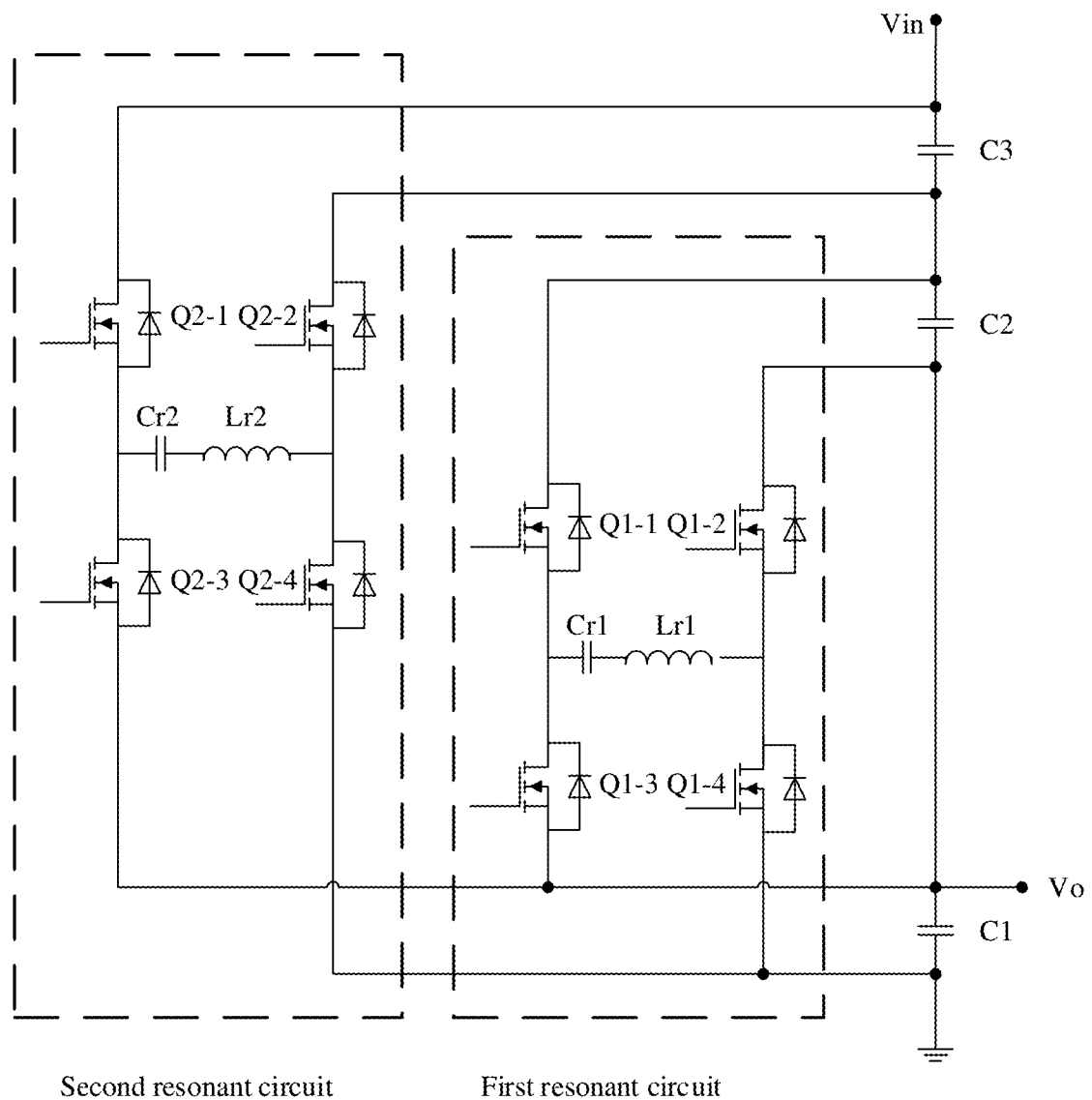
FIG. 28 is a schematic diagram of an eighth embodiment of a conversion circuit according to an embodiment.

As shown in FIG. 28, a schematic diagram of an eighth embodiment of a conversion circuit according to an embodiment may include a capacitor module and a balancing module. The balancing module includes a first resonant circuit and a second resonant circuit. The capacitor module includes a first capacitor C1, a second capacitor C2, and a third capacitor C3.

The first resonant circuit is separately connected to both ends of the first capacitor and the second capacitor, and the second resonant circuit is separately connected to both ends of the first capacitor and the third capacitor.

The first resonant circuit includes at least four switches and a first resonant cavity. The four switches are respectively a first switch Q1-1, a second switch Q1-2, a third switch Q1-3, and a fourth switch Q1-4. The first resonant cavity includes a first resonant capacitor Cr1 and a first resonant inductor Lr1. The second resonant circuit includes at least four switches and a second resonant cavity. The four switches are respectively a fifth switch Q2-1, a sixth switch Q2-2, a seventh switch Q2-3, and an eighth switch Q2-4. The second resonant cavity includes a second resonant capacitor Cr2 and a second resonant inductor Lr2.

The first capacitor C1, the second capacitor C2, and the third capacitor C3 are sequentially connected in series. The first switch Q1-1 is connected in series to the third switch Q1-3, the second switch Q1-2 is connected in series to the fourth switch Q1-4, the fifth switch Q2-1 is connected in series to the seventh switch Q2-3, and the sixth switch Q2-2 is connected in series to the eighth switch Q2-4. One end of the third capacitor C3 is connected to a first end of the fifth switch Q2-1, and the other end of the third capacitor C3 is separately connected to a first end of the sixth switch Q2-2, a first end of the first switch Q1-1, and one end of the second capacitor C2. The other end of the second capacitor C2 is separately connected to a first end of the second switch Q1-2, one end of the first capacitor C1, a second end of the third switch Q1-3, and a second end of the seventh switch Q2-3. The other end of the first capacitor C1 is separately connected to a second end of the fourth switch Q1-4 and a second end of the eighth switch Q2-4. One end of the first resonant cavity is separately connected to a second end of the first switch Q1-1 and a first end of the third switch Q1-3, and the other end of the first resonant cavity is separately connected to a second end of the second switch Q1-2 and a first end of the fourth switch Q1-4. One end of the second resonant cavity is separately connected to a second end of the fifth switch Q2-1 and a first end of the seventh switch Q2-3, and the other end of the second resonant cavity is separately connected to a second end of the sixth switch Q2-2 and a first end of the eighth switch Q2-4.

In this embodiment, the first resonant cavity in which the first resonant capacitor Cr1 and the first resonant inductor Lr1 are connected in series may be used as an example for illustration. It may be understood that, in actual application, the first resonant cavity may alternatively include the first resonant capacitor Cr1 and the first resonant inductor Lr1 that are connected in series, and another capacitor connected to both ends of the first resonant inductor Lr1 as a whole. There are other types of equivalent forms. This is not limited herein. The second resonant cavity is similar to the first resonant cavity. There are other types of equivalent forms. This is not limited herein.

In this embodiment, a duty cycle of driving of each switch may be close to 50%, that is, a turn-on time of each switch is approximately half of one cycle, and the switch works at a resonance frequency of the resonant cavity or near the resonance frequency.

Conduction statuses of the eight switches in this embodiment are similar to the conduction statuses of the eight switches shown in FIG. 18 and FIG. 19. Details are not described herein.

The following provides a detailed description by using in-phase driving shown in FIG. 18 as an example.

Figure 29:
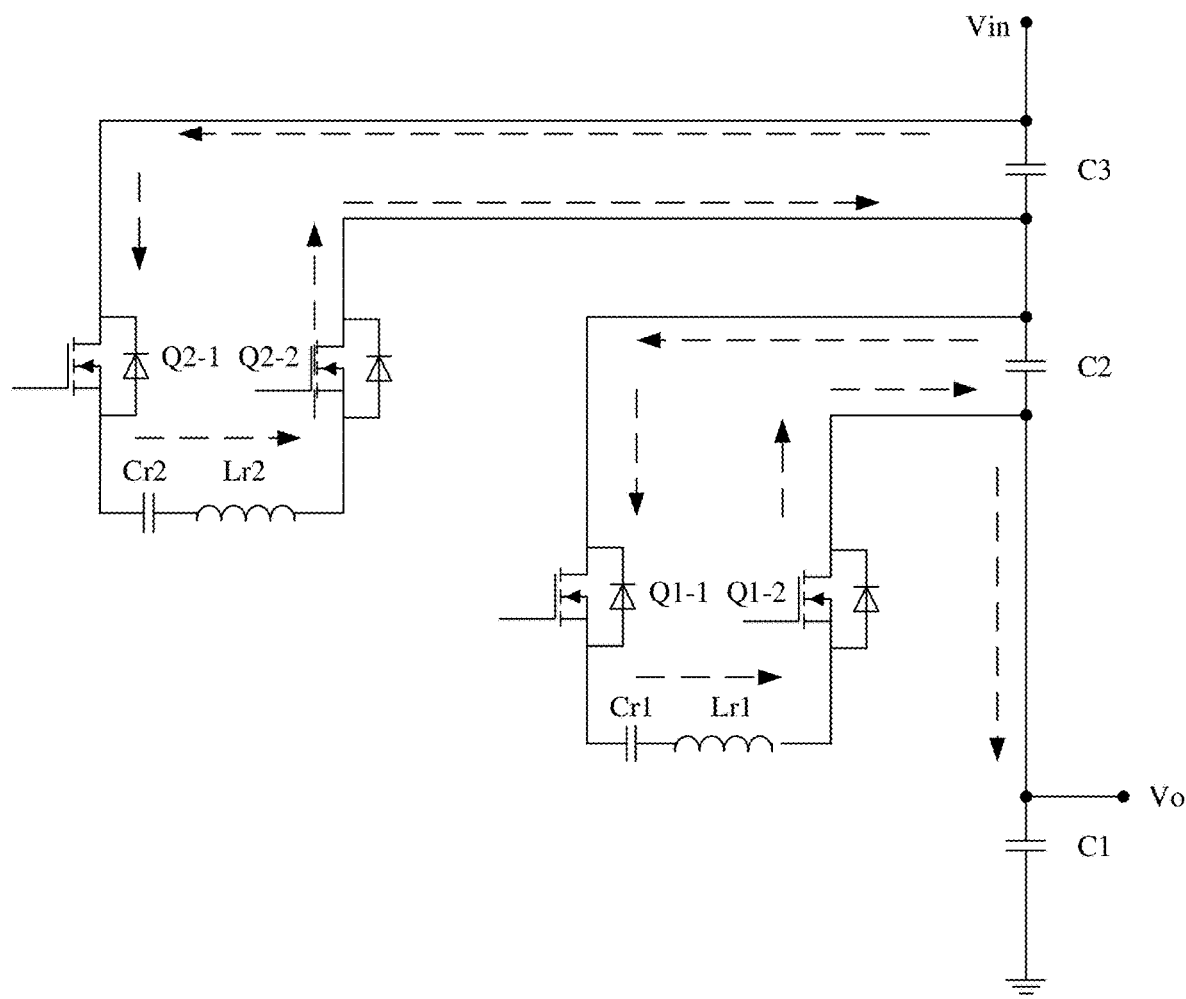
FIG. 29 is an equivalent diagram of a conversion circuit in a first cycle in an eighth embodiment according to an embodiment.

A circuit working principle in this embodiment is as follows:

First Cycle:

FIG. 28 may be equivalent to FIG. 29, when the first switch Q1-1, the second switch Q1-2, the fifth switch Q2-1, and the sixth switch Q2-2 are turned on (a high level is input), and the third switch Q1-3, the fourth switch Q1-4, the seventh switch Q2-3, and the eighth switch Q2-4 are turned off (a low level is input). The second capacitor C2 performs energy transmission with the first resonant capacitor Cr1, the third capacitor C3 performs energy transmission with the second resonant capacitor Cr2, and an input voltage Vin charges the first capacitor C1 by using the first resonant cavity and the second resonant cavity.

Figure 30:
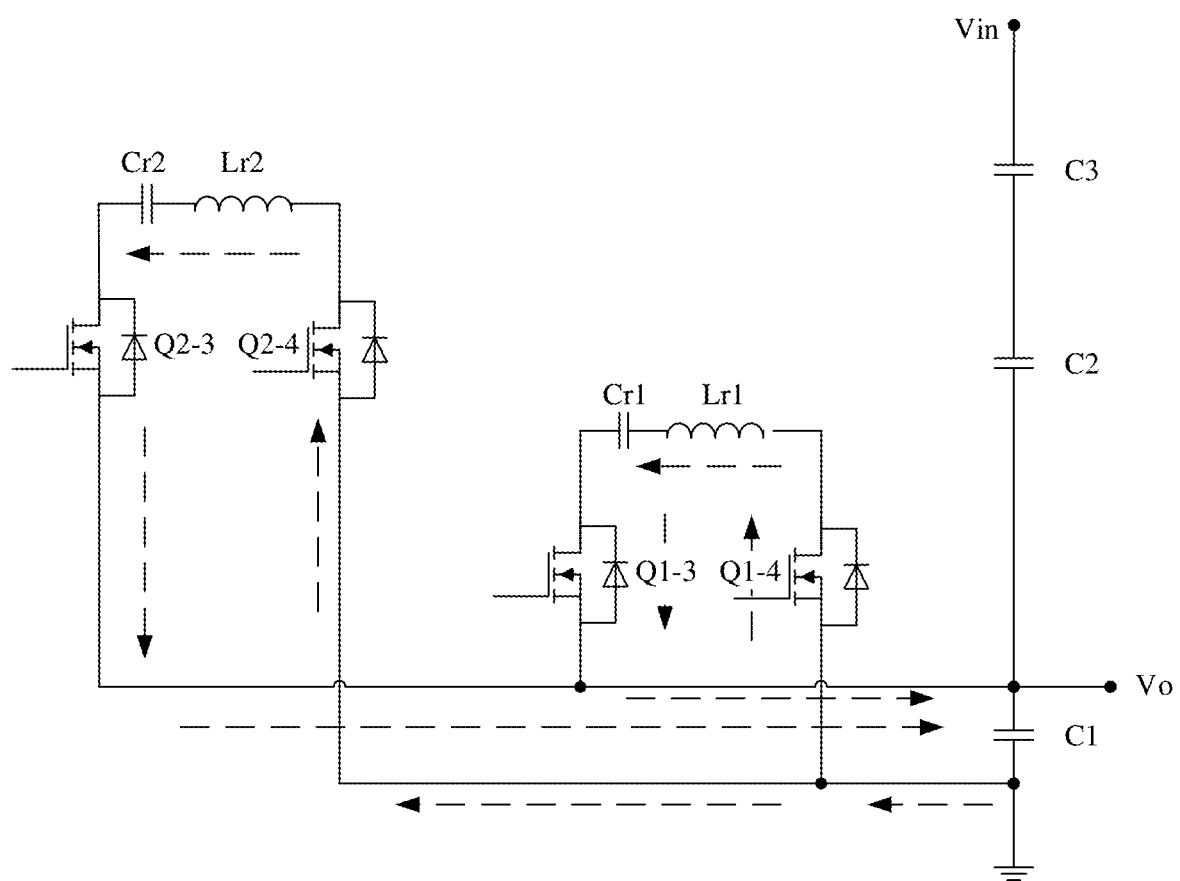
FIG. 30 is an equivalent diagram of a conversion circuit in a second cycle in an eighth embodiment according to an embodiment.

Second Cycle:

FIG. 28 may be equivalent to FIG. 30, when the third switch Q1-3, the fourth switch Q1-4, the seventh switch Q2-3, and the eighth switch Q2-4 are turned on (a high level is input), and the first switch Q1-1, the second switch Q1-2, the fifth switch Q2-1, and the sixth switch Q2-2 are turned off (a low level is input). The first resonant capacitor Cr1 and the second resonant capacitor Cr2 charge the first capacitor C1. In this case, the first capacitor C1 is an output capacitor. Because a duty cycle of a drive signal is close to 50%, a voltage at both ends of the first resonant capacitor Cr1 is equal to a voltage at both ends of the second resonant capacitor Cr2. That is, a voltage at both ends of the first capacitor C1 is equal to a voltage at both ends of the second capacitor C2, and the voltage at both ends of the first capacitor C1 is equal to a voltage of the third capacitor C3. Further, because the first capacitor C1, the second capacitor C2, and the third capacitor C3 are sequentially connected in series, and a total voltage is Vin, it may be understood, based on a series voltage division principle, that the voltage (output voltage Vo) at both ends of the first capacitor C1 is one third of the input voltage Vin, that is, a ratio of the input voltage Vin to the output voltage Vo is 3:1.

In this embodiment, the balancing module balances the voltages at both ends of the first capacitor and the second capacitor by controlling the switches in the first resonant circuit in conjunction with influence of the first resonant cavity on a current. The balancing module balances the voltages at both ends of the first capacitor and the third capacitor by controlling the switches in the second resonant circuit in conjunction with influence of the second resonant cavity on a current. Further, a voltage gain 3:1 is obtained based on a series voltage division principle of the three capacitors of the capacitor module.

Figure 31:
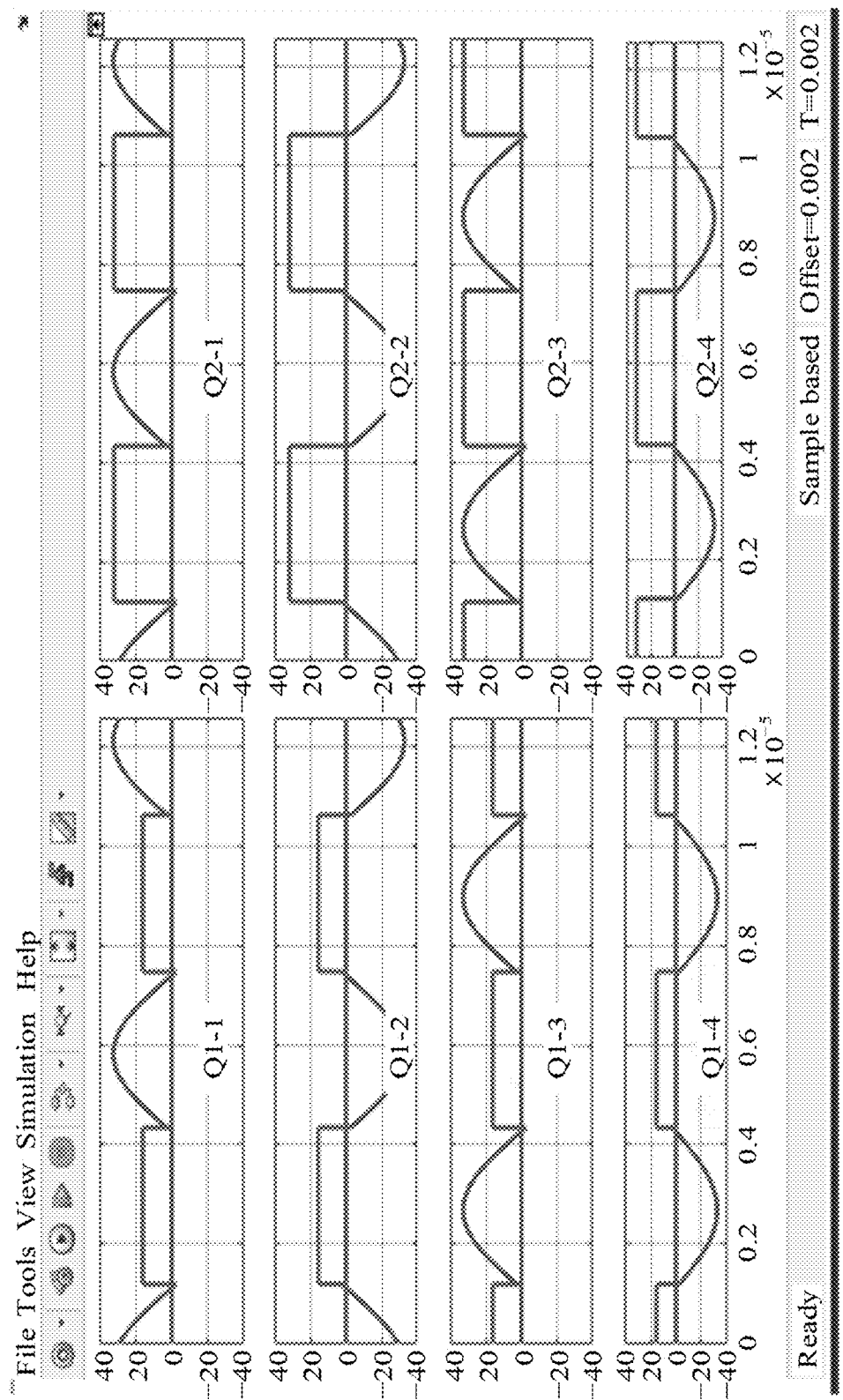
FIG. 31 is a simulation waveform diagram of an eighth embodiment of a conversion circuit according to an embodiment.

It may be understood from FIG. 31 that all current waveforms are half sine waves, and all currents start from zero, then resonate, and end at zero. Therefore, the currents of the switches are all zero when the switches are turned on and turned off. That is, the switches work in a zero-current switch ZCS state.

For ease of understanding, the following uses N=4 as an example for description.

3. A ratio of the input voltage to the output voltage is 4:1.

The capacitor module of the conversion circuit in this embodiment may have a plurality of forms, which are separately described below.

3.1. The first capacitor C1, the second capacitor C2, the third capacitor C3, and a fourth capacitor C4 are sequentially connected in series.

Figure 32:
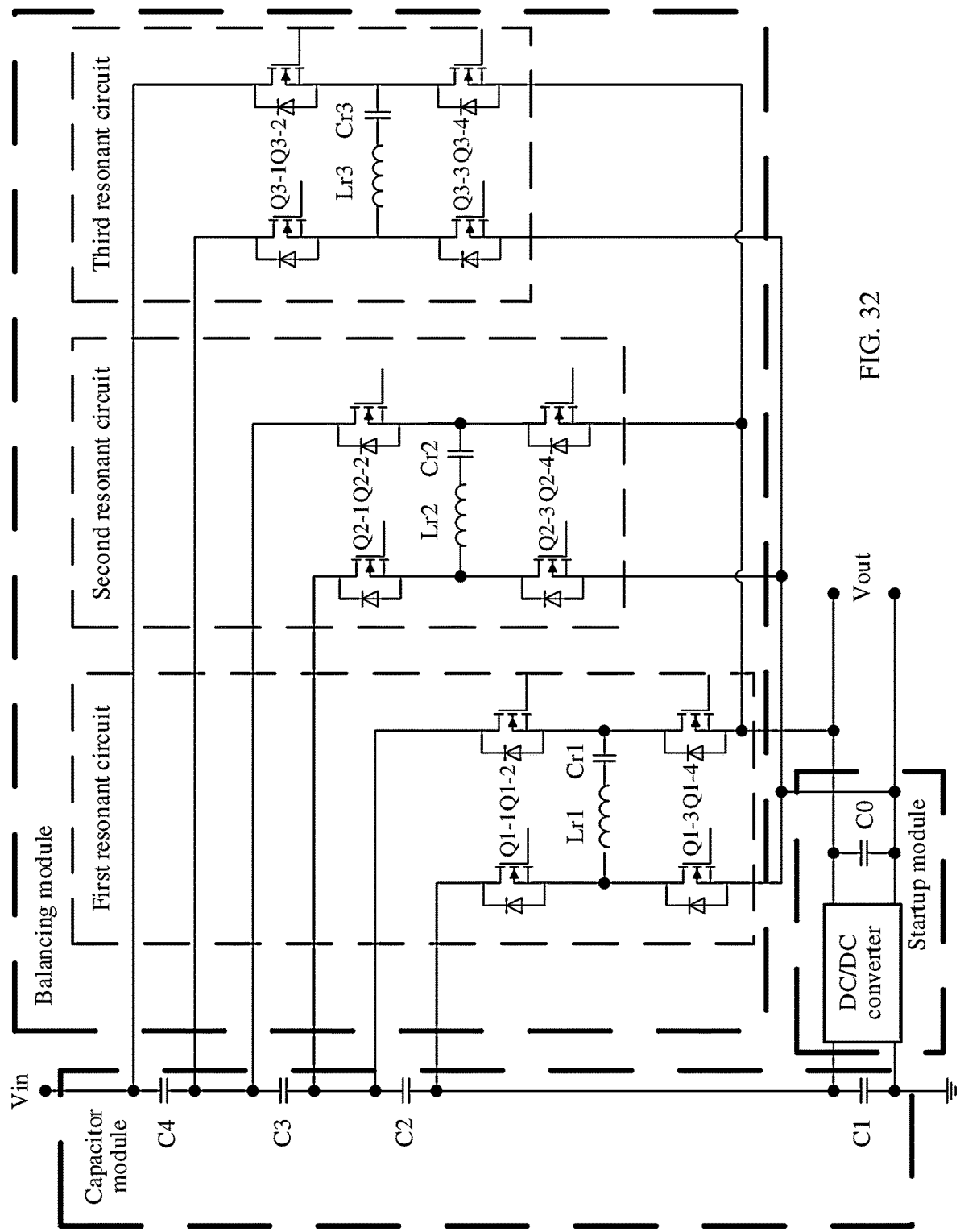
FIG. 32 is a schematic diagram of a ninth embodiment of a conversion circuit according to an embodiment.

FIG. 32 is a schematic diagram of a ninth embodiment of a conversion circuit according to an embodiment. An embodiment may provide a ninth embodiment of a conversion circuit, including a capacitor module and a balancing module.

The balancing module includes a first resonant circuit, a second resonant circuit, and a third resonant circuit. The capacitor module includes a first capacitor C1, a second capacitor C2, a third capacitor C3, and a fourth capacitor C4. The first resonant circuit includes at least four switches and a first resonant cavity. The four switches are respectively a first switch Q1-1, a second switch Q1-2, a third switch Q1-3, and a fourth switch Q1-4. The first resonant cavity includes a first resonant capacitor Cr1 and a first resonant inductor Lr1. The second resonant circuit includes at least four switches and a second resonant cavity. The four switches are respectively a fifth switch Q2-1, a sixth switch Q2-2, a seventh switch Q2-3, and an eighth switch Q2-4. The second resonant cavity includes a second resonant capacitor Cr2 and a second resonant inductor Lr2. The third resonant circuit includes at least four switches and a third resonant cavity. The four switches are respectively a ninth switch Q3-1, a tenth switch Q3-2, an eleventh switch Q3-3, and a twelfth switch Q3-4. The third resonant cavity includes a third resonant capacitor Cr3 and a third resonant inductor Lr3.

The first capacitor C1, the second capacitor C2, the third capacitor C3, and the fourth capacitor C4 are sequentially connected in series. The first switch Q1-1 is connected in series to the third switch Q1-3, and the second switch Q1-2 is connected in series to the fourth switch Q1-4. The fifth switch Q2-1 is connected in series to the seventh switch Q2-3, and the sixth switch Q2-2 is connected in series to the eighth switch Q2-4. The ninth switch Q3-1 is connected in series to the eleventh switch Q3-3, and the tenth switch Q3-2 is connected in series to the twelfth switch Q3-4.

A first end of the ninth switch Q3-1 is connected to one end of the fourth capacitor C4, and a first end of the tenth switch Q3-2 is connected to the other end of the fourth capacitor C4. A first end of the fifth switch Q2-1 is connected to one end of the third capacitor C3, and a first end of the sixth switch Q2-2 is connected to the other end of the third capacitor C3. A first end of the first switch Q1-1 is connected to one end of the second capacitor C2, and a first end of the second switch Q1-2 is connected to the other end of the second capacitor C2.

One end of the first capacitor C1 is separately connected to a second end of the eleventh switch Q3-3, a second end of the seventh switch Q2-3, and a second end of the third switch Q1-3. The other end of the first capacitor C1 is separately connected to a second end of the twelfth switch Q3-4, a second end of the eighth switch Q2-4, and a second end of the fourth switch Q1-4.

One end of the first resonant cavity is separately connected to a second end of the first switch Q1-1 and a first end of the third switch Q1-3, and the other end of the first resonant cavity is separately connected to a second end of the second switch Q1-2 and the first end of the fourth switch Q1-4. One end of the second resonant cavity is separately connected to a second end of the fifth switch Q2-1 and a first end of the seventh switch Q2-3, and the other end of the second resonant cavity is separately connected to a second end of the sixth switch Q2-2 and the second end of the eighth switch Q2-4. One end of the third resonant cavity is separately connected to a second end of the ninth switch Q3-1 and a first end of the eleventh switch Q3-3, and the other end of the third resonant cavity is separately connected to a second end of the tenth switch Q3-2 and the second end of the twelfth switch Q3-4.

Similar to FIG. 3, the ninth switch Q3-1 and the eleventh switch Q3-3 in this embodiment may be replaced with diodes.

A working principle in this embodiment is similar to the principle in the embodiments shown in FIG. 23 and FIG. 24. Details are not described herein.

3.2. The first capacitor C1, the second capacitor C2, and the third capacitor C3 are connected in series and then connected in parallel to the fourth capacitor C4.

Figure 33:
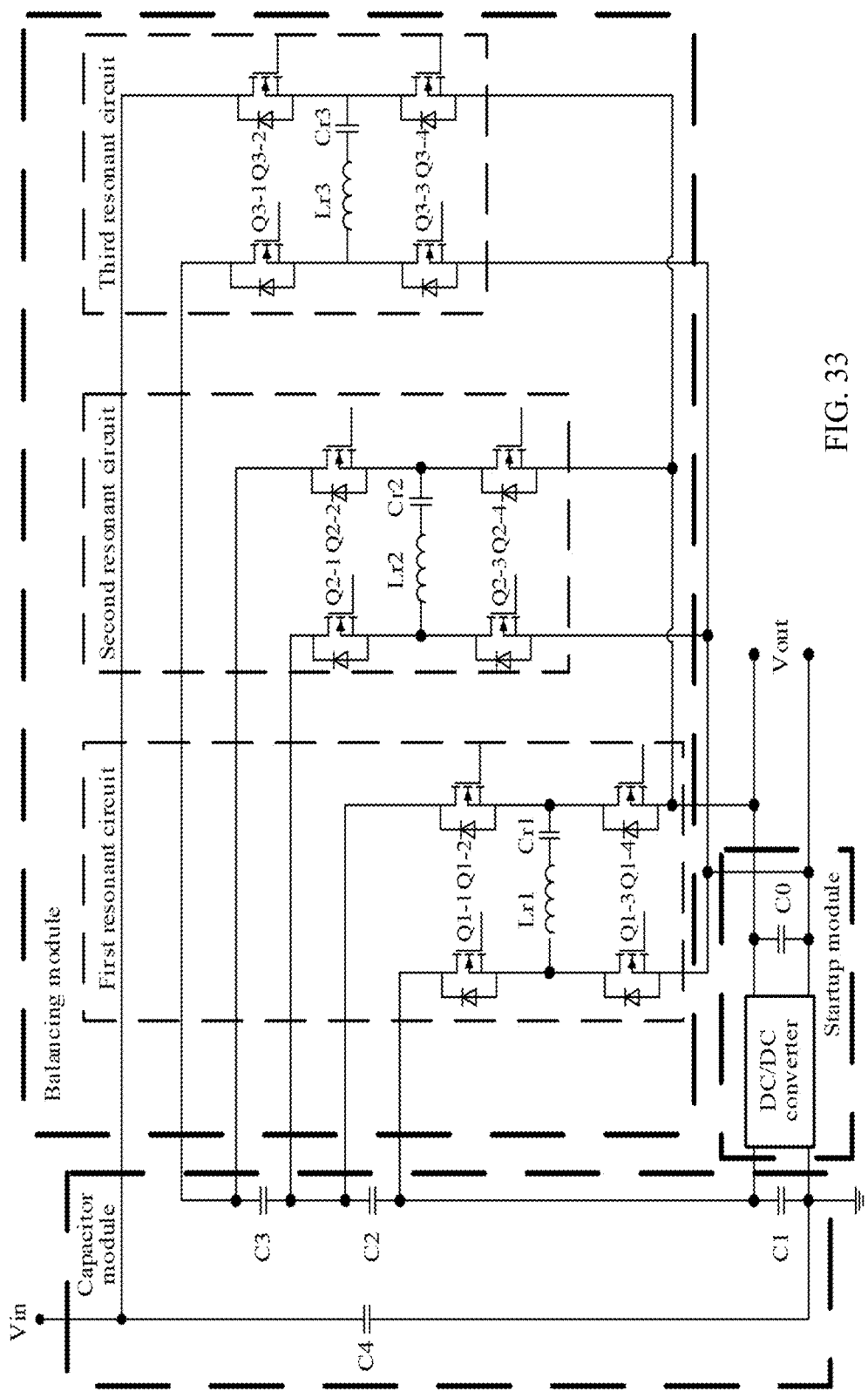
FIG. 33 is a schematic diagram of a tenth embodiment of a conversion circuit according to an embodiment.

FIG. 33 is a schematic diagram of a tenth embodiment of a conversion circuit according to an embodiment. An embodiment may provide a tenth embodiment of a conversion circuit. Components in this embodiment are similar to the components corresponding to FIG. 32, and details are not described herein. A difference lies in a connection manner of the fourth capacitor C4. The following describes a structure.

The first capacitor C1, the second capacitor C2, and the third capacitor C3 are connected in series and then connected in parallel to the fourth capacitor C4. The first switch Q1-1 is connected in series to the third switch Q1-3, and the second switch Q1-2 is connected in series to the fourth switch Q1-4. The fifth switch Q2-1 is connected in series to the seventh switch Q2-3, and the sixth switch Q2-2 is connected in series to the eighth switch Q2-4. The ninth switch Q3-1 is connected in series to the eleventh switch Q3-3, and the tenth switch Q3-2 is connected in series to the twelfth switch Q3-4.

A first end of the ninth switch Q3-1 is connected to one end of the fourth capacitor C4, and a first end of the tenth switch Q3-2 is separately connected to one end of the third capacitor C3 and a first end of the fifth switch Q2-1. A first end of the sixth switch Q2-2 is connected to the other end of the third capacitor C3. A first end of the first switch Q1-1 is connected to one end of the second capacitor C2, and a first end of the second switch Q1-2 is connected to the other end of the second capacitor C2.

One end of the first capacitor C1 is separately connected to a second end of the eleventh switch Q3-3, a second end of the seventh switch Q2-3, and a second end of the third switch Q1-3. The other end of the first capacitor C1 is separately connected to a second end of the twelfth switch Q3-4, a second end of the eighth switch Q2-4, and a second end of the fourth switch Q1-4.

One end of the first resonant cavity is separately connected to a second end of the first switch Q1-1 and a first end of the third switch Q1-3, and the other end of the first resonant cavity is separately connected to a second end of the second switch Q1-2 and the second end of the fourth switch Q1-4. One end of the second resonant cavity is separately connected to a second end of the fifth switch Q2-1 and a first end of the seventh switch Q2-3, and the other end of the second resonant cavity is separately connected to a second end of the sixth switch Q2-2 and the second end of the eighth switch Q2-4. One end of the third resonant cavity is separately connected to a second end of the ninth switch Q3-1 and a first end of the eleventh switch Q3-3, and the other end of the third resonant cavity is separately connected to a second end of the tenth switch Q3-2 and the second end of the twelfth switch Q3-4.

A working principle in this embodiment is similar to the principle in the embodiments shown in FIG. 23 and FIG. 24. Details are not described herein. A voltage gain may be 4:1.

3.3. The first capacitor C1, the second capacitor C2, and the third capacitor C3 are connected in series and then connected in parallel to a direct current power supply V_dc.

Figure 34:
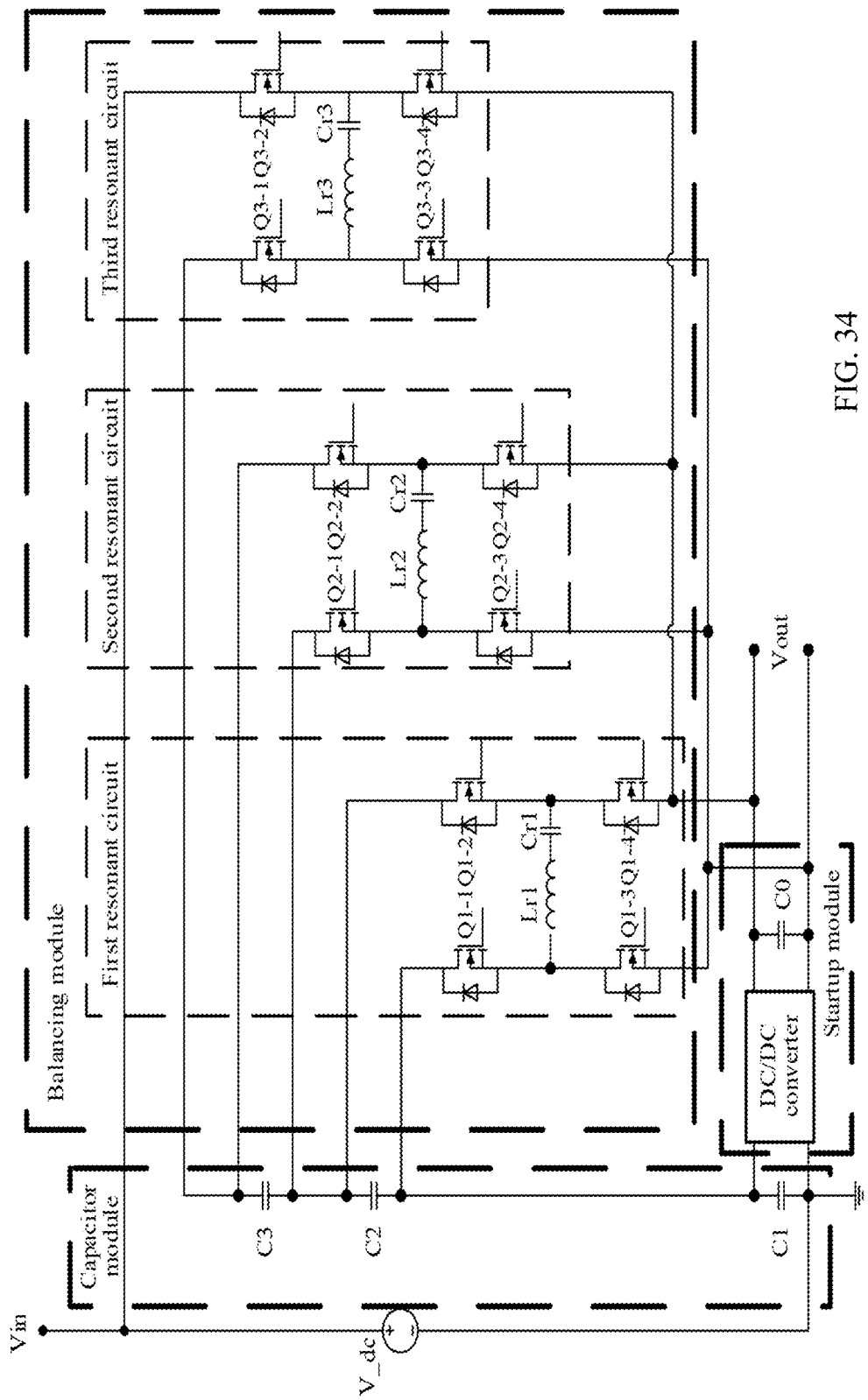
FIG. 34 is a schematic diagram of an eleventh embodiment of a conversion circuit according to an embodiment.

FIG. 34 is a schematic diagram of an eleventh embodiment of a conversion circuit according to an embodiment. An embodiment may provide an eleventh embodiment of a conversion circuit. Components in this embodiment are similar to the components corresponding to FIG. 33, and details are not described herein. A difference lies in that the fourth capacitor C4 is replaced with the direct current power supply V_dc (as shown in FIG. 34).

A working principle in this embodiment is similar to the principle in the embodiments shown in FIG. 23 and FIG. 24. Details are not described herein. A voltage gain may be 4:1.

The foregoing describes the buck conversion circuit. The following describes a boost conversion circuit.

II. Boost (a Voltage at Both Ends of a First Capacitor is an Input Voltage, and a Voltage at Both Ends of a Capacitor Module is an Output Voltage)

Components and connection relationships between the components in the boost conversion circuit are similar to the components and the connection relationships between the components in the buck conversion circuit. The components and the connection relationships between the components are not described in detail below. For boost and buck, Vin and Vo may be interchanged. The following describes a boost principle.

For ease of understanding, different transformation ratios are separately described below.

1. A ratio of the input voltage to the output voltage is 1:N.

Figure 35:
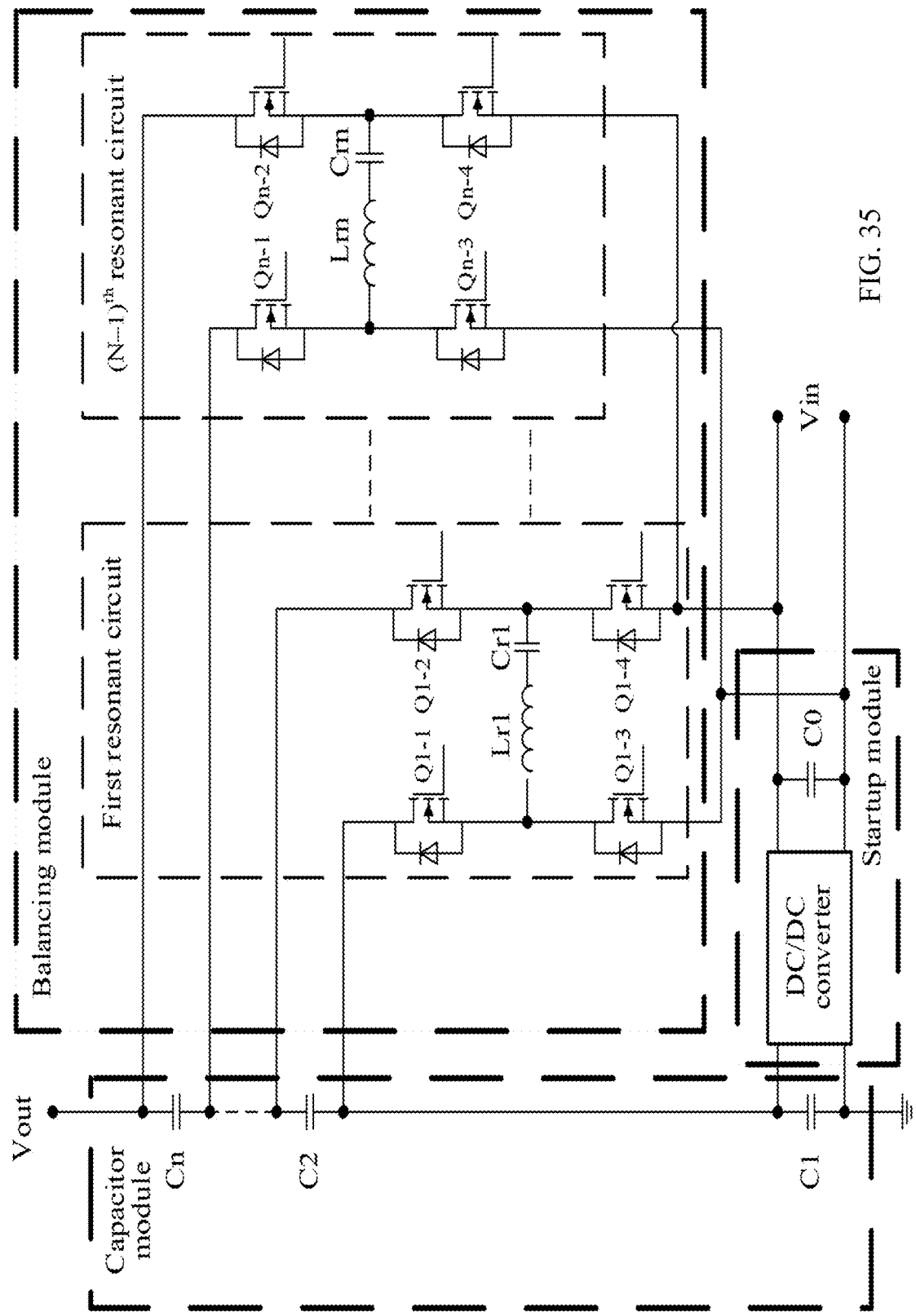
FIG. 35 is a schematic diagram of a twelfth embodiment of a conversion circuit according to an embodiment.

FIG. 35 is a schematic diagram of a twelfth embodiment of a conversion circuit according to an embodiment. An embodiment may provide a twelfth embodiment of a conversion circuit. Components and connection relationships between the components in this embodiment are similar to the components and the connection relationships between the components corresponding to N:1, and details are not described herein. A difference lies in that Vin and Vo are interchanged (as shown in FIG. 35). The following describes a boost conversion circuit that may correspond to the buck conversion circuit shown in FIG. 13, and boost conversion circuits corresponding to FIG. 14 and FIG. 15 are not described herein.

In this embodiment, when the input voltage Vin is connected to both ends of the first capacitor C1, and the output voltage Vo is a voltage at both ends of the capacitors C1 to Cn that are connected in series, the circuit is a boost circuit.

In this embodiment, after the third switch Q1-3 and the fourth switch Q1-4 are turned on, the first capacitor C1 charges the first resonant circuit; after the seventh switch Qn-3 and the eighth switch Qn-4 are turned on, the first capacitor C1 charges the $(N-1)^{th}$ resonant circuit; after the first switch Q1-1 and the second switch Q1-2 are turned on, the first resonant circuit charges the second capacitor C2; and after the fifth switch Qn-1 and the sixth switch Qn-2 are turned on, the $(N-1)^{th}$ resonant circuit charges the $N^{th}$ capacitor Cn, so that a voltage at both ends of the $N^{th}$ capacitor Cn is equal to a voltage at both ends of the first capacitor C1, and a voltage at both ends of the second capacitor C2 is equal to the voltage at both ends of the first capacitor C1. Further, because the first capacitor C1, the second capacitor C2, and the $N^{th}$ capacitor Cn are sequentially connected in series, the voltage at both ends of the first capacitor C1 to the $N^{th}$ capacitor Cn is N times the voltage at both ends of the first capacitor C1, so that the output voltage Vo is N times the input voltage Vin. That is, a voltage gain is N:1 (Vin:Vo=1:N).

For ease of understanding, the following also uses N=3 as an example for detailed description.

2. A ratio of the input voltage to the output voltage is 1:3.

Figure 36:
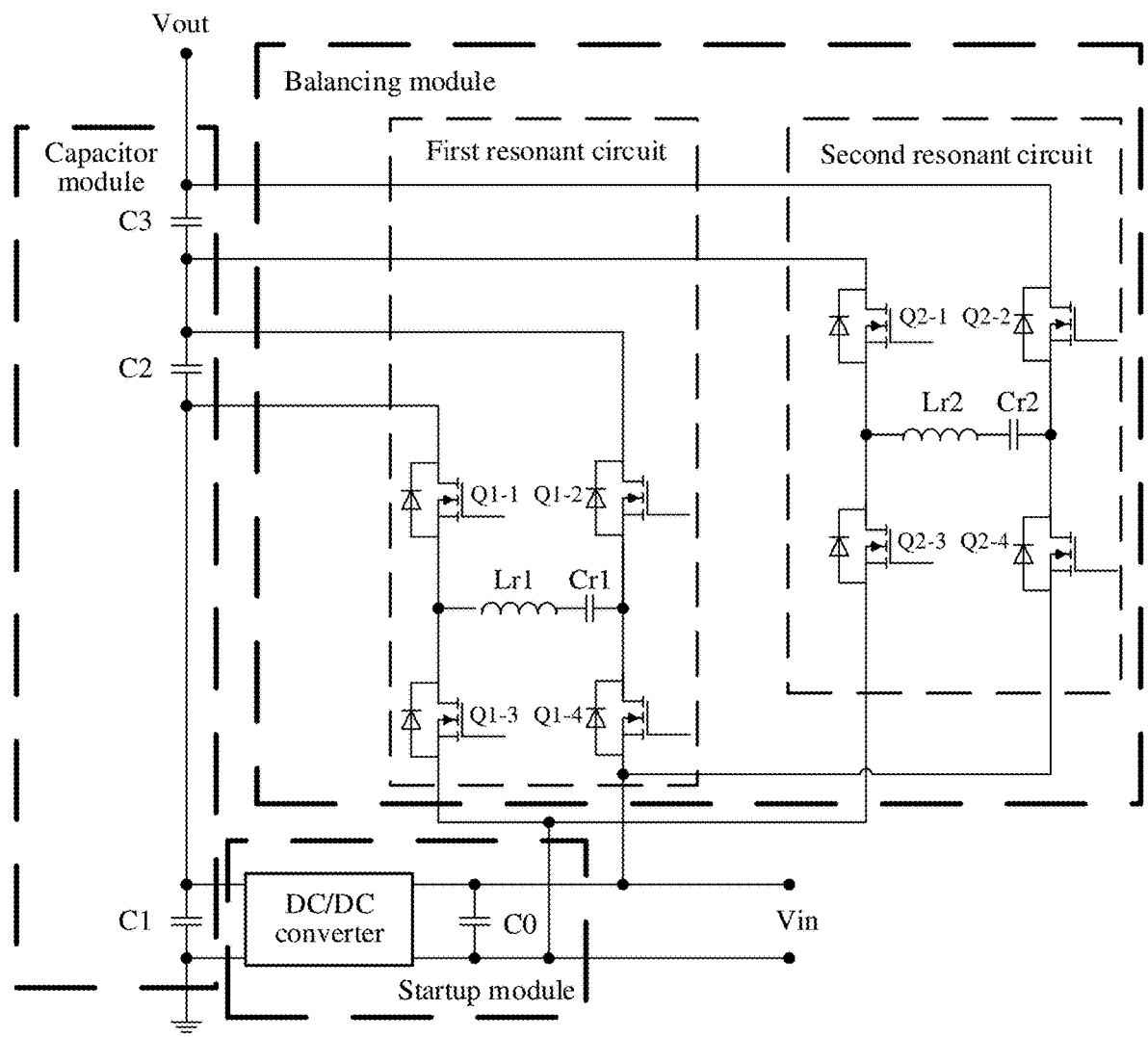
FIG. 36 is a schematic diagram of a thirteenth embodiment of a conversion circuit according to an embodiment.

FIG. 36 is a schematic diagram of a thirteenth embodiment of a conversion circuit according to an embodiment. An embodiment may provide a thirteenth embodiment of a conversion circuit. Components and connection relationships between the components in this embodiment are similar to the components and the connection relationships between the components corresponding to FIG. 16, and details are not described herein. A difference lies in that Vin and Vo are interchanged (as shown in FIG. 36). The following describes a boost conversion circuit that may correspond to the buck conversion circuit shown in FIG. 5, and boost conversion circuits corresponding to FIG. 22 and FIG. 25 are not described herein.

The following describes in detail the working principle in this embodiment by using in-phase driving of the switches as an example.

Figure 37:
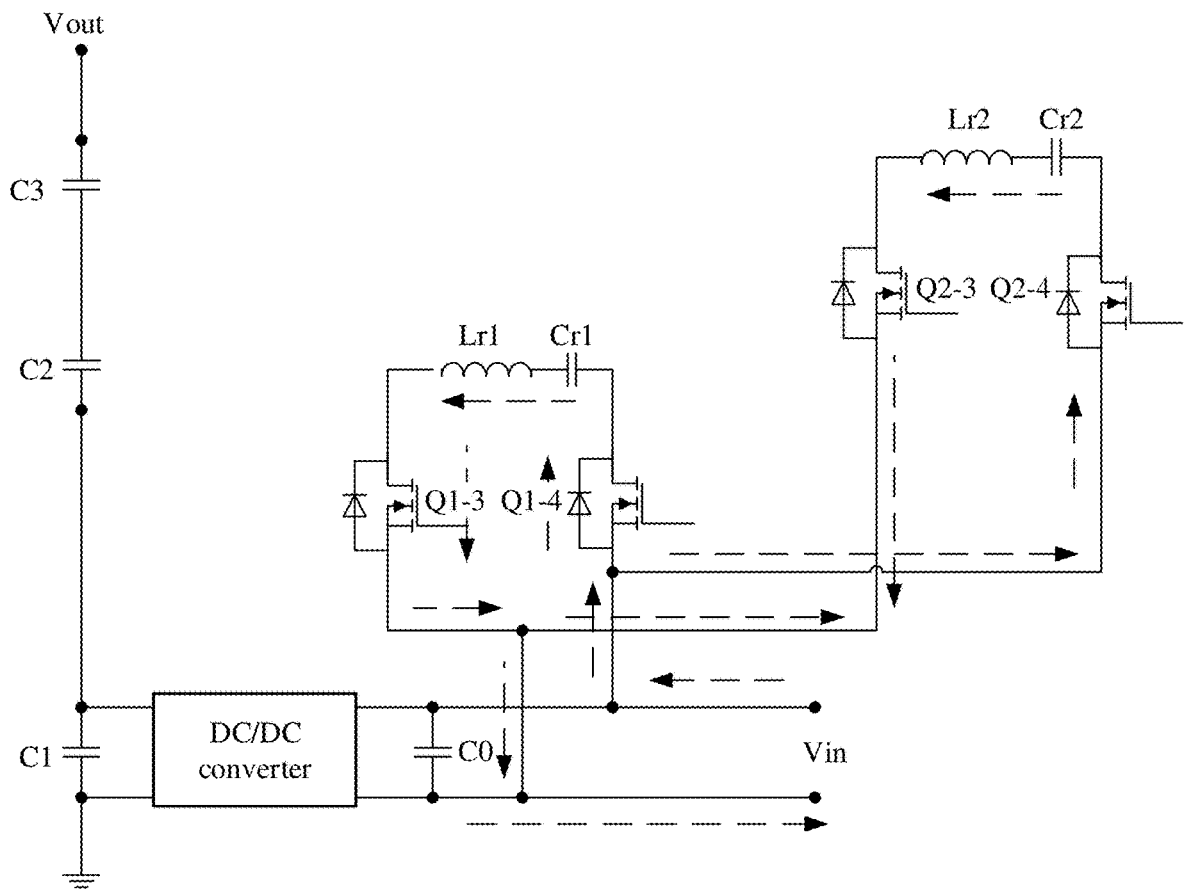
FIG. 37 is an equivalent diagram of a conversion circuit in a first cycle in a thirteenth embodiment according to an embodiment.

2.1. First Cycle:

FIG. 36 may be equivalent to FIG. 37, when the third switch Q1-3, the fourth switch Q1-4, the seventh switch Q2-3, and the eighth switch Q2-4 are turned on (a high level is input), and the first switch Q1-1, the second switch Q1-2, the fifth switch Q2-1, and the sixth switch Q2-2 are turned off (a low level is input). The first capacitor C1 charges the first resonant capacitor Cr1, and the first capacitor C1 charges the second resonant capacitor Cr2.

Figure 38:
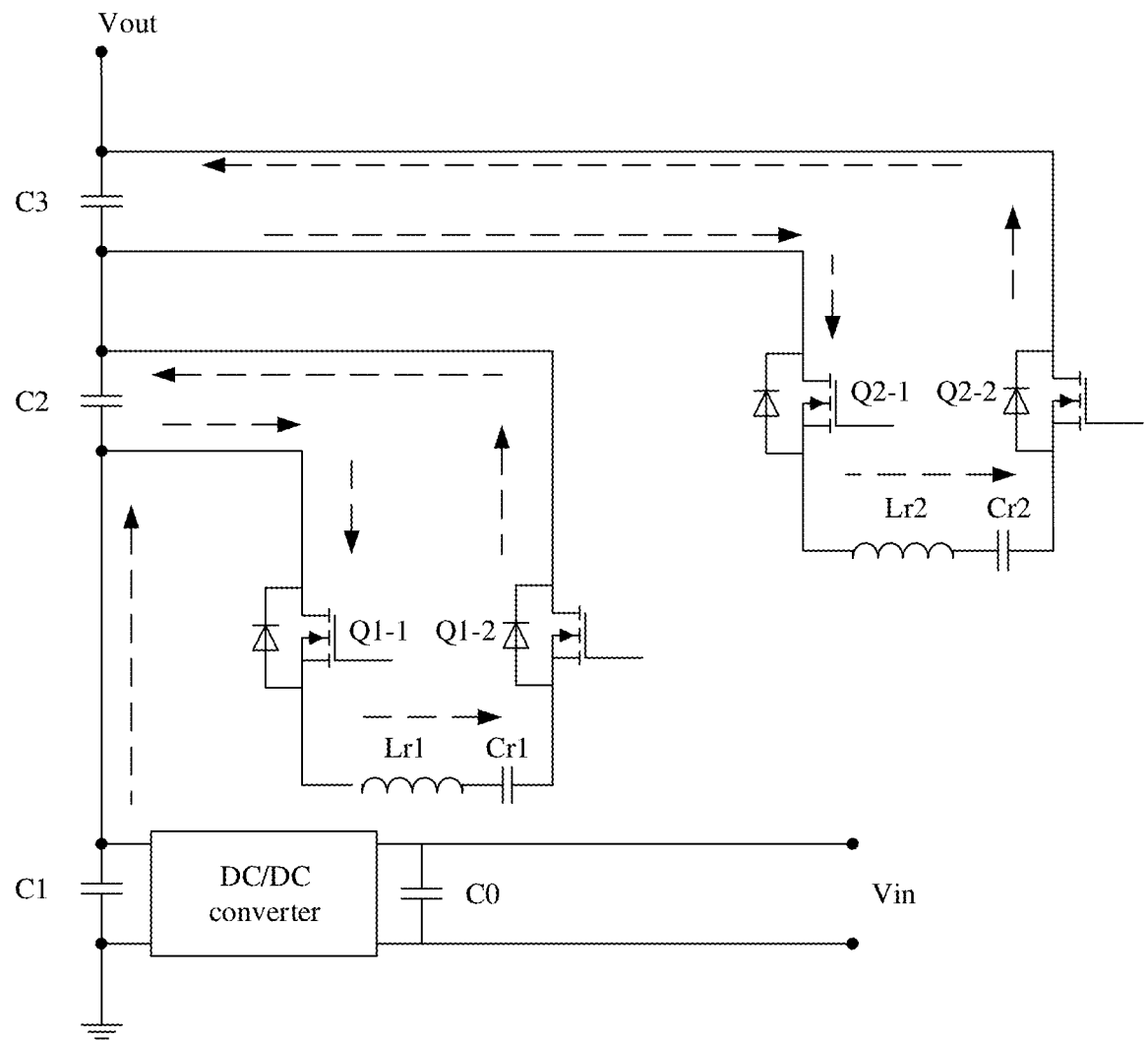
FIG. 38 is an equivalent diagram of a conversion circuit in a second cycle in a thirteenth embodiment according to an embodiment.

2.2. Second Cycle:

FIG. 36 may be equivalent to FIG. 38, when the first switch Q1-1, the second switch Q1-2, the fifth switch Q2-1, and the sixth switch Q2-2 are turned on (a high level is input), and the third switch Q1-3, the fourth switch Q1-4, the seventh switch Q2-3, and the eighth switch Q2-4 are turned off (a low level is input). The first resonant capacitor Cr1 charges the second capacitor C2, and the second resonant capacitor Cr2 charges the third capacitor C3. In this case, the first capacitor C1 is an input capacitor. Because a voltage at both ends of the first resonant capacitor Cr1 is equal to a voltage at both ends of the first capacitor C1, and the first resonant capacitor Cr1 charges the second capacitor C2, a voltage at both ends of the second capacitor C2 is equal to the voltage at both ends of the first capacitor C1. Similarly, a voltage at both ends of the third capacitor C3 is equal to the voltage at both ends of the first capacitor C1. That is, the voltage at both ends of the first capacitor C1, the voltage at both ends of the second capacitor C2, and the voltage at both ends of the third capacitor C3 are equal. Therefore, a voltage at both ends of the first capacitor C1 to the third capacitor C3 is three times the voltage at both ends of the first capacitor C1, so that the output voltage Vo is three times the input voltage Vin. That is, a voltage gain is 1:3 (Vin:Vo=1:3).

For ease of understanding, the following also uses N=4 as an example for detailed description.

3. A ratio of the input voltage to the output voltage is 1:4.

Figure 39:
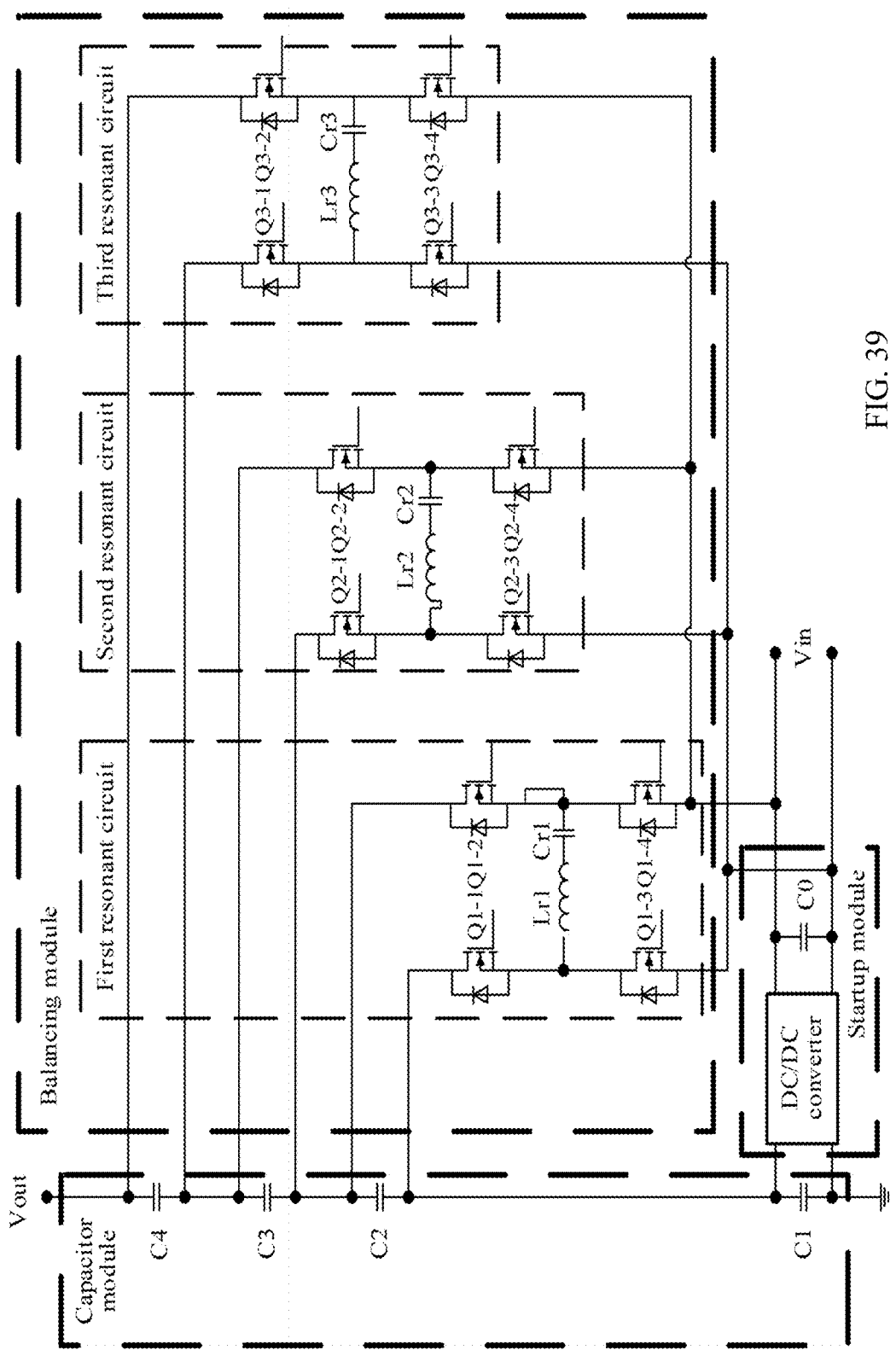
FIG. 39 is a schematic diagram of a fourteenth embodiment of a conversion circuit according to an embodiment.
Figure 40:
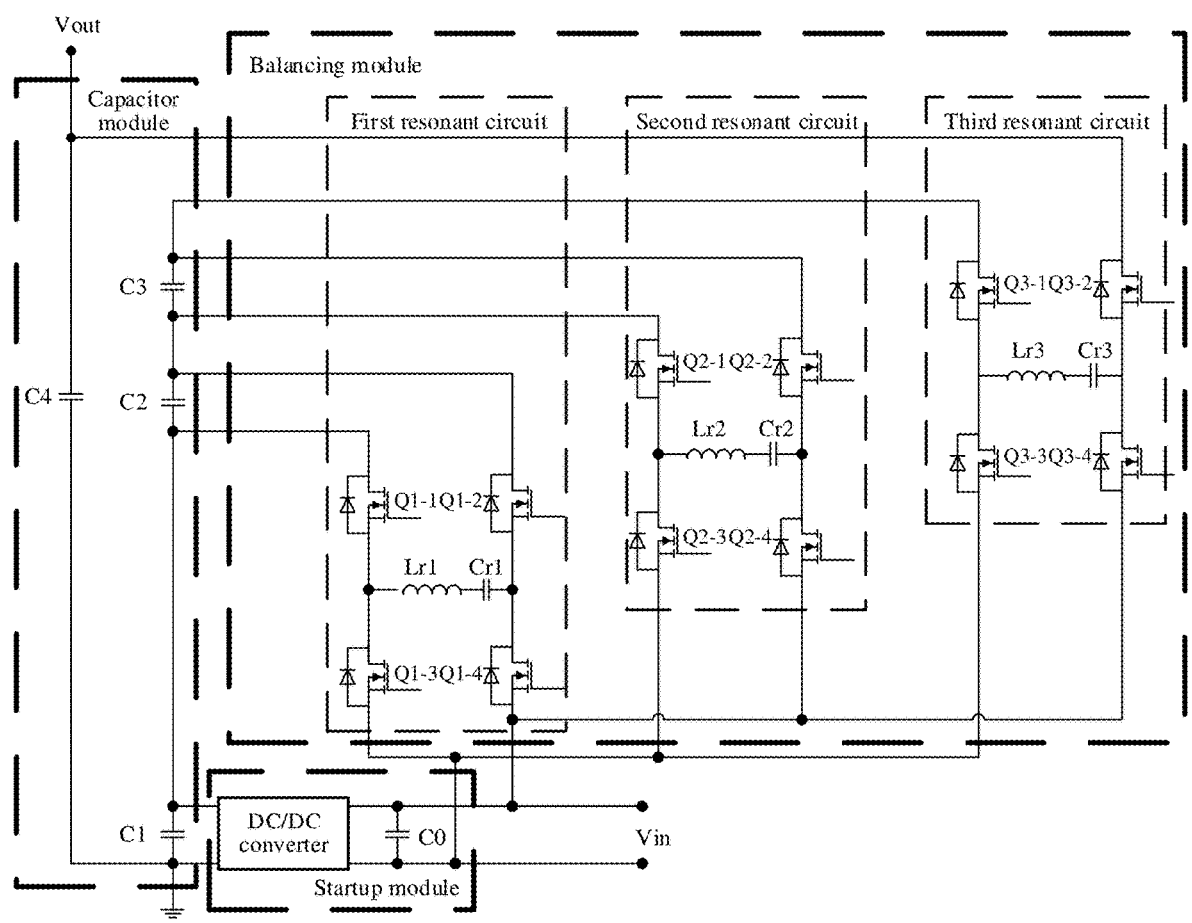
FIG. 40 is a schematic diagram of a fifteenth embodiment of a conversion circuit according to an embodiment.
Figure 41:
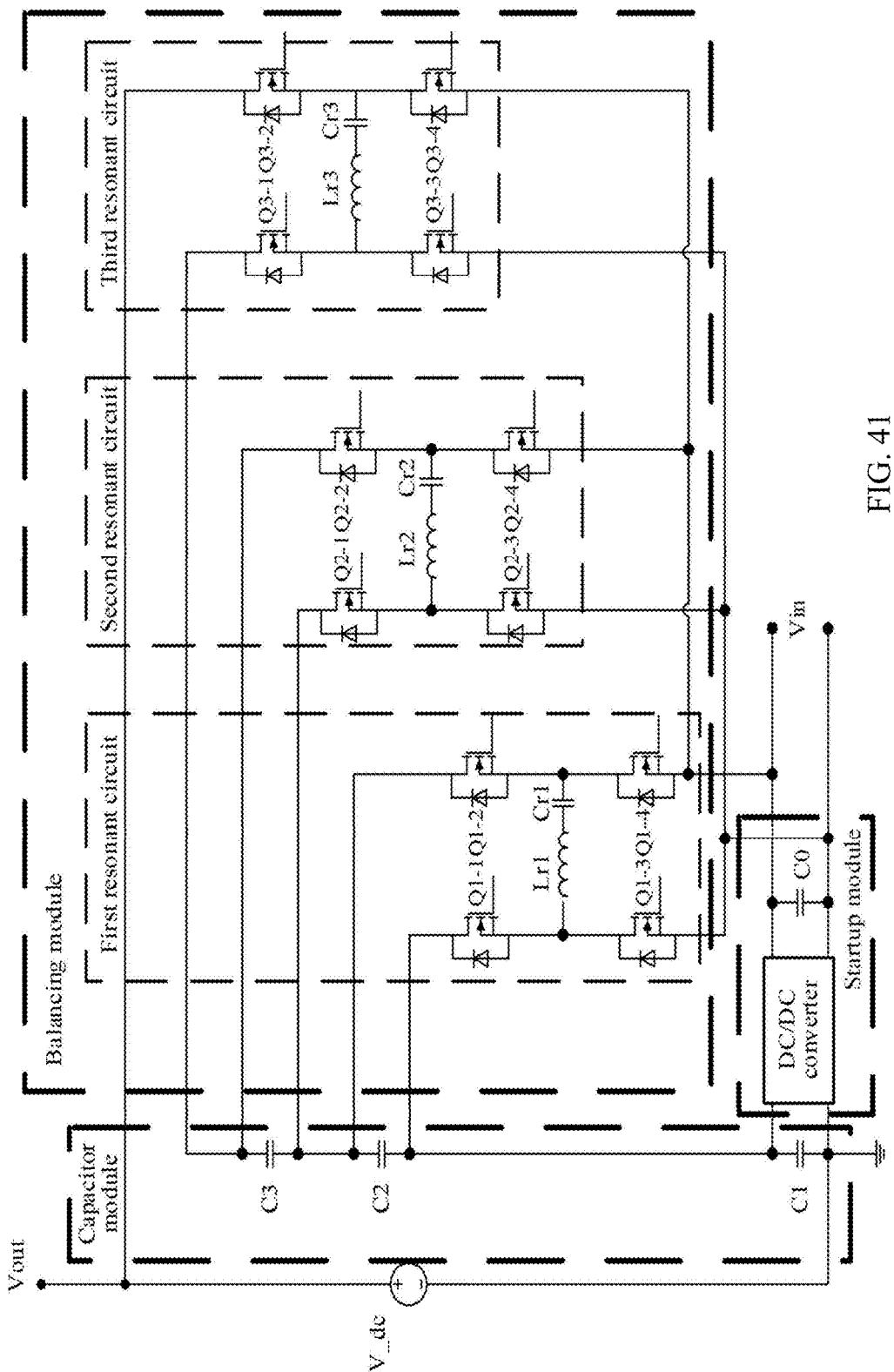
FIG. 41 is a schematic diagram of a sixteenth embodiment of a conversion circuit according to an embodiment.

FIG. 39 is a schematic diagram of a fourteenth embodiment of a conversion circuit according to an embodiment. An embodiment may provide a fourteenth embodiment of a conversion circuit. Components and connection relationships between the components in this embodiment are similar to the components and the connection relationships between the components corresponding to FIG. 32, and details are not described herein. A difference lies in that Vin and Vo are interchanged (as shown in FIG. 39). The following describes a boost conversion circuit that may correspond to the buck conversion circuit shown in FIG. 32, and a boost conversion circuit (a schematic diagram of a fifteenth embodiment of a conversion circuit according to an embodiment, as shown in FIG. 40) corresponding to FIG. 33 and a boost conversion circuit (a schematic diagram of a sixteenth embodiment of a conversion circuit according to an embodiment, as shown in FIG. 41) corresponding to FIG. 34 are not described herein.

A principle is similar to the principle of 1:3, and details are not described herein. Similarly, a voltage at both ends of the third capacitor C3 is equal to a voltage at both ends of the first capacitor C1, and a voltage at both ends of the fourth capacitor C4 is equal to the voltage at both ends of the first capacitor C1. That is, the voltage at both ends of the first capacitor C1, the voltage at both ends of the second capacitor C2, the voltage at both ends of the third capacitor C3, and the voltage at both ends of the fourth capacitor C4 are equal. Therefore, a voltage at both ends of the first capacitor C1 to the fourth capacitor C4 is four times the voltage at both ends of the first capacitor C1, so that the output voltage Vo is four times the input voltage Vin. That is, a voltage gain is 1:4 (Vin:Vo=1:4).

In the embodiments, energy transfer may be performed between the first capacitor C1 and each resonant circuit, energy transfer is performed between each resonant circuit and another capacitor, and the duty cycle of each switch is approximately 50%, so that the voltage at both ends of the first capacitor C1 is equal to a voltage at both ends of the another capacitor. In this way, a balanced voltage gain is obtained. Further, Vin and Vo are interchanged, so that the boost and buck principles are implemented.

In addition to the foregoing form, the conversion circuit in the embodiments may alternatively use a form in which quantities of components are increased, or another form, to implement the effect achieved in the embodiments. This is not limited herein.

In the embodiments, the second switch, the fourth switch, the sixth switch, the eighth switch, the tenth switch, and the twelfth switch may be NMOSs or IGBTs, and the first switch, the third switch, the fifth switch, the seventh switch, the ninth switch, and the eleventh switch may be diodes.

The conversion circuit in the embodiments may be applied to various electronic devices. For example, the power supply module shown in FIG. 1 may be applied to an electronic device shown in FIG. 42.

Figure 42:
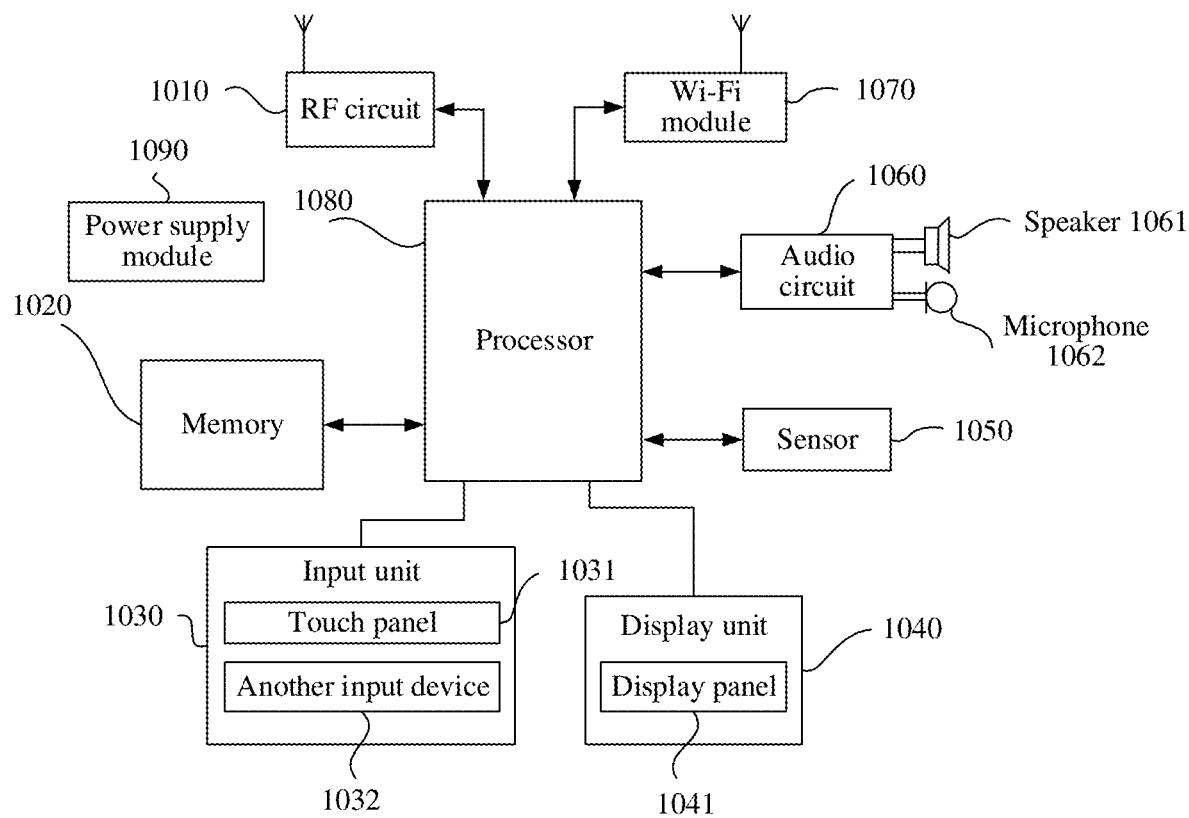
FIG. 42 is a schematic diagram of a structure of an electronic device in which a power supply module is located according to an embodiment.

As shown in FIG. 42, the electronic device may be any electronic device that includes a power supply module, such as a mobile phone, a tablet computer, a personal digital assistant (PDA), a point of sales (POS), or a vehicle-mounted computer. An example in which the electronic device is a mobile phone is used.

FIG. 42 shows a block diagram of a partial structure of a mobile phone related to the electronic device provided in the embodiments. As shown in FIG. 42, the mobile phone may include components such as a radio frequency (RF) circuit 1010, a memory 1020, an input unit 1030, a display unit 1040, a sensor 1050, an audio circuit 1060, a wireless fidelity (Wi-Fi) module 1070, a processor 1080, and a power supply module 1090. Persons skilled in the art may understand that the structure of the mobile phone shown in FIG. 42 does not constitute a limitation on the mobile phone, and the mobile phone may include more or fewer components than those shown in the figure, or combine some components, or have different component arrangements.

The following describes each component of the mobile phone with reference to FIG. 42.

The RF circuit 1010 may be configured to receive and send a signal in an information receiving and sending process or a call process. After receiving downlink information of a base station, the RF circuit 1010 sends the downlink information to the processor 1080 for processing. In addition, the RF circuit 1010 sends related uplink data to the base station. The RF circuit 1010 may include, but is not limited to, an antenna, at least one amplifier, a transceiver, a coupler, a low noise amplifier (LNA), a duplexer, and the like. In addition, the RF circuit 1010 may further communicate with a network and another device through wireless communication. The wireless communication may use any communication standard or protocol, including, but not limited to, the Global System for Mobile communications (GSM), a general packet radio service (GPRS), code division multiple access (CDMA), wideband code division multiple access (WCDMA), Long Term Evolution (LTE), an email, a short message service (SMS), and the like.

The memory 1020 may be configured to store a software program and a module. The processor 1080 performs various functional applications of the mobile phone and data processing by running the software program and the module that are stored in the memory 1020. The memory 1020 may include a program storage area and a data storage area. The program storage area may store an operating system, an application required by at least one function (for example, a sound playing function or an image playing function), and the like. The data storage area may store data (for example, audio data or an address book) created based on use of the mobile phone, and the like. In addition, the memory 1020 may include a high-speed random access memory, or may include a nonvolatile memory, such as at least one magnetic disk storage device, a flash device, or another volatile solid-state storage device.

The input unit 1030 may be configured to receive input digital or character information and to generate key signal input related to user setting and function control of the mobile phone. The input unit 1030 may include a touch panel 1031 and another input device 1032. The touch panel 1031, also referred to as a touchscreen, may collect a touch operation of a user on or near the touch panel 1031 (for example, an operation performed by the user on or near the touch panel 1031 by using any suitable object or accessory such as a finger or a stylus) and drive a corresponding connecting apparatus based on a preset program. Optionally, the touch panel 1031 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, and sends the touch coordinates to the processor 1080, and can receive and execute a command sent by the processor 1080. In addition, the touch panel 1031 may be implemented by using a plurality of types, such as a resistive type, a capacitive type, an infrared ray type, and a surface acoustic wave type. In addition to the touch panel 1031, the input unit 1030 may include the another input device 1032. The another input device 1032 may include, but be not limited to, one or more of a physical keyboard, a functional key (such as a volume control key or an on/off key), a trackball, a mouse, or a joystick.

The display unit 1040 may be configured to display information entered by the user or information provided for the user and various menus of the mobile phone. The display unit 1040 may include a display panel 1041. Optionally, the display panel 1041 may be configured in a form of a liquid crystal display (LCD), an organic light-emitting diode (OLED), or the like. Further, the touch panel 1031 may cover the display panel 1041. After detecting a touch operation on or near the touch panel 1031, the touch panel 1031 transmits the touch operation to the processor 1080 to determine a type of a touch event. Then, the processor 1080 provides corresponding visual output on the display panel 1041 based on the type of touch event. Although in FIG. 42, the touch panel 1031 and the display panel 1041 are used as two independent components to implement input and output functions of the mobile phone, in some embodiments, the touch panel 1031 and the display panel 1041 may be integrated to implement the input and output functions of the mobile phone.

The mobile phone may further include at least one type of sensor 1050, for example, a light sensor, a motion sensor, and another sensor. The light sensor may include an ambient light sensor and a proximity sensor. The ambient light sensor may adjust brightness of the display panel 1041 based on intensity of ambient light. The proximity sensor may turn off the display panel 1041 and/or backlight when the mobile phone moves to an ear. As a type of movement sensor, an accelerometer sensor may detect a value of acceleration in each direction, such as on three axes, may detect a value and a direction of gravity in a stationary state, and may be used in an application for identifying a mobile phone posture (such as screen switching between a landscape mode and a portrait mode, a related game, or magnetometer posture calibration), a function related to vibration identification (such as a pedometer or a knock), or the like. Other sensors such as a gyroscope, a barometer, a hygrometer, a thermometer, or an infrared sensor may be further configured in the mobile phone. Details are not described herein.

The audio circuit 1060, a speaker 1061, and a microphone 1062 may provide an audio interface between the user and the mobile phone. The audio circuit 1060 may transmit an electrical signal converted from received audio data to the speaker 1061, and the speaker 1061 converts the electrical signal into a sound signal for output. On the other hand, the microphone 1062 converts a collected sound signal into an electrical signal, and the audio circuit 1060 receives the electrical signal, converts the electrical signal into audio data, and then outputs the audio data to the processor 1080 for processing. Then, the processor 1080 sends the audio data to, for example, another mobile phone by using the RF circuit 1010, or outputs the audio data to the memory 1020 for further processing.

Wi-Fi belongs to a short-range wireless transmission technology. The mobile phone may use the Wi-Fi module 1070 to help the user receive and send an email, browse a web page, access streaming media, and so on. The Wi-Fi module 1070 provides wireless broadband Internet access for the user. Although FIG. 42 shows the Wi-Fi module 1070, it may be understood that the Wi-Fi module 1070 is not a mandatory component of the mobile phone.

The processor 1080 is a control center of the mobile phone, is connected to various parts of the entire mobile phone by using various interfaces and lines, and performs various functions of the mobile phone and processes data by running or executing the software program and/or the module stored in the memory 1020 and invoking the data stored in the memory 1020, to monitor the mobile phone as a whole. Optionally, the processor 1080 may include one or more processing units. The processor 1080 may integrate an application processor and a modem processor. The application processor may process an operating system, a user interface, an application, and the like. The modem processor may process wireless communication. It may be understood that the foregoing modem processor may be not integrated into the processor 1080.

The mobile phone further includes a power supply 1090 (for example, a battery) that supplies power to each component. The power supply may be logically connected to the processor 1080 by using a power management system, to implement functions such as charging management, discharging management, and power consumption management by using the power management system.

Although not shown, the mobile phone may further include a camera, a Bluetooth module, and the like. Details are not described herein.

The conversion circuit provided in the embodiments is described in detail above. The principle and implementation are described herein through examples. The description of the embodiments is merely provided to help understand the method and ideas. In addition, persons of ordinary skill in the art can make variations and modifications. Therefore, the content of the embodiments shall not be construed as limiting.

What is claimed is:

1. A conversion circuit comprising:

a capacitor module, wherein the capacitor module comprises at least a first capacitor and a second capacitor;

a balancing module, wherein the balancing module comprises at least a first resonant circuit; and a startup module, wherein the startup module comprises a direct current-direct current converter separately coupled to both ends of a target capacitor, the first resonant circuit comprises at least two groups of switches connected in parallel to each other and a first resonant cavity connected between the two groups of switches, the first capacitor is connected in series to the second capacitor, and the first capacitor is connected in parallel to the target capacitor, the first resonant circuit is separately connected to both ends of the target capacitor and the second capacitor, the balancing module is configured to balance voltages at both ends of the first capacitor and the second capacitor by controlling the switches in the first resonant circuit in conjunction with influence of the first resonant cavity on a current, the startup module is configured to start the balancing module and the capacitor module;

wherein one group of switches in the two groups of switches in the first resonant circuit further comprises: at least a first switch and a third switch, the other group of switches in the two groups of switches in the first resonant circuit further comprises: at least a second switch and a fourth switch, the first switch and the third switch are not simultaneously turned on, and the second switch and the fourth switch are not simultaneously turned on; and wherein the first switch is connected in series to the third switch, and the second switch is connected in series to the fourth switch; one end of the second capacitor is connected to a first end of the second switch, and the other end of the second capacitor is separately connected to a first end of the first switch, a first end of the direct current-direct current converter, and one end of the first capacitor; a second end of the direct current-direct current converter is separately connected to one end of the target capacitor and a second end of the fourth switch; the other end of the first capacitor is connected to a third end of the direct current-direct current converter; and a fourth end of the direct current-direct current converter is separately connected to a second end of the third switch and the other end of the target capacitor.

2. The conversion circuit according to claim 1, wherein the first resonant cavity further comprises:

at least a first resonant capacitor and a first resonant inductor, one end of the first resonant cavity is separately connected to a second end of the first switch and a first end of the third switch, and the other end of the first resonant cavity is separately connected to a second end of the second switch and a first end of the fourth switch.

3. The conversion circuit according to claim 1, wherein the capacitor module further comprises:

a third capacitor, the balancing module further comprises:

a second resonant circuit comprising at least two groups of switches connected in parallel to each other and a second resonant cavity connected between the two groups of switches;

one group of switches in the two groups of switches in the second resonant circuit comprises at least a fifth switch and a seventh switch, the other group of switches in the two groups of switches in the second resonant circuit comprises at least a sixth switch and an eighth switch, and the second resonant cavity comprises at least a second resonant capacitor and a second resonant inductor;

the second resonant circuit is separately connected to both ends of the target capacitor and the third capacitor;

the balancing module is configured to balance voltages at both ends of the first capacitor and the third capacitor by controlling the switches in the second resonant circuit in conjunction with influence of the second resonant cavity on a current; and the fifth switch and the seventh switch are not simultaneously turned on, and the sixth switch and the eighth switch are not simultaneously turned on.

4. The conversion circuit according to claim 1, wherein the balancing module further comprises:

a second resonant circuit comprising at least two groups of switches connected in parallel to each other and a second resonant cavity connected between the two groups of switches;

one group of switches in the two groups of switches in the second resonant circuit comprises at least a fifth switch and a seventh switch, the other group of switches in the two groups of switches in the second resonant circuit comprises at least a sixth switch and an eighth switch, and the second resonant cavity comprises at least a second resonant capacitor and a second resonant inductor;

the balancing module is configured to balance voltages at both ends of the first capacitor and the second resonant capacitor by controlling the switches in the second resonant circuit in conjunction with influence of the second resonant cavity on a current; and the fifth switch and the seventh switch are not simultaneously turned on, and the sixth switch and the eighth switch are not simultaneously turned on.

5. The conversion circuit according to claim 3, wherein the first resonant capacitor is connected in series to the first resonant inductor, and the second resonant capacitor is connected in series to the second resonant inductor;

the first capacitor, the second capacitor, and the third capacitor are sequentially connected in series;

one end of the third capacitor is connected to a first end of the sixth switch, and the other end of the third capacitor is separately connected to a first end of the fifth switch, the first end of the second switch, and one end of the second capacitor; the other end of the second capacitor is separately connected to the first end of the first switch, one end of the first capacitor, and the first end of the direct current-direct current converter; the second end of the direct current-direct current converter is separately connected to one end of the target capacitor, the second end of the fourth switch, and a second end of the eighth switch; the other end of the first capacitor is connected to the third end of the direct current-direct current converter; and the fourth end of the direct current-direct current converter is separately connected to the other end of the target capacitor, the second end of the third switch, and a second end of the seventh switch;

the first switch is connected in series to the third switch, the second switch is connected in series to the fourth switch, one end of the first resonant cavity is separately connected to the second end of the first switch and the first end of the third switch, and the other end of the first resonant cavity is separately connected to the second end of the second switch and the first end of the fourth switch; and the fifth switch is connected in series to the seventh switch, the sixth switch is connected in series to the eighth switch, one end of the second resonant cavity is separately connected to a second end of the fifth switch and a first end of the seventh switch, and the other end of the second resonant cavity is separately connected to a second end of the sixth switch and a first end of the eighth switch.

6. The conversion circuit according to claim 4, wherein the capacitor module further comprises:

a third capacitor, the first resonant capacitor is connected in series to the first resonant inductor, and the second resonant capacitor is connected in series to the second resonant inductor;

a first end of the sixth switch is connected to one end of the third capacitor; the fifth switch is separately connected to one end of the second capacitor and the first end of the second switch; the other end of the second capacitor is separately connected to the first end of the first switch, one end of the first capacitor, and the first end of the direct current-direct current converter; the second end of the direct current-direct current converter is separately connected to one end of the target capacitor, the second end of the fourth switch, and a second end of the eighth switch; the other end of the first capacitor is separately connected to the other end of the third capacitor and the third end of the direct current-direct current converter; and the fourth end of the direct current-direct current converter is separately connected to the other end of the target capacitor, the second end of the third switch, and a second end of the seventh switch;

the first switch is connected in series to the third switch, the second switch is connected in series to the fourth switch, one end of the first resonant cavity is separately connected to the second end of the first switch and the first end of the third switch, and the other end of the first resonant cavity is separately connected to the second end of the second switch and the first end of the fourth switch; and the fifth switch is connected in series to the seventh switch, the sixth switch is connected in series to the eighth switch, one end of the second resonant cavity is separately connected to a second end of the fifth switch and a first end of the seventh switch, and the other end of the second resonant cavity is separately connected to a second end of the sixth switch and a first end of the eighth switch.

7. The conversion circuit according to claim 4, wherein the conversion circuit further comprises:

a direct current power supply, the first resonant capacitor is connected in series to the first resonant inductor, and the second resonant capacitor is connected in series to the second resonant inductor;

a first end of the sixth switch is connected to one end of the direct current power supply; the fifth switch is separately connected to one end of the second capacitor and the first end of the second switch; the other end of the second capacitor is separately connected to the first end of the first switch, one end of the first capacitor, and the first end of the direct current-direct current converter; the second end of the direct current-direct current converter is separately connected to one end of the target capacitor, the second end of the fourth switch, and a second end of the eighth switch; the other end of the first capacitor is separately connected to the other end of the direct current power supply and the third end of the direct current-direct current converter; and the fourth end of the direct current-direct current converter is separately connected to the other end of the target capacitor, the second end of the third switch, and a second end of the seventh switch;

the first switch is connected in series to the third switch, the second switch is connected in series to the fourth switch, one end of the first resonant cavity is separately connected to the second end of the first switch and the first end of the third switch, and the other end of the first resonant cavity is separately connected to the second end of the second switch and the first end of the fourth switch; and the fifth switch is connected in series to the seventh switch, the sixth switch is connected in series to the eighth switch, one end of the second resonant cavity is separately connected to a second end of the fifth switch and a first end of the seventh switch, and the other end of the second resonant cavity is separately connected to a second end of the sixth switch and a first end of the eighth switch.

8. The conversion circuit according to claim 5, wherein the capacitor module further comprises:

a fourth capacitor, the balancing module further comprises:

a third resonant circuit comprising at least two groups of switches connected in parallel to each other and a third resonant cavity connected between the two groups of switches;

one group of switches in the two groups of switches in the third resonant circuit comprises at least a ninth switch and an eleventh switch, the other group of switches in the two groups of switches in the third resonant circuit comprises at least a tenth switch and a twelfth switch, and the third resonant cavity comprises at least a third resonant capacitor and a third resonant inductor;

the third resonant circuit is separately connected to both ends of the target capacitor and the fourth capacitor;

the balancing module is configured to balance voltages at both ends of the first capacitor and the fourth capacitor by controlling the switches in the third resonant circuit in conjunction with influence of the third resonant cavity on a current; and the ninth switch and the eleventh switch are not simultaneously turned on, and the tenth switch and the twelfth switch are not simultaneously turned on.

9. The method according to claim 5, wherein the balancing module further comprises:

a third resonant circuit comprising at least two groups of switches connected in parallel to each other and a third resonant cavity connected between the two groups of switches;

one group of switches in the two groups of switches in the third resonant circuit comprises at least a ninth switch and an eleventh switch, the other group of switches in the two groups of switches in the third resonant circuit comprises at least a tenth switch and a twelfth switch, and the third resonant cavity comprises at least a third resonant capacitor and a third resonant inductor;

the balancing module is configured to balance voltages at both ends of the first capacitor and the third resonant capacitor by controlling the switches in the third resonant circuit in conjunction with influence of the third resonant cavity on a current; and the ninth switch and the eleventh switch are not simultaneously turned on, and the tenth switch and the twelfth switch are not simultaneously turned on.

10. The conversion circuit according to claim 8, wherein the third resonant capacitor is connected in series to the third resonant inductor, and the first capacitor, the second capacitor, the third capacitor, and the fourth capacitor are sequentially connected in series;

one end of the fourth capacitor is connected to a first end of the tenth switch, and the other end of the fourth capacitor is separately connected to a first end of the ninth switch, the first end of the sixth switch, and one end of the third capacitor; the other end of the third capacitor is separately connected to the first end of the fifth switch, the first end of the second switch, and one end of the second capacitor; the other end of the second capacitor is separately connected to the first end of the first switch, one end of the first capacitor, and the first end of the direct current-direct current converter; the second end of the direct current-direct current converter is separately connected to one end of the target capacitor, the second end of the fourth switch, the second end of the eighth switch, and a second end of the twelfth switch; the other end of the first capacitor is connected to the third end of the direct current-direct current converter; and the fourth end of the direct current-direct current converter is separately connected to the other end of the target capacitor, the second end of the third switch, the second end of the seventh switch, and a second end of the eleventh switch; and the ninth switch is connected in series to the eleventh switch, the tenth switch is connected in series to the twelfth switch, one end of the third resonant cavity is separately connected to a second end of the ninth switch and a first end of the eleventh switch, and the other end of the third resonant cavity is separately connected to a second end of the tenth switch and a first end of the twelfth switch.

11. The conversion circuit according to claim 9, wherein the capacitor module further comprises:

a fourth capacitor, and the third resonant capacitor is connected in series to the third resonant inductor;

a first end of the tenth switch is connected to one end of the fourth capacitor, the ninth switch is separately connected to the first end of the sixth switch and one end of the third capacitor, and the other end of the third capacitor is separately connected to the first end of the fifth switch, the first end of the second switch, and one end of the second capacitor;

the other end of the second capacitor is separately connected to the first end of the first switch, one end of the first capacitor, and the first end of the direct current-direct current converter; the second end of the direct current-direct current converter is separately connected to one end of the target capacitor, the second end of the fourth switch, the second end of the eighth switch, and a second end of the twelfth switch; the other end of the first capacitor is separately connected to the other end of the fourth capacitor and the third end of the direct current-direct current converter; and the fourth end of the direct current-direct current converter is separately connected to the other end of the target capacitor, the second end of the third switch, the second end of the seventh switch, and a second end of the eleventh switch; and the ninth switch is connected in series to the eleventh switch, the tenth switch is connected in series to the twelfth switch, one end of the third resonant cavity is separately connected to a second end of the ninth switch and a first end of the eleventh switch, and the other end of the third resonant cavity is separately connected to a second end of the tenth switch and a first end of the twelfth switch.

12. The conversion circuit according to claim 9, wherein the conversion circuit further comprises:

a direct current power supply, and the third resonant capacitor is connected in series to the third resonant inductor;

a first end of the tenth switch is connected to one end of the direct current power supply, the ninth switch is separately connected to the first end of the sixth switch and one end of the third capacitor, and the other end of the third capacitor is separately connected to the first end of the fifth switch, the first end of the second switch, and one end of the second capacitor;

the other end of the second capacitor is separately connected to the first end of the first switch, one end of the first capacitor, and the first end of the direct current-direct current converter; the second end of the direct current-direct current converter is separately connected to one end of the target capacitor, the second end of the fourth switch, the second end of the eighth switch, and a second end of the twelfth switch; the other end of the first capacitor is separately connected to the other end of the direct current power supply and the third end of the direct current-direct current converter; and the fourth end of the direct current-direct current converter is separately connected to the other end of the target capacitor, the second end of the third switch, the second end of the seventh switch, and a second end of the eleventh switch; and the ninth switch is connected in series to the eleventh switch, the tenth switch is connected in series to the twelfth switch, one end of the third resonant cavity is separately connected to a second end of the ninth switch and a first end of the eleventh switch, and the other end of the third resonant cavity is separately connected to a second end of the tenth switch and a first end of the twelfth switch.

13. The conversion circuit according to claim 1, wherein a voltage at both ends of the target capacitor is an output voltage, and a voltage at both ends of the capacitor module is an input voltage; or, wherein a voltage at both ends of the target capacitor is an input voltage, and a voltage at both ends of the capacitor module is an output voltage.

14. The conversion circuit according to claim 1, wherein the switch is an insulated gate bipolar transistor (IGBT).

15. The conversion circuit according to claim 1, wherein the switch is an N-channel enhanced insulated gate field-effect transistor (NMOS).

16. The conversion circuit according to claim 1, wherein the first switch and the third switch are diodes, and the second switch and the fourth switch are N-channel enhanced insulated gate field-effect transistors NMOSs.

17. The conversion circuit according to claim 3, wherein the first switch, the third switch, the fifth switch, and the seventh switch are diodes, and the second switch, the fourth switch, the sixth switch, and the eighth switch are N-channel enhanced insulated gate field-effect transistors NMOSs.

18. The conversion circuit according to claim 1, wherein the direct current-direct current converter further comprises:
   a first startup switch,
   a second startup switch, and
   a startup inductor.

* * * * *